(12) United States Patent
Uchidate

(10) Patent No.: US 8,917,425 B2
(45) Date of Patent: Dec. 23, 2014

(54) IMAGE PROCESSING APPARATUS FOR EXECUTING HALFTONE PROCESSING, IMAGE PROCESSING SYSTEM, IMAGE PROCESSING METHOD, PROGRAM PRODUCT, AND COMPUTER-READABLE STORAGE MEDIUM

(71) Applicant: Canon Kabushiki Kaisha, Tokyo (JP)

(72) Inventor: Hikaru Uchidate, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/871,512

(22) Filed: Apr. 26, 2013

(65) Prior Publication Data

US 2013/0321871 A1 Dec. 5, 2013

(30) Foreign Application Priority Data

May 31, 2012 (JP) ................................. 2012-125147

(51) Int. Cl.
*H04N 1/40* (2006.01)
*G06K 15/00* (2006.01)
*H04N 1/405* (2006.01)
*G06K 15/02* (2006.01)

(52) U.S. Cl.
CPC .............. *G06K 15/1881* (2013.01); *H04N 1/40* (2013.01)
USPC .......... 358/3.05; 358/3.06; 358/2.1; 358/3.21

(58) Field of Classification Search
CPC .. H04N 1/40; G06K 15/1881; G06K 15/1853
See application file for complete search history.

(56) References Cited

U.S. PATENT DOCUMENTS

| 6,760,126 B1 | 7/2004 | Kritayakirana et al. |
| 2011/0122451 A1 | 5/2011 | Tsutsumi et al. |
| 2011/0157655 A1 | 6/2011 | Hagiwara et al. |

FOREIGN PATENT DOCUMENTS

| JP | 2002-44449 A | 2/2002 |
| JP | 2011-114413 A | 6/2011 |
| JP | 2011-155632 A | 8/2011 |

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

An image processing apparatus includes processors which output first and second image data from input image data. The second image data is applied halftone processing of a higher resolution than halftone processing applied to the first image data. The image processing includes a unit configured to decide a mixing ratio of a pixel using a value based on a sum of an error of the pixel and a change amount of a pixel value at that pixel; and a mixing unit configured to mix pixel values of the first image data and the second image data according to the mixing ratios. When the value based on the sum is increased, the mixing ratio of the second image data decided by the decision unit remains the same or is increased.

21 Claims, 53 Drawing Sheets

FIG. 7B

| | THRESHOLD TABLE THRESHOLD NUMBER | | | | | |
|---|---|---|---|---|---|---|
| | 0 | 1 | 2 | ... | 11 | 12 |
| 0 | 0 | 0 | 0 | ... | 0 | 0 |
| 1 | 2 | 21 | 41 | ... | 218 | 237 |
| 2 | 3 | 23 | 42 | ... | 219 | 238 |
| 3 | 5 | 24 | 44 | ... | 220 | 240 |
| ... | ... | ... | ... | ... | ... | ... |
| 14 | 19 | 39 | 58 | ... | 235 | 254 |
| 15 | 20 | 40 | 59 | ... | 236 | 255 |

OUTPUT VALUE

FIG. 7A

THRESHOLD NUMBER TABLE
COLUMN NUMBER

| | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 11 | 5 | 4 | 6 | 8 | 1 | 2 | 9 | 10 | 7 | 0 | 3 | 12 |
| 1 | 10 | 7 | 0 | 3 | 12 | 11 | 5 | 4 | 6 | 8 | 1 | 2 | 9 |
| 2 | 6 | 8 | 1 | 2 | 9 | 10 | 7 | 0 | 3 | 12 | 11 | 5 | 4 |
| 3 | 3 | 12 | 11 | 5 | 4 | 6 | 8 | 1 | 2 | 9 | 10 | 7 | 0 |
| 4 | 2 | 9 | 10 | 7 | 0 | 3 | 12 | 11 | 5 | 4 | 6 | 8 | 1 |
| 5 | 5 | 4 | 6 | 8 | 1 | 2 | 9 | 10 | 7 | 0 | 3 | 12 | 11 |
| 6 | 7 | 0 | 3 | 12 | 11 | 5 | 4 | 6 | 8 | 1 | 2 | 9 | 10 |
| 7 | 8 | 1 | 2 | 9 | 10 | 7 | 0 | 3 | 12 | 11 | 5 | 4 | 6 |
| 8 | 12 | 11 | 5 | 4 | 6 | 8 | 1 | 2 | 9 | 10 | 7 | 0 | 3 |
| 9 | 9 | 10 | 7 | 0 | 3 | 12 | 11 | 5 | 4 | 6 | 8 | 1 | 2 |
| 10 | 4 | 6 | 8 | 1 | 2 | 9 | 10 | 7 | 0 | 3 | 12 | 11 | 5 |
| 11 | 0 | 3 | 12 | 11 | 5 | 4 | 6 | 8 | 1 | 2 | 9 | 10 | 7 |
| 12 | 1 | 2 | 9 | 10 | 7 | 0 | 3 | 12 | 11 | 5 | 4 | 6 | 8 |

ROW NUMBER

THRESHOLD NUMBER TABLE

| | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 3 | 2 | 5 | 7 | 8 | 12 | 9 | 10 | 4 | 0 | 1 | 6 | 9 |
| 1 | 12 | 9 | 4 | 0 | 1 | 11 | 10 | 7 | 3 | 2 | 11 | 8 | 6 |
| 2 | 11 | 10 | 6 | 3 | 2 | 9 | 8 | 0 | 12 | 5 | 7 | 0 | 1 |
| 3 | 5 | 7 | 0 | 12 | 9 | 4 | 6 | 3 | 2 | 11 | 0 | 3 | 2 |
| 4 | 4 | 0 | 3 | 2 | 11 | 10 | 1 | 6 | 8 | 12 | 9 | 6 | 9 |
| 5 | 6 | 3 | 12 | 9 | 4 | 0 | 3 | 2 | 5 | 7 | 1 | 11 | 10 |
| 6 | 8 | 12 | 11 | 10 | 7 | 1 | 2 | 9 | 4 | 0 | 6 | 3 | 2 |
| 7 | 1 | 11 | 2 | 5 | 0 | 3 | 12 | 11 | 6 | 8 | 12 | 5 | 7 |
| 8 | 2 | 5 | 7 | 0 | 3 | 12 | 11 | 10 | 1 | 6 | 8 | 0 | 1 |
| 9 | 9 | 4 | 6 | 3 | 2 | 5 | 7 | 0 | 12 | 11 | 10 | 4 | 6 |
| 10 | 10 | 6 | 8 | 12 | 11 | 7 | 0 | 1 | 2 | 5 | 7 | 6 | 3 |
| 11 | 7 | 8 | 0 | 1 | 2 | 9 | 4 | 6 | 3 | 2 | 11 | 12 | 5 |
| 12 | 0 | 1 | 11 | 10 | 5 | 7 | 8 | 3 | 2 | 9 | 4 | 9 | 4 |

COLUMN NUMBER

ROW NUMBER

FIG. 7D

THRESHOLD TABLE

| THRESHOLD NUMBER | 0 |
|---|---|
| 0 | 0 |
| 1 | 9 |
| 2 | 26 |
| 3 | 43 |
| ⋮ | ⋮ |
| 14 | 230 |
| 15 | 247 |

OUTPUT VALUE

FIG. 7C

THRESHOLD NUMBER TABLE

COLUMN NUMBER

| | 0 |
|---|---|
| ROW NUMBER 0 | 0 |

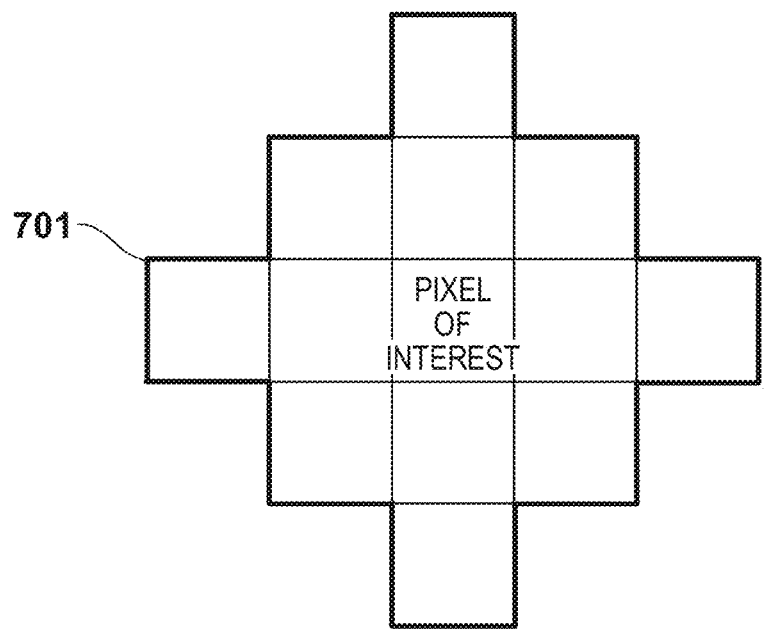

FIG. 10A

| 80 | 80 | 80 | 0 | 0 | 0 | 80 | 80 | 80 | 0 | 80 | 80 | 80 | 0 | 0 | 0 | 80 | 80 | 80 | 0 | 80 | 80 | 80 | 0 | 0 | 0 |
|---|---|---|---|---|---|---|---|---|---|---|---|---|---|---|---|---|---|---|---|---|---|---|---|---|---|
| 80 | 80 | 80 | 0 | 0 | 0 | 0 | 0 | 0 | 0 | 80 | 80 | 80 | 0 | 0 | 0 | 0 | 0 | 0 | 0 | 80 | 80 | 80 | 0 | 0 | 0 |
| 80 | 80 | 80 | 0 | 80 | 80 | 80 | 0 | 0 | 0 | 80 | 80 | 80 | 0 | 80 | 80 | 80 | 0 | 0 | 0 | 80 | 80 | 80 | 0 | 80 | 80 |
| 0 | 0 | 0 | 0 | 80 | 80 | 80 | 0 | 0 | 0 | 0 | 0 | 0 | 0 | 80 | 80 | 80 | 0 | 0 | 0 | 0 | 0 | 0 | 0 | 80 | 80 |
| 80 | 0 | 0 | 0 | 80 | 80 | 80 | 0 | 80 | 80 | 80 | 0 | 0 | 0 | 80 | 80 | 80 | 0 | 80 | 80 | 80 | 0 | 0 | 0 | 80 | 80 |
| 80 | 0 | 0 | 0 | 0 | 0 | 0 | 0 | 80 | 80 | 80 | 0 | 0 | 0 | 0 | 0 | 0 | 0 | 80 | 80 | 80 | 0 | 0 | 0 | 0 | 0 |
| 80 | 0 | 80 | 80 | 80 | 0 | 0 | 0 | 80 | 80 | 80 | 0 | 80 | 80 | 80 | 0 | 0 | 0 | 80 | 80 | 80 | 0 | 80 | 80 | 80 | 0 |
| 0 | 0 | 80 | 80 | 80 | 0 | 0 | 0 | 0 | 0 | 0 | 0 | 80 | 80 | 80 | 0 | 0 | 0 | 0 | 0 | 0 | 0 | 80 | 80 | 80 | 0 |
| 0 | 0 | 80 | 80 | 80 | 0 | 80 | 80 | 80 | 0 | 0 | 0 | 80 | 80 | 80 | 0 | 80 | 80 | 80 | 0 | 0 | 0 | 80 | 80 | 80 | 0 |
| 0 | 0 | 0 | 0 | 0 | 0 | 80 | 80 | 80 | 0 | 0 | 0 | 0 | 0 | 0 | 0 | 80 | 80 | 80 | 0 | 0 | 0 | 0 | 0 | 0 | 0 |
| 80 | 80 | 80 | 0 | 0 | 0 | 80 | 80 | 80 | 0 | 80 | 80 | 80 | 0 | 0 | 0 | 80 | 80 | 80 | 0 | 80 | 80 | 80 | 0 | 0 | 0 |
| 80 | 80 | 80 | 0 | 0 | 0 | 0 | 0 | 0 | 0 | 80 | 80 | 80 | 0 | 0 | 0 | 0 | 0 | 0 | 0 | 80 | 80 | 80 | 0 | 0 | 0 |
| 80 | 80 | 80 | 0 | 80 | 80 | 80 | 0 | 0 | 0 | 80 | 80 | 80 | 0 | 80 | 80 | 80 | 0 | 0 | 0 | 80 | 80 | 80 | 0 | 80 | 80 |
| 0 | 0 | 0 | 0 | 80 | 80 | 80 | 0 | 0 | 0 | 0 | 0 | 0 | 0 | 80 | 80 | 80 | 0 | 0 | 0 | 0 | 0 | 0 | 0 | 80 | 80 |
| 80 | 0 | 0 | 0 | 80 | 80 | 80 | 0 | 80 | 80 | 80 | 0 | 0 | 0 | 80 | 80 | 80 | 0 | 80 | 80 | 80 | 0 | 0 | 0 | 80 | 80 |
| 80 | 0 | 0 | 0 | 0 | 0 | 0 | 0 | 80 | 80 | 80 | 0 | 0 | 0 | 0 | 0 | 0 | 0 | 80 | 80 | 80 | 0 | 0 | 0 | 0 | 0 |
| 80 | 0 | 80 | 80 | 80 | 0 | 0 | 0 | 80 | 80 | 80 | 0 | 80 | 80 | 80 | 0 | 0 | 0 | 80 | 80 | 80 | 0 | 80 | 80 | 80 | 0 |
| 0 | 0 | 80 | 80 | 80 | 0 | 0 | 0 | 0 | 0 | 0 | 0 | 80 | 80 | 80 | 0 | 0 | 0 | 0 | 0 | 0 | 0 | 80 | 80 | 80 | 0 |
| 0 | 0 | 80 | 80 | 80 | 0 | 80 | 80 | 80 | 0 | 0 | 0 | 80 | 80 | 80 | 0 | 80 | 80 | 80 | 0 | 0 | 0 | 80 | 80 | 80 | 0 |
| 0 | 0 | 0 | 0 | 0 | 0 | 80 | 80 | 80 | 0 | 0 | 0 | 0 | 0 | 0 | 0 | 80 | 80 | 80 | 0 | 0 | 0 | 0 | 0 | 0 | 0 |
| 80 | 80 | 80 | 0 | 0 | 0 | 80 | 80 | 80 | 0 | 80 | 80 | 80 | 0 | 0 | 0 | 80 | 80 | 80 | 0 | 80 | 80 | 80 | 0 | 0 | 0 |
| 80 | 80 | 80 | 0 | 0 | 0 | 0 | 0 | 0 | 0 | 80 | 80 | 80 | 0 | 0 | 0 | 0 | 0 | 0 | 0 | 80 | 80 | 80 | 0 | 0 | 0 |
| 80 | 80 | 80 | 0 | 80 | 80 | 80 | 0 | 0 | 0 | 80 | 80 | 80 | 0 | 80 | 80 | 80 | 0 | 0 | 0 | 80 | 80 | 80 | 0 | 80 | 80 |
| 0 | 0 | 0 | 0 | 80 | 80 | 80 | 0 | 0 | 0 | 0 | 0 | 0 | 0 | 80 | 80 | 80 | 0 | 0 | 0 | 0 | 0 | 0 | 0 | 80 | 80 |
| 80 | 0 | 0 | 0 | 80 | 80 | 80 | 0 | 80 | 80 | 80 | 0 | 0 | 0 | 80 | 80 | 80 | 0 | 80 | 80 | 80 | 0 | 0 | 0 | 80 | 80 |
| 80 | 0 | 0 | 0 | 0 | 0 | 0 | 0 | 80 | 80 | 80 | 0 | 0 | 0 | 0 | 0 | 0 | 0 | 80 | 80 | 80 | 0 | 0 | 0 | 0 | 0 |

IMAGE DATA $K_1$

FIG. 10C

HALFTONE IMAGE DATA HT

FIG. 11A

| 80 | 70 | 53 | 26 | 26 | 26 | 35 | 26 | 35 | 44 | 62 | 62 | 53 | 26 | 26 | 26 | 35 | 26 | 35 | 44 | 62 | 62 | 53 | 26 | 20 | 13 |
|---|---|---|---|---|---|---|---|---|---|---|---|---|---|---|---|---|---|---|---|---|---|---|---|---|---|
| 70 | 65 | 46 | 33 | 26 | 33 | 33 | 26 | 20 | 33 | 46 | 60 | 46 | 33 | 26 | 33 | 33 | 26 | 20 | 33 | 46 | 60 | 46 | 33 | 29 | 30 |
| 62 | 43 | 43 | 36 | 43 | 43 | 43 | 24 | 24 | 24 | 43 | 43 | 43 | 36 | 43 | 43 | 43 | 24 | 24 | 24 | 43 | 43 | 43 | 36 | 40 | 44 |
| 44 | 30 | 24 | 30 | 43 | 55 | 43 | 30 | 24 | 30 | 36 | 30 | 24 | 30 | 43 | 55 | 43 | 30 | 24 | 30 | 36 | 30 | 24 | 30 | 40 | 53 |
| 35 | 18 | 24 | 24 | 43 | 43 | 43 | 36 | 43 | 43 | 43 | 24 | 24 | 24 | 43 | 43 | 43 | 36 | 43 | 43 | 43 | 24 | 24 | 24 | 40 | 44 |
| 26 | 24 | 24 | 30 | 36 | 30 | 24 | 30 | 43 | 55 | 43 | 30 | 24 | 30 | 36 | 30 | 24 | 30 | 43 | 55 | 43 | 30 | 24 | 30 | 40 | 35 |
| 35 | 30 | 43 | 43 | 43 | 24 | 24 | 24 | 43 | 43 | 43 | 36 | 43 | 43 | 43 | 24 | 24 | 24 | 43 | 43 | 43 | 36 | 43 | 43 | 46 | 35 |
| 26 | 30 | 43 | 55 | 43 | 30 | 24 | 30 | 36 | 30 | 24 | 30 | 43 | 55 | 43 | 30 | 24 | 30 | 36 | 30 | 24 | 30 | 43 | 55 | 46 | 35 |
| 26 | 24 | 43 | 43 | 43 | 36 | 43 | 43 | 43 | 24 | 24 | 24 | 43 | 43 | 43 | 36 | 43 | 43 | 43 | 24 | 24 | 24 | 43 | 43 | 40 | 26 |
| 26 | 30 | 36 | 30 | 24 | 30 | 43 | 55 | 43 | 30 | 24 | 30 | 36 | 30 | 24 | 30 | 43 | 55 | 43 | 30 | 24 | 30 | 36 | 30 | 20 | 8 |
| 53 | 43 | 43 | 24 | 24 | 24 | 43 | 43 | 43 | 36 | 43 | 43 | 43 | 24 | 24 | 24 | 43 | 43 | 43 | 36 | 43 | 43 | 43 | 24 | 20 | 8 |
| 62 | 55 | 43 | 30 | 24 | 30 | 36 | 30 | 24 | 30 | 43 | 55 | 43 | 30 | 24 | 30 | 36 | 30 | 24 | 30 | 43 | 55 | 43 | 30 | 26 | 26 |
| 62 | 43 | 43 | 36 | 43 | 43 | 43 | 24 | 24 | 24 | 43 | 43 | 43 | 36 | 43 | 43 | 43 | 24 | 24 | 24 | 43 | 43 | 43 | 36 | 40 | 44 |
| 44 | 30 | 24 | 30 | 43 | 55 | 43 | 30 | 24 | 30 | 36 | 30 | 24 | 30 | 43 | 55 | 43 | 30 | 24 | 30 | 36 | 30 | 24 | 30 | 40 | 53 |
| 35 | 18 | 24 | 24 | 43 | 43 | 43 | 36 | 43 | 43 | 43 | 24 | 24 | 24 | 43 | 43 | 43 | 36 | 43 | 43 | 43 | 24 | 24 | 24 | 40 | 44 |
| 26 | 24 | 24 | 30 | 36 | 30 | 24 | 30 | 43 | 55 | 43 | 30 | 24 | 30 | 36 | 30 | 24 | 30 | 43 | 55 | 43 | 30 | 24 | 30 | 40 | 35 |
| 35 | 30 | 43 | 43 | 43 | 24 | 24 | 24 | 43 | 43 | 43 | 36 | 43 | 43 | 43 | 24 | 24 | 24 | 43 | 43 | 43 | 36 | 43 | 43 | 46 | 35 |
| 26 | 30 | 43 | 55 | 43 | 30 | 24 | 30 | 36 | 30 | 24 | 30 | 43 | 55 | 43 | 30 | 24 | 30 | 36 | 30 | 24 | 30 | 43 | 55 | 46 | 35 |
| 26 | 24 | 43 | 43 | 43 | 36 | 43 | 43 | 43 | 24 | 24 | 24 | 43 | 43 | 43 | 36 | 43 | 43 | 43 | 24 | 24 | 24 | 43 | 43 | 40 | 26 |
| 26 | 30 | 36 | 30 | 24 | 30 | 43 | 55 | 43 | 30 | 24 | 30 | 36 | 30 | 24 | 30 | 43 | 55 | 43 | 30 | 24 | 30 | 36 | 30 | 20 | 8 |
| 53 | 43 | 43 | 24 | 24 | 24 | 43 | 43 | 43 | 36 | 43 | 43 | 43 | 24 | 24 | 24 | 43 | 43 | 43 | 36 | 43 | 43 | 43 | 24 | 20 | 8 |
| 62 | 55 | 43 | 30 | 24 | 30 | 36 | 30 | 24 | 30 | 43 | 55 | 43 | 30 | 24 | 30 | 36 | 30 | 24 | 30 | 43 | 55 | 43 | 30 | 26 | 26 |
| 62 | 43 | 43 | 36 | 43 | 43 | 43 | 24 | 24 | 24 | 43 | 43 | 43 | 36 | 43 | 43 | 43 | 24 | 24 | 24 | 43 | 43 | 43 | 36 | 40 | 44 |
| 44 | 30 | 24 | 30 | 43 | 55 | 43 | 30 | 24 | 30 | 36 | 30 | 24 | 30 | 43 | 55 | 43 | 30 | 24 | 30 | 36 | 30 | 24 | 30 | 40 | 53 |
| 30 | 21 | 20 | 20 | 40 | 46 | 46 | 40 | 40 | 40 | 40 | 26 | 20 | 20 | 40 | 46 | 46 | 40 | 40 | 40 | 40 | 26 | 20 | 20 | 36 | 50 |
| 26 | 20 | 8 | 8 | 26 | 35 | 35 | 35 | 44 | 53 | 44 | 26 | 8 | 8 | 26 | 35 | 35 | 35 | 44 | 53 | 44 | 26 | 8 | 8 | 30 | 40 |

FILTER PROCESSING DATA

FIG. 11B

| 0 | 1 | 1 | 0 | 0 | 0 | 1 | 0 | 0 | 1 | 5 | 6 | 6 | 5 | 5 | 5 | 3 | 3 | 3 | 3 | 3 | 1 | 0 | 0 | 0 | 0 |
|---|---|---|---|---|---|---|---|---|---|---|---|---|---|---|---|---|---|---|---|---|---|---|---|---|---|
| 2 | 2 | 2 | 1 | 0 | 1 | 1 | 1 | 0 | 1 | 3 | 5 | 5 | 5 | 5 | 5 | 3 | 2 | 2 | 2 | 2 | 1 | 0 | 0 | 0 | 0 |
| 3 | 2 | 2 | 2 | 3 | 2 | 1 | 1 | 1 | 1 | 2 | 3 | 4 | 4 | 4 | 4 | 4 | 2 | 2 | 2 | 2 | 1 | 0 | 0 | 0 | 0 |
| 3 | 2 | 2 | 2 | 2 | 3 | 2 | 1 | 1 | 2 | 2 | 2 | 2 | 3 | 4 | 4 | 3 | 2 | 2 | 2 | 2 | 1 | 0 | 0 | 0 | 0 |
| 3 | 2 | 2 | 2 | 2 | 2 | 3 | 2 | 3 | 2 | 2 | 2 | 2 | 2 | 3 | 3 | 2 | 2 | 2 | 2 | 3 | 0 | 0 | 0 | 0 | 0 |
| 3 | 2 | 2 | 2 | 2 | 2 | 1 | 1 | 2 | 3 | 2 | 2 | 2 | 2 | 2 | 1 | 1 | 2 | 2 | 3 | 2 | 1 | 0 | 0 | 0 | 0 |
| 3 | 3 | 4 | 3 | 2 | 1 | 1 | 1 | 1 | 2 | 3 | 2 | 2 | 2 | 2 | 1 | 1 | 1 | 3 | 2 | 1 | 1 | 1 | 1 | 1 | 0 |
| 5 | 4 | 4 | 4 | 3 | 1 | 1 | 1 | 1 | 1 | 0 | 1 | 2 | 2 | 1 | 1 | 1 | 1 | 2 | 1 | 1 | 1 | 1 | 2 | 2 | 1 |
| 5 | 4 | 4 | 4 | 3 | 2 | 2 | 1 | 1 | 0 | 0 | 0 | 1 | 1 | 1 | 1 | 1 | 2 | 3 | 1 | 1 | 1 | 2 | 2 | 2 | 3 |
| 5 | 4 | 4 | 3 | 2 | 2 | 2 | 2 | 1 | 0 | 0 | 0 | 0 | 0 | 0 | 1 | 2 | 3 | 2 | 2 | 1 | 1 | 2 | 2 | 2 | 1 |
| 6 | 4 | 4 | 2 | 2 | 2 | 2 | 2 | 1 | 0 | 0 | 0 | 0 | 0 | 0 | 0 | 3 | 2 | 2 | 2 | 2 | 3 | 3 | 2 | 1 | 0 |
| 6 | 4 | 3 | 2 | 2 | 2 | 2 | 1 | 0 | 0 | 0 | 0 | 0 | 0 | 0 | 1 | 2 | 2 | 2 | 2 | 3 | 4 | 4 | 3 | 2 | 1 |
| 5 | 3 | 2 | 2 | 2 | 2 | 3 | 0 | 0 | 0 | 0 | 0 | 0 | 0 | 1 | 2 | 2 | 2 | 2 | 2 | 4 | 4 | 4 | 4 | 5 | 5 |
| 1 | 1 | 1 | 2 | 2 | 3 | 2 | 1 | 0 | 0 | 0 | 0 | 0 | 0 | 1 | 2 | 2 | 2 | 2 | 3 | 4 | 4 | 4 | 4 | 5 | 6 |
| 0 | 0 | 1 | 1 | 3 | 2 | 1 | 1 | 1 | 1 | 1 | 0 | 0 | 0 | 1 | 1 | 2 | 2 | 3 | 4 | 4 | 4 | 4 | 4 | 5 | 6 |
| 0 | 1 | 1 | 1 | 2 | 1 | 1 | 1 | 1 | 2 | 2 | 1 | 0 | 1 | 1 | 1 | 1 | 1 | 3 | 4 | 4 | 4 | 4 | 4 | 5 | 5 |
| 1 | 1 | 1 | 2 | 3 | 1 | 1 | 1 | 2 | 2 | 2 | 2 | 3 | 2 | 1 | 1 | 1 | 1 | 2 | 3 | 4 | 4 | 4 | 4 | 5 | 3 |
| 0 | 1 | 2 | 3 | 2 | 2 | 1 | 1 | 2 | 2 | 2 | 2 | 2 | 3 | 2 | 1 | 1 | 2 | 2 | 2 | 2 | 3 | 4 | 4 | 3 | 1 |
| 0 | 0 | 3 | 2 | 2 | 2 | 2 | 3 | 3 | 2 | 2 | 2 | 2 | 2 | 3 | 2 | 3 | 2 | 2 | 2 | 2 | 2 | 3 | 3 | 1 | 0 |
| 0 | 1 | 2 | 2 | 2 | 2 | 3 | 4 | 4 | 3 | 2 | 2 | 2 | 1 | 1 | 2 | 3 | 2 | 2 | 2 | 2 | 2 | 1 | 0 | 0 |   |
| 1 | 2 | 2 | 2 | 2 | 4 | 4 | 4 | 4 | 3 | 2 | 1 | 1 | 1 | 1 | 2 | 3 | 2 | 2 | 2 | 2 | 1 | 1 | 1 | 0 |   |
| 1 | 2 | 2 | 2 | 3 | 4 | 4 | 4 | 4 | 4 | 3 | 1 | 1 | 1 | 1 | 1 | 1 | 0 | 1 | 2 | 2 | 1 | 1 | 1 | 1 |   |
| 1 | 1 | 2 | 2 | 3 | 4 | 4 | 4 | 4 | 4 | 4 | 3 | 2 | 1 | 1 | 0 | 0 | 0 | 1 | 1 | 1 | 1 | 1 | 1 | 1 |   |
| 1 | 1 | 1 | 1 | 3 | 4 | 4 | 4 | 4 | 4 | 3 | 2 | 2 | 2 | 1 | 0 | 0 | 0 | 0 | 0 | 1 | 1 | 1 | 1 | 1 |   |
| 1 | 1 | 1 | 0 | 1 | 3 | 5 | 5 | 5 | 5 | 5 | 2 | 1 | 2 | 2 | 2 | 1 | 0 | 0 | 0 | 0 | 0 | 0 | 0 | 1 | 0 |
| 2 | 1 | 0 | 0 | 0 | 1 | 3 | 5 | 6 | 6 | 5 | 1 | 0 | 1 | 3 | 1 | 0 | 0 | 0 | 0 | 0 | 0 | 0 | 0 | 0 | 0 |

FILTER PROCESSING DATA

FIG. 11C

| 80 | 53 | 36 | 26 | 26 | 26 | 18 | 26 | 35 | 27 | -23 | -40 | -49 | -59 | -59 | -59 | -16 | -25 | -16 | -7 | 11 | 45 | 53 | 26 | 20 | 13 |
|---|---|---|---|---|---|---|---|---|---|---|---|---|---|---|---|---|---|---|---|---|---|---|---|---|---|
| 36 | 31 | 12 | 16 | 26 | 16 | 16 | 9 | 20 | 16 | -5 | -25 | -39 | -52 | -59 | -52 | -18 | -8 | -14 | -1 | 12 | 26 | 29 | 33 | 29 | 30 |
| 11 | 9 | 9 | 2 | -8 | 9 | 26 | 7 | 7 | 7 | 9 | -8 | -25 | -32 | -25 | -25 | -25 | -10 | -10 | -10 | 9 | 9 | 26 | 36 | 40 | 44 |
| -7 | -4 | -10 | -4 | 9 | 4 | 9 | 13 | 7 | -4 | 2 | -4 | -10 | -21 | -25 | -13 | -8 | -4 | -10 | -4 | 2 | 13 | 24 | 30 | 40 | 53 |
| -16 | -16 | -10 | -10 | 9 | 9 | -8 | 2 | -8 | 9 | 9 | -10 | -10 | -10 | -8 | -8 | 9 | 2 | 9 | 9 | -8 | 24 | 24 | 24 | 40 | 44 |
| -25 | -10 | -10 | -4 | 2 | -4 | 7 | 13 | 9 | 4 | 9 | -4 | -10 | -4 | 2 | 13 | 7 | -4 | 9 | 4 | 9 | 13 | 24 | 30 | 40 | 35 |
| -16 | -21 | -25 | -8 | 9 | 7 | 7 | 7 | 26 | 9 | -8 | 2 | 9 | 9 | 9 | 7 | 7 | 7 | -8 | 9 | 26 | 19 | 26 | 26 | 29 | 35 |
| -59 | -38 | -25 | -13 | -8 | 13 | 7 | 13 | 19 | 13 | 24 | 13 | 9 | 21 | 26 | 13 | 7 | 13 | 2 | 13 | 7 | 13 | 26 | 21 | 12 | 18 |
| -59 | -44 | -25 | -25 | -8 | 2 | 9 | 26 | 26 | 24 | 24 | 24 | 26 | 26 | 26 | 19 | 26 | 9 | -8 | 7 | 7 | 7 | 9 | 9 | 6 | -25 |
| -59 | -38 | -32 | -21 | -10 | -4 | 9 | 21 | 26 | 30 | 24 | 30 | 36 | 30 | 24 | 13 | 9 | 4 | 9 | -4 | 7 | 13 | 2 | -4 | -14 | -9 |
| -49 | -25 | -25 | -10 | -10 | -10 | 9 | 9 | 26 | 36 | 43 | 43 | 43 | 24 | 24 | 24 | -8 | 9 | 9 | 2 | 9 | -8 | -8 | -10 | 3 | 8 |
| -40 | -13 | -8 | -4 | -10 | -4 | 2 | 13 | 24 | 30 | 43 | 55 | 43 | 30 | 24 | 13 | 2 | -4 | -10 | -4 | -8 | -13 | -25 | -21 | -8 | 9 |
| -23 | -8 | 9 | 2 | 9 | 9 | -8 | 24 | 24 | 24 | 43 | 43 | 43 | 36 | 26 | 9 | 9 | -10 | -10 | -10 | -25 | -25 | -25 | -32 | -45 | -41 |
| 27 | 13 | 7 | -4 | 9 | 4 | 9 | 13 | 24 | 30 | 36 | 30 | 24 | 30 | 26 | 21 | 9 | -4 | -10 | -21 | -32 | -38 | -44 | -38 | -45 | -49 |
| 35 | 18 | 7 | 7 | -8 | 9 | 26 | 19 | 26 | 26 | 26 | 24 | 24 | 24 | 26 | 26 | 9 | 2 | -8 | -25 | -25 | -44 | -44 | -44 | -45 | -58 |
| 26 | 7 | 7 | 13 | 2 | 13 | 7 | 13 | 26 | 21 | 9 | 13 | 24 | 13 | 19 | 13 | 7 | 13 | -8 | -13 | -25 | -38 | -44 | -38 | -45 | -50 |
| 18 | 13 | 26 | 9 | -8 | 7 | 7 | 7 | 9 | 9 | 9 | 2 | -8 | 9 | 26 | 7 | 7 | 7 | 9 | -8 | -25 | -32 | -25 | -25 | -39 | -16 |
| 26 | 13 | 9 | 4 | 9 | -4 | 7 | 13 | 2 | -4 | -10 | -4 | 9 | 4 | 9 | 13 | 7 | -4 | 2 | -4 | -10 | -21 | -25 | -13 | -5 | 18 |
| 26 | 24 | -8 | 9 | 9 | 2 | 9 | -8 | -8 | -10 | -10 | -10 | 9 | 9 | -8 | 2 | -8 | 9 | 9 | -10 | -10 | -10 | -8 | -8 | 23 | 26 |
| 26 | 13 | 2 | -4 | -10 | -4 | -8 | -13 | -25 | -21 | -10 | -4 | 2 | -4 | 7 | 13 | 9 | 4 | 9 | -4 | -10 | -4 | 2 | 13 | 20 | 8 |
| 36 | 9 | 9 | -10 | -10 | -10 | -25 | -25 | -25 | -32 | -25 | -8 | 9 | 7 | 7 | 7 | 26 | 9 | -8 | 2 | 9 | 9 | 9 | 7 | 3 | 8 |
| 45 | 21 | 9 | -4 | -10 | -21 | -32 | -38 | -44 | -38 | -25 | -13 | -8 | 13 | 7 | 13 | 19 | 13 | 24 | 13 | 9 | 21 | 26 | 13 | 9 | 9 |
| 45 | 26 | 9 | 2 | -8 | -25 | -25 | -44 | -44 | -44 | -25 | -25 | -8 | 2 | 9 | 26 | 26 | 24 | 24 | 24 | 26 | 26 | 26 | 19 | 23 | 27 |
| 27 | 13 | 7 | 13 | -8 | -13 | -25 | -38 | -44 | -38 | -32 | -21 | -10 | -4 | 9 | 21 | 26 | 30 | 24 | 30 | 36 | 30 | 24 | 13 | 23 | 36 |
| 13 | 4 | 3 | 20 | 23 | -5 | -39 | -45 | -45 | -45 | -45 | -8 | 3 | -14 | 6 | 12 | 29 | 40 | 40 | 40 | 40 | 26 | 20 | 20 | 19 | 50 |
| -8 | 3 | 8 | 8 | 26 | 18 | -16 | -50 | -58 | -49 | -41 | 9 | 8 | -9 | -25 | 18 | 35 | 35 | 44 | 53 | 44 | 26 | 8 | 8 | 30 | 40 |

HALFTONE ERROR DATA HTE

FIG. 11D
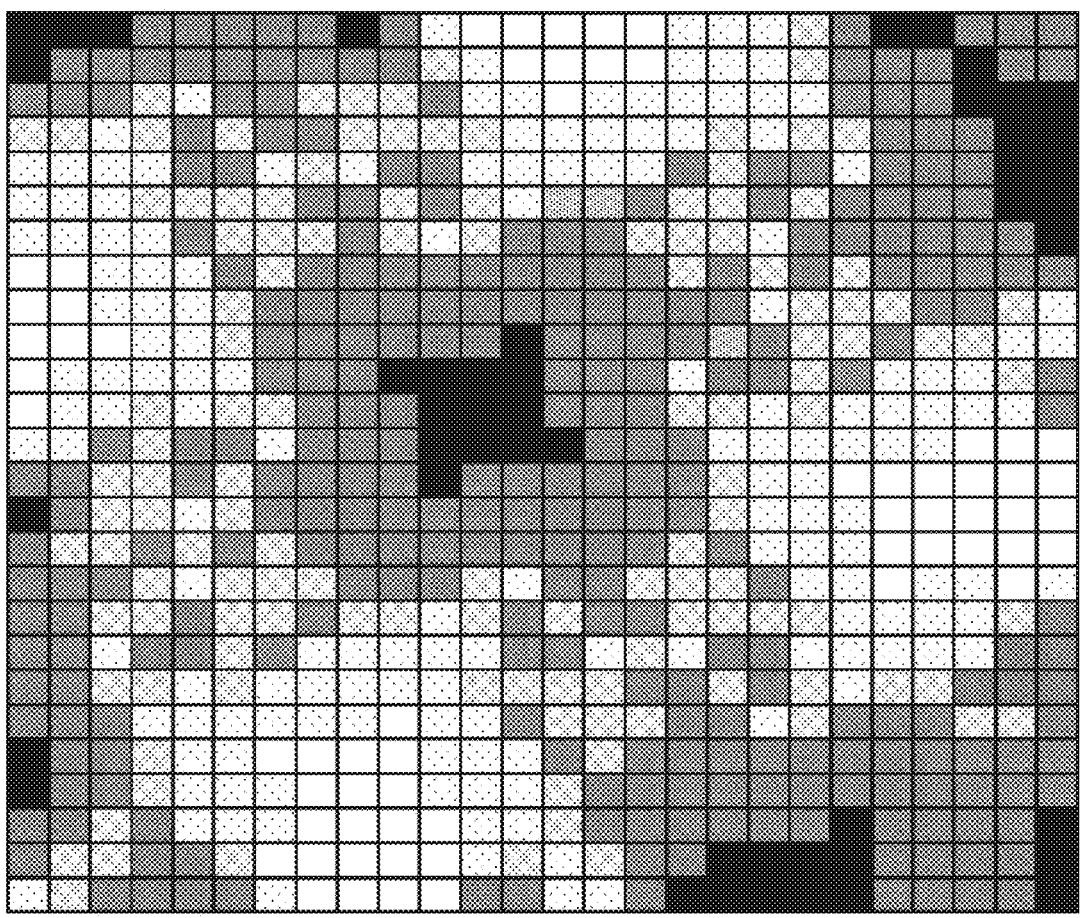
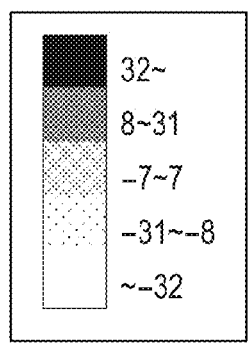

FIG. 12A

| 80 | 53 | 36 | 26 | 26 | 26 | 18 | 26 | 35 | 27 | 0 | 0 | 0 | 0 | 0 | 0 | 0 | 0 | 0 | 11 | 45 | 53 | 26 | 20 | 13 |
|---|---|---|---|---|---|---|---|---|---|---|---|---|---|---|---|---|---|---|---|---|---|---|---|---|
| 36 | 31 | 12 | 16 | 26 | 16 | 16 | 9 | 20 | 16 | 0 | 0 | 0 | 0 | 0 | 0 | 0 | 0 | 0 | 12 | 26 | 29 | 33 | 29 | 30 |
| 11 | 9 | 9 | 0 | 0 | 9 | 26 | 0 | 0 | 0 | 9 | 0 | 0 | 0 | 0 | 0 | 0 | 0 | 0 | 9 | 9 | 26 | 36 | 40 | 44 |
| 0 | 0 | 0 | 0 | 9 | 0 | 9 | 13 | 0 | 0 | 0 | 0 | 0 | 0 | 0 | 0 | 0 | 0 | 0 | 0 | 13 | 24 | 30 | 40 | 53 |
| 0 | 0 | 0 | 0 | 9 | 9 | 0 | 0 | 0 | 9 | 0 | 0 | 0 | 0 | 0 | 9 | 0 | 9 | 9 | 0 | 24 | 24 | 24 | 40 | 44 |
| 0 | 0 | 0 | 0 | 0 | 0 | 0 | 13 | 9 | 0 | 9 | 0 | 0 | 0 | 13 | 0 | 0 | 9 | 0 | 9 | 13 | 24 | 30 | 40 | 35 |
| 0 | 0 | 0 | 0 | 9 | 0 | 0 | 0 | 26 | 9 | 0 | 0 | 9 | 9 | 9 | 0 | 0 | 0 | 0 | 9 | 26 | 19 | 26 | 26 | 29 | 35 |
| 0 | 0 | 0 | 0 | 0 | 13 | 0 | 13 | 19 | 13 | 24 | 13 | 9 | 21 | 26 | 13 | 0 | 13 | 0 | 13 | 0 | 13 | 26 | 21 | 12 | 18 |
| 0 | 0 | 0 | 0 | 0 | 0 | 9 | 26 | 26 | 24 | 24 | 24 | 26 | 26 | 26 | 19 | 26 | 9 | 0 | 0 | 0 | 0 | 9 | 9 | 0 | 0 |
| 0 | 0 | 0 | 0 | 0 | 0 | 9 | 21 | 26 | 30 | 24 | 30 | 36 | 30 | 24 | 13 | 9 | 0 | 9 | 0 | 0 | 13 | 0 | 0 | 0 | 0 |
| 0 | 0 | 0 | 0 | 0 | 0 | 9 | 9 | 26 | 36 | 43 | 43 | 43 | 24 | 24 | 24 | 0 | 9 | 9 | 0 | 9 | 0 | 0 | 0 | 0 | 0 |
| 0 | 0 | 0 | 0 | 0 | 0 | 0 | 13 | 24 | 30 | 43 | 55 | 43 | 30 | 24 | 13 | 0 | 0 | 0 | 0 | 0 | 0 | 0 | 0 | 0 | 9 |
| 0 | 0 | 9 | 0 | 9 | 9 | 0 | 24 | 24 | 24 | 43 | 43 | 43 | 36 | 26 | 9 | 9 | 0 | 0 | 0 | 0 | 0 | 0 | 0 | 0 | 0 |
| 27 | 13 | 0 | 0 | 9 | 0 | 9 | 13 | 24 | 30 | 36 | 30 | 24 | 30 | 26 | 21 | 9 | 0 | 0 | 0 | 0 | 0 | 0 | 0 | 0 | 0 |
| 35 | 18 | 0 | 0 | 0 | 9 | 26 | 19 | 26 | 26 | 26 | 24 | 24 | 24 | 26 | 26 | 9 | 0 | 0 | 0 | 0 | 0 | 0 | 0 | 0 | 0 |
| 26 | 0 | 0 | 13 | 0 | 13 | 0 | 13 | 26 | 21 | 9 | 13 | 24 | 13 | 19 | 13 | 0 | 13 | 0 | 0 | 0 | 0 | 0 | 0 | 0 | 0 |
| 18 | 13 | 26 | 9 | 0 | 0 | 0 | 0 | 9 | 9 | 9 | 0 | 0 | 9 | 26 | 0 | 0 | 0 | 9 | 0 | 0 | 0 | 0 | 0 | 0 | 0 |
| 26 | 13 | 9 | 0 | 9 | 0 | 0 | 13 | 0 | 0 | 0 | 0 | 9 | 0 | 9 | 13 | 0 | 0 | 0 | 0 | 0 | 0 | 0 | 0 | 0 | 18 |
| 26 | 24 | 0 | 9 | 9 | 0 | 9 | 0 | 0 | 0 | 0 | 0 | 9 | 9 | 0 | 0 | 0 | 9 | 9 | 0 | 0 | 0 | 0 | 0 | 23 | 26 |
| 26 | 13 | 0 | 0 | 0 | 0 | 0 | 0 | 0 | 0 | 0 | 0 | 0 | 0 | 13 | 9 | 0 | 9 | 0 | 0 | 0 | 0 | 0 | 13 | 20 | 0 |
| 36 | 9 | 9 | 0 | 0 | 0 | 0 | 0 | 0 | 0 | 0 | 9 | 0 | 0 | 0 | 26 | 9 | 0 | 0 | 9 | 9 | 9 | 0 | 0 | 0 | 0 |
| 45 | 21 | 9 | 0 | 0 | 0 | 0 | 0 | 0 | 0 | 0 | 0 | 0 | 13 | 0 | 13 | 19 | 13 | 24 | 13 | 9 | 21 | 26 | 13 | 9 | 9 |
| 45 | 26 | 9 | 0 | 0 | 0 | 0 | 0 | 0 | 0 | 0 | 0 | 9 | 26 | 26 | 24 | 24 | 24 | 26 | 26 | 26 | 19 | 23 | 27 |
| 27 | 13 | 0 | 13 | 0 | 0 | 0 | 0 | 0 | 0 | 0 | 0 | 0 | 9 | 21 | 26 | 30 | 24 | 30 | 36 | 30 | 24 | 13 | 23 | 36 |
| 13 | 0 | 0 | 20 | 23 | 0 | 0 | 0 | 0 | 0 | 0 | 0 | 0 | 0 | 12 | 29 | 40 | 40 | 40 | 40 | 26 | 20 | 20 | 19 | 50 |
| 0 | 0 | 0 | 0 | 26 | 18 | 0 | 0 | 0 | 0 | 9 | 0 | 0 | 0 | 18 | 35 | 35 | 44 | 53 | 44 | 26 | 0 | 0 | 30 | 40 |

PLUS HALFTONE ERROR DATA

FIG. 12B

| 0|0|0|0|0|0|0|0|0|0|23|40|49|59|59|59|16|25|16|0|0|0|0|0|0|0|
|---|---|---|---|---|---|---|---|---|---|---|---|---|---|---|---|---|---|---|---|---|---|---|---|---|---|
|0|0|0|0|0|0|0|0|0|0|0|25|39|52|59|52|18|0|14|0|0|0|0|0|0|0|
|0|0|0|0|0|0|0|0|0|0|0|0|25|32|25|25|25|10|10|10|0|0|0|0|0|0|
|0|0|10|0|0|0|0|0|0|0|0|0|10|21|25|13|0|0|10|0|0|0|0|0|0|0|
|16|16|10|10|0|0|0|0|0|0|0|10|10|10|0|0|0|0|0|0|0|0|0|0|0|0|
|25|10|10|0|0|0|0|0|0|0|0|10|0|0|0|0|0|0|0|0|0|0|0|0|0|0|
|16|21|25|0|0|0|0|0|0|0|0|0|0|0|0|0|0|0|0|0|0|0|0|0|0|0|
|59|38|25|13|0|0|0|0|0|0|0|0|0|0|0|0|0|0|0|0|0|0|0|0|0|0|
|59|44|25|25|0|0|0|0|0|0|0|0|0|0|0|0|0|0|0|0|0|0|0|0|0|25|
|59|38|32|21|10|0|0|0|0|0|0|0|0|0|0|0|0|0|0|0|0|0|0|0|14|9|
|49|25|25|10|10|10|0|0|0|0|0|0|0|0|0|0|0|0|0|0|0|0|0|10|0|0|
|40|13|0|0|10|0|0|0|0|0|0|0|0|0|0|0|0|10|0|0|13|25|21|0|0|
|23|0|0|0|0|0|0|0|0|0|0|0|0|0|0|10|10|10|25|25|25|32|45|41|
|0|0|0|0|0|0|0|0|0|0|0|0|0|0|0|0|10|21|32|38|44|38|45|49|
|0|0|0|0|0|0|0|0|0|0|0|0|0|0|0|0|25|25|44|44|44|45|58|
|0|0|0|0|0|0|0|0|0|0|0|0|0|0|0|0|13|25|38|44|38|45|50|
|0|0|0|0|0|0|0|0|0|0|0|0|0|0|0|0|0|25|32|25|25|39|16|
|0|0|0|0|0|0|0|0|0|0|0|0|0|0|0|0|0|0|10|21|25|13|0|0|
|0|0|0|0|0|0|0|0|0|10|10|10|0|0|0|0|0|0|0|10|10|10|0|0|0|
|0|0|0|0|10|0|0|13|25|21|10|0|0|0|0|0|0|0|0|0|10|0|0|0|0|0|
|0|0|0|10|10|10|25|25|25|32|25|0|0|0|0|0|0|0|0|0|0|0|0|0|0|0|
|0|0|0|0|10|21|32|38|44|38|25|13|0|0|0|0|0|0|0|0|0|0|0|0|0|0|
|0|0|0|0|0|25|25|44|44|44|25|25|0|0|0|0|0|0|0|0|0|0|0|0|0|0|
|0|0|0|0|0|13|25|38|44|38|32|21|10|0|0|0|0|0|0|0|0|0|0|0|0|0|
|0|0|0|0|0|0|39|45|45|45|45|0|0|14|0|0|0|0|0|0|0|0|0|0|0|0|
|0|0|0|0|0|0|16|50|58|49|41|0|0|9|25|0|0|0|0|0|0|0|0|0|0|0|

MINUS HALFTONE ERROR DATA

FIG. 12C

QUANTIZED DATA OF PLUS HALFTONE ERROR DATA

FIG. 13A

QUANTIZED DATA OF MINUS HALFTONE ERROR DATA

F I G. 13B
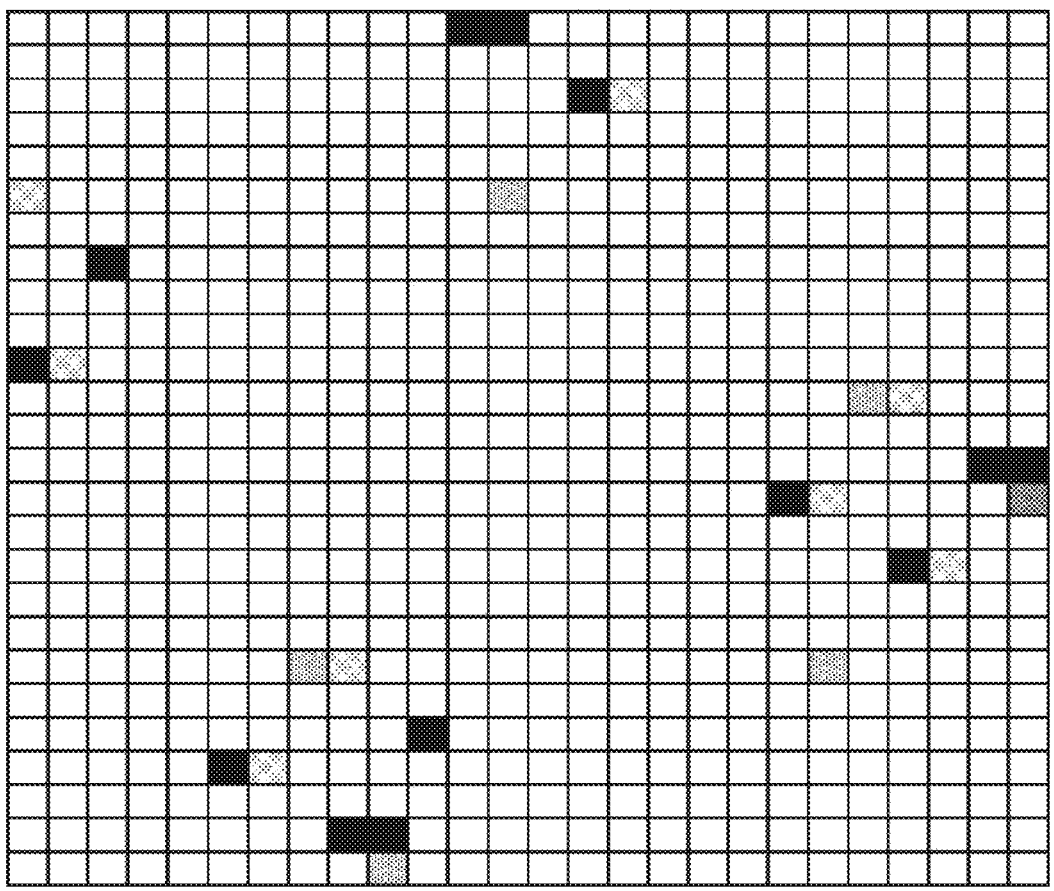

FIG. 13C

| 15 | 10 | 0  | 0  | 0  | 0  | 0  | 0  | 15 | 5  | 1  | 0  | 0  | 0  | 0  | 0  | 15 | 15 | 0  | 0  | 0  | 15 | 15 | 0  | 0  | 0  |
|----|----|----|----|----|----|----|----|----|----|----|----|----|----|----|----|----|----|----|----|----|----|----|----|----|----|
| 0  | 0  | 0  | 12 | 4  | 0  | 0  | 0  | 0  | 0  | 0  | 15 | 15 | 0  | 0  | 0  | 0  | 0  | 0  | 0  | 15 | 0  | 0  | 0  | 0  | 0  |
| 1  | 15 | 15 | 0  | 0  | 0  | 15 | 0  | 0  | 0  | 0  | 0  | 0  | 0  | 0  | 11 | 0  | 0  | 0  | 0  | 15 | 0  | 0  | 0  | 15 | 15 |
| 0  | 0  | 0  | 0  | 0  | 0  | 6  | 0  | 0  | 0  | 0  | 0  | 0  | 0  | 15 | 15 | 0  | 0  | 0  | 0  | 0  | 0  | 0  | 0  | 0  | 10 |
| 0  | 0  | 0  | 0  | 15 | 15 | 0  | 0  | 0  | 15 | 15 | 0  | 0  | 0  | 0  | 0  | 1  | 0  | 15 | 0  | 0  | 0  | 0  | 0  | 0  | 0  |
| 11 | 0  | 0  | 0  | 0  | 0  | 0  | 0  | 0  | 0  | 0  | 0  | 0  | 0  | 0  | 0  | 0  | 0  | 15 | 0  | 0  | 0  | 15 | 7  | 0  | 0  |
| 15 | 0  | 0  | 0  | 6  | 0  | 0  | 0  | 15 | 0  | 0  | 0  | 15 | 15 | 0  | 0  | 0  | 0  | 0  | 1  | 15 | 0  | 0  | 0  | 0  | 0  |
| 0  | 0  | 0  | 15 | 0  | 0  | 0  | 0  | 0  | 0  | 0  | 0  | 0  | 6  | 1  | 1  | 0  | 0  | 0  | 0  | 0  | 0  | 0  | 0  | 0  | 13 |
| 0  | 0  | 15 | 15 | 0  | 0  | 0  | 15 | 4  | 0  | 0  | 0  | 0  | 0  | 0  | 0  | 15 | 0  | 0  | 0  | 0  | 0  | 1  | 15 | 15 | 0  |
| 0  | 0  | 0  | 0  | 0  | 0  | 15 | 0  | 0  | 0  | 0  | 0  | 0  | 0  | 0  | 9  | 0  | 1  | 15 | 0  | 0  | 0  | 0  | 0  | 0  | 0  |
| 0  | 11 | 0  | 0  | 0  | 15 | 0  | 0  | 0  | 15 | 15 | 1  | 0  | 0  | 0  | 0  | 0  | 15 | 0  | 0  | 0  | 0  | 0  | 0  | 0  | 0  |
| 15 | 15 | 0  | 0  | 0  | 0  | 0  | 0  | 0  | 0  | 0  | 12 | 0  | 0  | 0  | 0  | 0  | 0  | 0  | 0  | 1  | 6  | 11 | 0  | 0  | 0  |
| 0  | 0  | 1  | 0  | 15 | 0  | 0  | 0  | 0  | 0  | 0  | 0  | 15 | 4  | 1  | 15 | 0  | 0  | 0  | 0  | 15 | 15 | 0  | 0  | 0  | 0  |
| 0  | 0  | 0  | 0  | 15 | 0  | 0  | 0  | 15 | 7  | 0  | 0  | 0  | 0  | 0  | 0  | 15 | 0  | 0  | 0  | 0  | 0  | 0  | 0  | 0  | 0  |
| 0  | 0  | 0  | 0  | 0  | 1  | 15 | 0  | 0  | 0  | 0  | 0  | 0  | 0  | 0  | 0  | 6  | 0  | 1  | 0  | 11 | 0  | 0  | 0  | 15 | 1  |
| 1  | 0  | 0  | 0  | 0  | 0  | 0  | 0  | 0  | 0  | 0  | 9  | 3  | 0  | 0  | 0  | 0  | 0  | 0  | 15 | 15 | 0  | 0  | 0  | 0  | 0  |
| 0  | 0  | 15 | 0  | 0  | 0  | 0  | 0  | 1  | 15 | 15 | 0  | 0  | 0  | 15 | 0  | 0  | 0  | 0  | 0  | 0  | 0  | 0  | 0  | 11 | 0  |
| 0  | 9  | 0  | 1  | 15 | 0  | 0  | 0  | 0  | 0  | 0  | 0  | 0  | 6  | 0  | 0  | 0  | 0  | 0  | 0  | 0  | 0  | 15 | 15 | 0  | 0  |
| 0  | 0  | 0  | 0  | 15 | 0  | 0  | 0  | 0  | 0  | 0  | 0  | 15 | 15 | 0  | 0  | 0  | 15 | 15 | 0  | 0  | 0  | 0  | 0  | 1  | 0  |
| 0  | 0  | 0  | 0  | 0  | 0  | 1  | 6  | 11 | 0  | 0  | 0  | 0  | 0  | 0  | 0  | 0  | 0  | 0  | 0  | 0  | 0  | 0  | 0  | 0  | 0  |
| 12 | 1  | 15 | 0  | 0  | 0  | 0  | 15 | 15 | 0  | 0  | 0  | 6  | 0  | 0  | 0  | 15 | 0  | 0  | 0  | 15 | 15 | 0  | 0  | 0  | 0  |
| 4  | 0  | 15 | 0  | 0  | 0  | 0  | 0  | 0  | 0  | 0  | 15 | 0  | 0  | 0  | 0  | 0  | 0  | 0  | 0  | 0  | 6  | 1  | 1  | 0  | 0  |
| 0  | 0  | 6  | 0  | 1  | 0  | 11 | 0  | 0  | 0  | 15 | 15 | 0  | 0  | 0  | 15 | 4  | 0  | 0  | 0  | 0  | 0  | 0  | 0  | 15 | 0  |
| 0  | 0  | 0  | 0  | 0  | 15 | 15 | 0  | 0  | 0  | 0  | 0  | 0  | 0  | 15 | 0  | 0  | 0  | 0  | 0  | 0  | 0  | 0  | 9  | 2  | 1  |
| 15 | 0  | 0  | 0  | 0  | 0  | 0  | 0  | 0  | 0  | 0  | 0  | 0  | 0  | 15 | 0  | 0  | 0  | 15 | 15 | 1  | 0  | 0  | 0  | 0  | 0  |
| 0  | 0  | 0  | 0  | 0  | 0  | 0  | 15 | 8  | 0  | 0  | 0  | 0  | 0  | 0  | 0  | 0  | 0  | 0  | 10 | 0  | 0  | 0  | 0  | 0  | 0  |

TONALITY KEEPING DATA G

F I G. 14A

| p1 | p2 | p3 |
|----|----|----|
| p4 | p5 | p6 |
| p7 | p8 | p9 |

F I G. 14B

| −1 | −1 | −1 |
|----|----|----|
| −1 | 8  | −1 |
| −1 | −1 | −1 |

F I G. 14C

→ MAIN SCANNING DIRECTION

↓ SUB-SCANNING DIRECTION

| 2/32 | 7/32 | 2/32 |
|------|------|------|
| 5/32 | 0    | 5/32 |
| 2/32 | 7/32 | 2/32 |

IMAGE DATA K₁

FIG. 18C

HALFTONE IMAGE DATA HT

| -4 | -7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|
| -11 | -32 | -18 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -28 | -24 | -39 | -34 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -35 | -24 | -16 | -20 | -34 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | -16 | -5 | -5 | 0 | -14 | -10 | 0 | 0 | 0 | 0 | 0 | 0 | 0 | 0 | 0 | 0 | 0 | 0 | 0 | 0 | 0 | 0 | 0 | 0 | 0 |
| 32 | 17 | -5 | 8 | 8 | 8 | -7 | -22 | 0 | 0 | 0 | 0 | 0 | 0 | 0 | 0 | 0 | 0 | 0 | 0 | 0 | 0 | 0 | 0 | 0 | 0 |
| 0 | 14 | 29 | 8 | 8 | 8 | 15 | 0 | -14 | 0 | 0 | 0 | 0 | 0 | 0 | 0 | 0 | 0 | 0 | 0 | 0 | 0 | 0 | 0 | 0 | 0 |
| 0 | 0 | 7 | 22 | 17 | 15 | 15 | 23 | 17 | 3 | 0 | 0 | 0 | 0 | 0 | 0 | 0 | 0 | 0 | 0 | 0 | 0 | 0 | 0 | 0 | 0 |
| 0 | 0 | 0 | 0 | 22 | 36 | 23 | 32 | 32 | 36 | 22 | 0 | 0 | 0 | 0 | 0 | 0 | 0 | 0 | 0 | 0 | 0 | 0 | 0 | 0 | 0 |
| 0 | 0 | 0 | 0 | 0 | 22 | 36 | 32 | 44 | 44 | 36 | 22 | 7 | 0 | 0 | 0 | 0 | 0 | 0 | 0 | 0 | 0 | 0 | 0 | 0 | 0 |
| 0 | 0 | 0 | 0 | 0 | 0 | 14 | 29 | 44 | 36 | 36 | 44 | 29 | 14 | 0 | 0 | 0 | 0 | 0 | 0 | 0 | 0 | 0 | 0 | 0 | 0 |
| 0 | 0 | 0 | 0 | 0 | 0 | 0 | 7 | 22 | 36 | 44 | 44 | 44 | 36 | 22 | 7 | 0 | 0 | 0 | 0 | 0 | 0 | 0 | 0 | 0 | 0 |
| 0 | 0 | 0 | 0 | 0 | 0 | 0 | 0 | 22 | 36 | 44 | 44 | 44 | 44 | 29 | 14 | 0 | 0 | 0 | 0 | 0 | 0 | 0 | 0 | 0 | 0 |
| 0 | 0 | 0 | 0 | 0 | 0 | 0 | 0 | 0 | 14 | 29 | 44 | 44 | 44 | 32 | 36 | 22 | 0 | 0 | 0 | 0 | 0 | 0 | 0 | 0 | 0 |
| 0 | 0 | 0 | 0 | 0 | 0 | 0 | 0 | 0 | 0 | 7 | 22 | 36 | 32 | 32 | 40 | 36 | 22 | 0 | 0 | 0 | 0 | 0 | 0 | 0 | 0 |
| 0 | 0 | 0 | 0 | 0 | 0 | 0 | 0 | 0 | 0 | 0 | 0 | 3 | 17 | 40 | 32 | 20 | 17 | 22 | 0 | 0 | 0 | 0 | 0 | 0 | 0 |
| 0 | 0 | 0 | 0 | 0 | 0 | 0 | 0 | 0 | 0 | 0 | 0 | 0 | 3 | 17 | 20 | 12 | 1 | 17 | 22 | 0 | 0 | 0 | 0 | 0 | 0 |
| 0 | 0 | 0 | 0 | 0 | 0 | 0 | 0 | 0 | 0 | 0 | 0 | 0 | 0 | -17 | -3 | 1 | -7 | -7 | -3 | 3 | 7 | 0 | 0 | 0 | 0 |
| 0 | 0 | 0 | 0 | 0 | 0 | 0 | 0 | 0 | 0 | 0 | 0 | 0 | 0 | 0 | -17 | -22 | -7 | -14 | -14 | -14 | 10 | 14 | 0 | 0 | 0 |
| 0 | 0 | 0 | 0 | 0 | 0 | 0 | 0 | 0 | 0 | 0 | 0 | 0 | 0 | 0 | 0 | -25 | -29 | -14 | -14 | -14 | -24 | -3 | 3 | 0 | 0 |
| 0 | 0 | 0 | 0 | 0 | 0 | 0 | 0 | 0 | 0 | 0 | 0 | 0 | 0 | 0 | 0 | 0 | -12 | -17 | -22 | -24 | -24 | -36 | -23 | 4 | 0 |
| 0 | 0 | 0 | 0 | 0 | 0 | 0 | 0 | 0 | 0 | 0 | 0 | 0 | 0 | 0 | 0 | 0 | 0 | 0 | -34 | -39 | -36 | -44 | -47 | -43 | 0 |
| 0 | 0 | 0 | 0 | 0 | 0 | 0 | 0 | 0 | 0 | 0 | 0 | 0 | 0 | 0 | 0 | 0 | 0 | 0 | 0 | -34 | -39 | -44 | -45 | -43 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | -22 | -36 | -31 | -7 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | -13 | -15 | 12 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

HALFTONE ERROR DATA HTE

FIG. 19B
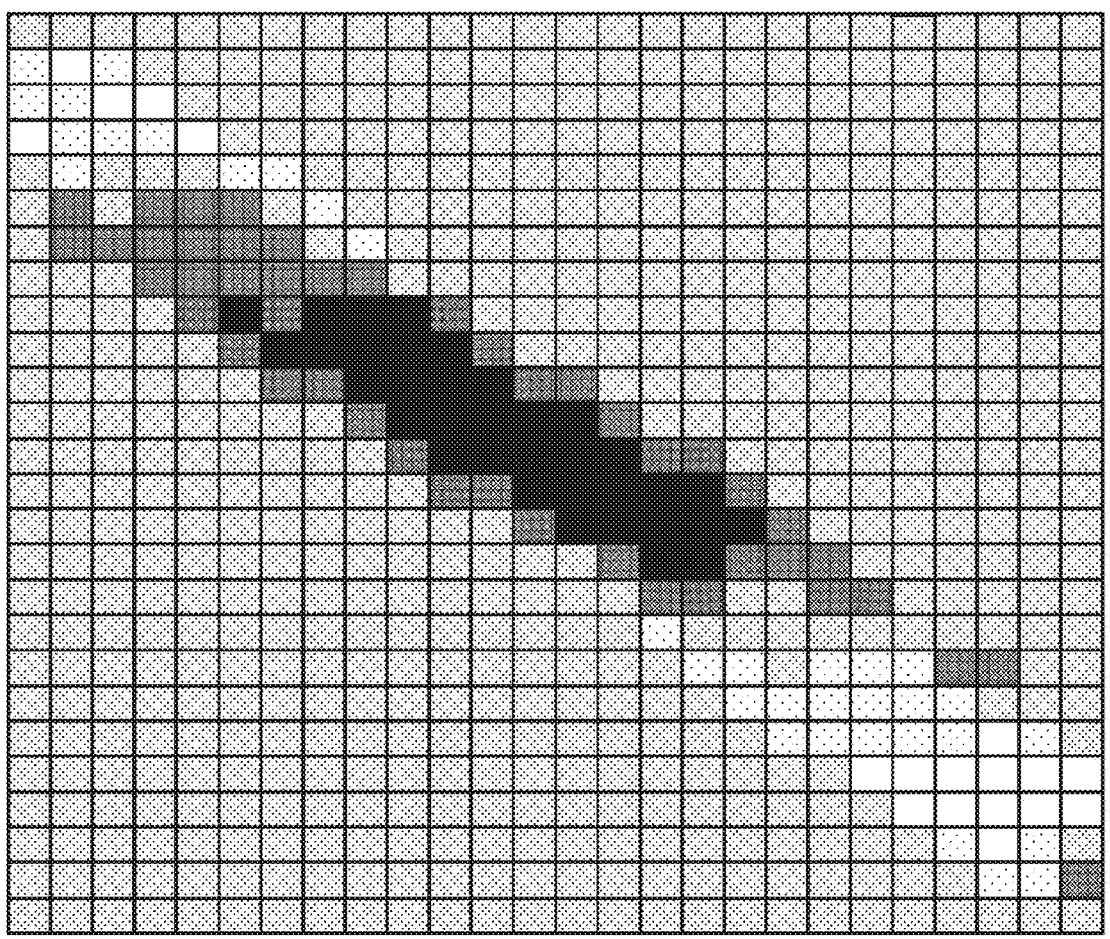
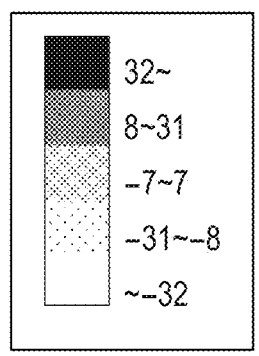

FIG. 19C

TONALITY KEEPING DATA G

FIG. 20A

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|
| 96 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 96 | 96 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 96 | 96 | 96 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 96 | 96 | 96 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 96 | 96 | 96 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 96 | 96 | 96 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 96 | 96 | 96 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 96 | 96 | 96 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 96 | 96 | 96 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 96 | 96 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 96 | 96 | 96 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 96 | 96 | 96 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 96 | 96 | 96 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 96 | 96 | 96 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 96 | 96 | 96 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 96 | 96 | 96 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 96 | 96 | 96 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 96 | 96 | 96 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 96 | 96 | 96 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 96 | 96 | 96 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 96 | 96 | 96 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 96 | 96 | 96 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 96 | 96 | 96 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 96 | 96 | 96 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

2001

TONE CHANGE DATA RLv

FIG. 20B

2002
RESOLUTION KEEPING DATA R

F I G. 21A

2101

MIXING RATIO α

F I G. 21B

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|
| 0.4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0.4 | 0.4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0.4 | 0.4 | 0.4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0.4 | 0.4 | 0.4 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0.4 | 0.5 | 0.5 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0.5 | 0.5 | 0.6 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0.6 | 0.6 | 0.7 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0.7 | 0.8 | 0.8 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0.8 | 1 | 1 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0.9 | 0.9 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 1 | 0.8 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0.8 | 0.8 | 0.9 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0.9 | 0.8 | 0.7 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0.7 | 0.6 | 0.4 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0.4 | 0.4 | 0.4 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0.4 | 0.4 | 0.4 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0.4 | 0.4 | 0.4 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0.4 | 0.4 | 0.4 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0.4 | 0.4 | 0.4 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0.4 | 0.4 | 0.4 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0.4 | 0.4 | 0.4 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

2201

MIXING RATIO α

FIG. 22A

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|
| 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9 | 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 10 | 12 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 3 | 2 | 11 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 3 | 4 | 12 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 3 | 4 | 11 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 3 | 2 | 12 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 3 | 10 | 9 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 3 | 5 | 3 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 3 | 12 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 3 | 5 | 3 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 3 | 4 | 12 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 3 | 5 | 3 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 3 | 2 | 12 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 12 | 2 | 3 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 3 | 2 | 3 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 12 | 10 | 3 | 0 | 0 | 0 | 0 | 0 | 0 |
| 0 | 0 | 0 | 0 | 0 | 0 | 0 | 0 | 0 | 0 | 0 | 0 | 0 | 0 | 0 | 12 | 4 | 3 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 6 | 12 | 3 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 12 | 2 | 3 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 11 | 2 | 3 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 12 | 10 | 3 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

IMAGE DATA $K_2$

F I G. 22B
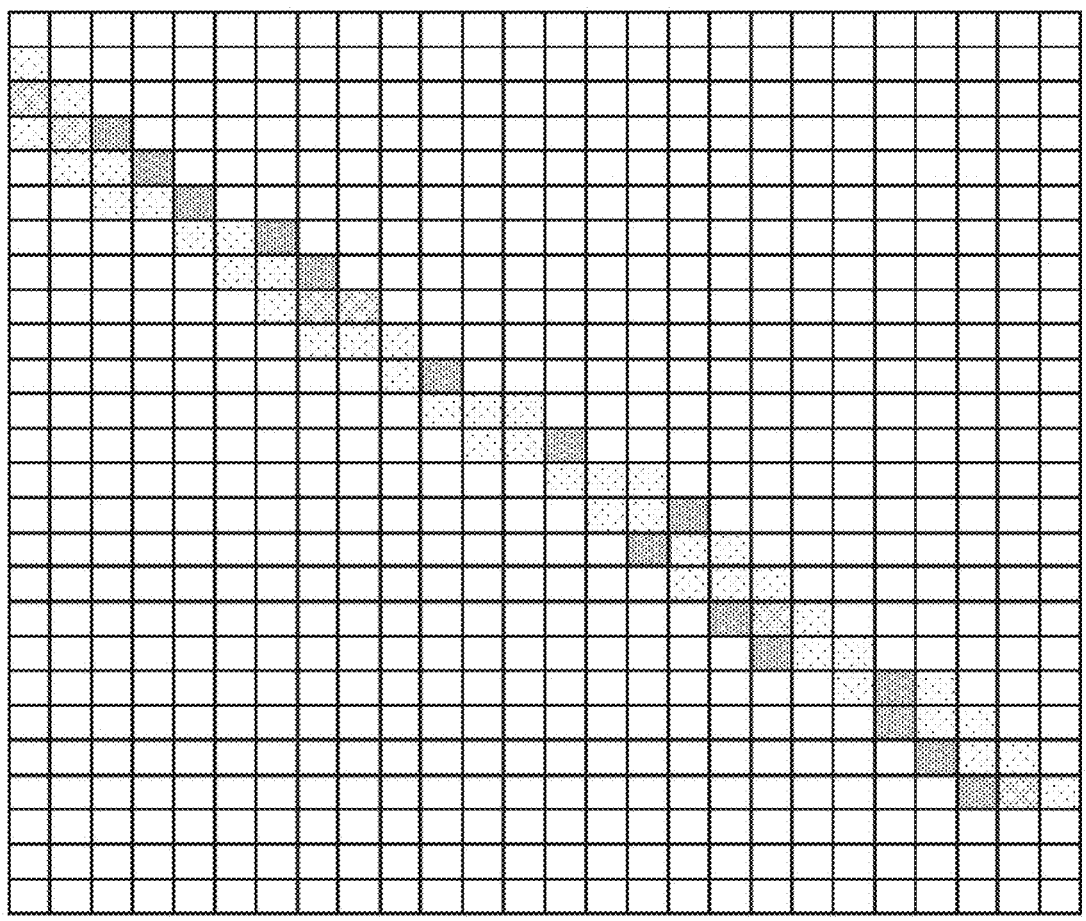

FIG. 22C

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|
| 5 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 7 | 3 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7 | 14 | 15 | 4 | 0 | 0 | 0 | 0 | 0 | 0 | 0 | 0 | 0 | 0 | 0 | 0 | 0 | 0 | 0 | 0 | 0 | 0 | 0 | 0 |
| 1 | 6 | 8 | 13 | 4 | 0 | 0 | 0 | 0 | 0 | 0 | 0 | 0 | 0 | 0 | 0 | 0 | 0 | 0 | 0 | 0 | 0 | 0 | 0 |
| 0 | 1 | 4 | 9 | 14 | 3 | 2 | 0 | 0 | 0 | 0 | 0 | 0 | 0 | 0 | 0 | 0 | 0 | 0 | 0 | 0 | 0 | 0 | 0 |
| 0 | 0 | 0 | 2 | 6 | 7 | 13 | 4 | 0 | 0 | 0 | 0 | 0 | 0 | 0 | 0 | 0 | 0 | 0 | 0 | 0 | 0 | 0 | 0 |
| 0 | 0 | 0 | 0 | 1 | 5 | 8 | 15 | 4 | 0 | 0 | 0 | 0 | 0 | 0 | 0 | 0 | 0 | 0 | 0 | 0 | 0 | 0 | 0 |
| 0 | 0 | 0 | 0 | 0 | 1 | 6 | 15 | 12 | 2 | 0 | 0 | 0 | 0 | 0 | 0 | 0 | 0 | 0 | 0 | 0 | 0 | 0 | 0 |
| 0 | 0 | 0 | 0 | 0 | 0 | 1 | 6 | 8 | 5 | 3 | 0 | 0 | 0 | 0 | 0 | 0 | 0 | 0 | 0 | 0 | 0 | 0 | 0 |
| 0 | 0 | 0 | 0 | 0 | 0 | 0 | 0 | 1 | 6 | 13 | 3 | 0 | 0 | 0 | 0 | 0 | 0 | 0 | 0 | 0 | 0 | 0 | 0 |
| 0 | 0 | 0 | 0 | 0 | 0 | 0 | 0 | 0 | 1 | 6 | 7 | 5 | 3 | 0 | 0 | 0 | 0 | 0 | 0 | 0 | 0 | 0 | 0 |
| 0 | 0 | 0 | 0 | 0 | 0 | 0 | 0 | 0 | 0 | 1 | 5 | 7 | 13 | 3 | 0 | 0 | 0 | 0 | 0 | 0 | 0 | 0 | 0 |
| 0 | 0 | 0 | 0 | 0 | 0 | 0 | 0 | 0 | 0 | 0 | 2 | 6 | 7 | 5 | 3 | 0 | 0 | 0 | 0 | 0 | 0 | 0 | 0 |
| 0 | 0 | 0 | 0 | 0 | 0 | 0 | 0 | 0 | 0 | 0 | 0 | 1 | 5 | 8 | 13 | 2 | 0 | 0 | 0 | 0 | 0 | 0 | 0 |
| 0 | 0 | 0 | 0 | 0 | 0 | 0 | 0 | 0 | 0 | 0 | 0 | 0 | 2 | 13 | 7 | 4 | 1 | 0 | 0 | 0 | 0 | 0 | 0 |
| 0 | 0 | 0 | 0 | 0 | 0 | 0 | 0 | 0 | 0 | 0 | 0 | 0 | 0 | 3 | 5 | 6 | 6 | 1 | 0 | 0 | 0 | 0 | 0 |
| 0 | 0 | 0 | 0 | 0 | 0 | 0 | 0 | 0 | 0 | 0 | 0 | 0 | 0 | 0 | 2 | 15 | 15 | 6 | 1 | 0 | 0 | 0 | 0 |
| 0 | 0 | 0 | 0 | 0 | 0 | 0 | 0 | 0 | 0 | 0 | 0 | 0 | 0 | 0 | 5 | 15 | 8 | 5 | 3 | 1 | 0 | 0 | 0 |
| 0 | 0 | 0 | 0 | 0 | 0 | 0 | 0 | 0 | 0 | 0 | 0 | 0 | 0 | 0 | 0 | 2 | 2 | 9 | 15 | 6 | 1 | 0 | 0 |
| 0 | 0 | 0 | 0 | 0 | 0 | 0 | 0 | 0 | 0 | 0 | 0 | 0 | 0 | 0 | 0 | 0 | 3 | 15 | 8 | 4 | 1 | 0 | 0 |
| 0 | 0 | 0 | 0 | 0 | 0 | 0 | 0 | 0 | 0 | 0 | 0 | 0 | 0 | 0 | 0 | 0 | 0 | 4 | 13 | 8 | 6 | 1 | 0 |
| 0 | 0 | 0 | 0 | 0 | 0 | 0 | 0 | 0 | 0 | 0 | 0 | 0 | 0 | 0 | 0 | 0 | 0 | 0 | 4 | 14 | 13 | 4 | 0 |
| 0 | 0 | 0 | 0 | 0 | 0 | 0 | 0 | 0 | 0 | 0 | 0 | 0 | 0 | 0 | 0 | 0 | 0 | 0 | 0 | 3 | 3 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

IMAGE TO BE FORMED

FIG. 23A

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|
| 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9 | 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 10 | 12 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 3 | 2 | 11 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 3 | 5 | 11 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 4 | 5 | 10 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 5 | 3 | 10 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 6 | 6 | 9 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 7 | 10 | 9 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 8 | 9 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 9 | 10 | 9 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 9 | 10 | 9 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 9 | 10 | 7 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 7 | 4 | 9 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 9 | 4 | 6 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 6 | 2 | 3 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 12 | 10 | 3 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 12 | 4 | 3 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 6 | 12 | 3 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 12 | 2 | 3 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 11 | 2 | 3 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 12 | 10 | 3 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

IMAGE DATA K$_2$

FIG. 23C

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|
| 5 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 7 | 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7 | 14 | 15 | 4 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 6 | 8 | 14 | 4 | 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 5 | 9 | 13 | 3 | 2 | 0 | 0 | 0 | 0 | 0 | 0 | 0 | 0 | 0 | 0 | 0 | 0 | 0 | 0 | 0 | 0 | 0 | 0 |
| 0 | 0 | 0 | 2 | 7 | 9 | 12 | 3 | 0 | 0 | 0 | 0 | 0 | 0 | 0 | 0 | 0 | 0 | 0 | 0 | 0 | 0 | 0 | 0 | 0 |
| 0 | 0 | 0 | 0 | 1 | 7 | 9 | 13 | 3 | 0 | 0 | 0 | 0 | 0 | 0 | 0 | 0 | 0 | 0 | 0 | 0 | 0 | 0 | 0 | 0 |
| 0 | 0 | 0 | 0 | 0 | 2 | 8 | 12 | 13 | 4 | 0 | 0 | 0 | 0 | 0 | 0 | 0 | 0 | 0 | 0 | 0 | 0 | 0 | 0 | 0 |
| 0 | 0 | 0 | 0 | 0 | 0 | 2 | 10 | 15 | 13 | 3 | 0 | 0 | 0 | 0 | 0 | 0 | 0 | 0 | 0 | 0 | 0 | 0 | 0 | 0 |
| 0 | 0 | 0 | 0 | 0 | 0 | 0 | 2 | 4 | 12 | 13 | 4 | 2 | 0 | 0 | 0 | 0 | 0 | 0 | 0 | 0 | 0 | 0 | 0 | 0 |
| 0 | 0 | 0 | 0 | 0 | 0 | 0 | 0 | 0 | 3 | 13 | 15 | 13 | 4 | 0 | 0 | 0 | 0 | 0 | 0 | 0 | 0 | 0 | 0 | 0 |
| 0 | 0 | 0 | 0 | 0 | 0 | 0 | 0 | 0 | 0 | 4 | 13 | 15 | 13 | 4 | 2 | 0 | 0 | 0 | 0 | 0 | 0 | 0 | 0 | 0 |
| 0 | 0 | 0 | 0 | 0 | 0 | 0 | 0 | 0 | 0 | 0 | 2 | 4 | 13 | 14 | 10 | 3 | 0 | 0 | 0 | 0 | 0 | 0 | 0 | 0 |
| 0 | 0 | 0 | 0 | 0 | 0 | 0 | 0 | 0 | 0 | 0 | 0 | 0 | 3 | 11 | 10 | 11 | 2 | 0 | 0 | 0 | 0 | 0 | 0 | 0 |
| 0 | 0 | 0 | 0 | 0 | 0 | 0 | 0 | 0 | 0 | 0 | 0 | 0 | 3 | 11 | 10 | 8 | 1 | 0 | 0 | 0 | 0 | 0 | 0 | 0 |
| 0 | 0 | 0 | 0 | 0 | 0 | 0 | 0 | 0 | 0 | 0 | 0 | 0 | 3 | 8 | 8 | 6 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 3 | 15 | 15 | 6 | 1 | 0 | 0 | 0 | 0 | 0 | 0 |
| 0 | 0 | 0 | 0 | 0 | 0 | 0 | 0 | 0 | 0 | 0 | 0 | 0 | 0 | 0 | 5 | 15 | 8 | 5 | 3 | 1 | 0 | 0 | 0 | 0 |
| 0 | 0 | 0 | 0 | 0 | 0 | 0 | 0 | 0 | 0 | 0 | 0 | 0 | 0 | 0 | 0 | 2 | 2 | 9 | 15 | 6 | 1 | 0 | 0 | 0 |
| 0 | 0 | 0 | 0 | 0 | 0 | 0 | 0 | 0 | 0 | 0 | 0 | 0 | 0 | 0 | 0 | 0 | 0 | 3 | 15 | 8 | 4 | 1 | 0 | 0 |
| 0 | 0 | 0 | 0 | 0 | 0 | 0 | 0 | 0 | 0 | 0 | 0 | 0 | 0 | 0 | 0 | 0 | 0 | 0 | 4 | 13 | 8 | 6 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 4 | 14 | 13 | 4 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 3 | 3 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

F I G. 23D
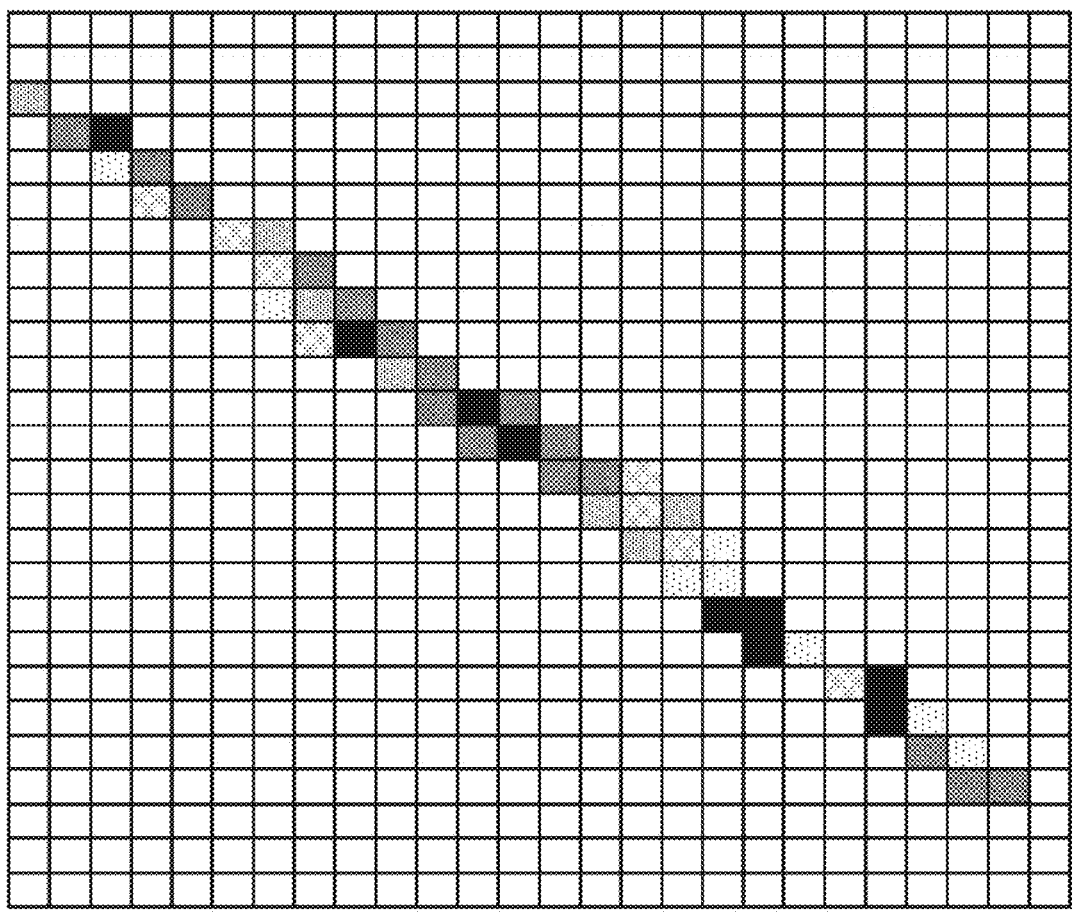
IMAGE TO BE FORMED

IMAGE PROCESSING APPARATUS FOR EXECUTING HALFTONE PROCESSING, IMAGE PROCESSING SYSTEM, IMAGE PROCESSING METHOD, PROGRAM PRODUCT, AND COMPUTER-READABLE STORAGE MEDIUM

BACKGROUND OF THE INVENTION

1. Field of the Invention

The present invention relates to an image processing technique for suppressing image quality deterioration caused by halftone processing.

2. Description of the Related Art

In recent years, an image based on data processed by a personal computer (PC) is popularly printed on a printing material. Note that the number of tones of each pixel which can be expressed by a printing apparatus is normally smaller than the number of tones of each pixel which can be expressed by a PC. When image data is output to such printing apparatus, halftone processing for converting multi-tone image data into image data of a smaller number of tones is executed. As one halftone processing, an ordered dither method which decides an output value (quantized value) by periodically repeated comparison between a threshold and input value is known. As is known, the ordered dither method causes image quality deterioration corresponding to a difference between the threshold and a spatial frequency when an input image includes frequency components close to the spatial frequency corresponding to a period of the threshold. More specifically, jaggy of characters, disconnection of thin lines, interference fringes (moiré) with an input image, and the like are generated, and image quality deterioration which lowers an apparent resolution of an output image is caused.

In order to suppress such image quality deterioration, Japanese Patent Laid-Open No. 2011-155632 has proposed a technique for suppressing image quality deterioration by replacing a portion with a large error value by the ordered dither method in an image by data by another halftone processing method. On the other hand, Japanese Patent Laid-Open No. 2002-044449 has proposed a technique for deciding a weighting coefficient based on a size of an edge in image data, and deciding a pixel value to be output from pixel values of two halftone processes having different frequency components in accordance with the decided weighting coefficient. More specifically, as for a pixel having an edge larger than those of neighboring pixels, a weighting coefficient of the halftone process having a high frequency component is increased. Thus, a resolution of an edge portion which cannot be reproduced by the halftone process having a low frequency component is maintained.

Since the arrangement of Japanese Patent Laid-Open No. 2011-155632 performs correction using the periodic component of the threshold of the ordered dither method, when an image to be printed changes at a period shorter than that of the threshold used in the ordered dither method, its shape cannot be maintained. By contrast, the arrangement of Japanese Patent Laid-Open No. 2002-044449 performs correction of a deterioration portion while keeping a resolution of an image to be printed. However, in an electrophotographic image forming apparatus, a developing agent image of a certain pixel may often vary due to the influences of neighboring pixels, and the arrangement of Japanese Patent Laid-Open No. 2002-044449 cannot stably reproduce a shape of an edge portion.

SUMMARY OF THE INVENTION

The present invention provides an image processing apparatus, system, method, and program product which suppress deterioration of image quality when an electrophotographic image forming apparatus prints an image.

According to an image processing apparatus includes: a halftone processor configured to apply halftone processing to input image data, and to output halftone image data; an error detector configured to detect errors of respective pixels generated by the halftone processing of the halftone processor by evaluating differences between the input image data and the halftone image data, and to output the errors as error data; a first processor configured to apply correction processing to the halftone image data using the error data, and to output first image data; a second processor configured to apply halftone processing of a higher resolution than the halftone processing of the halftone processor to the input image data, and to output second image data; a change detector configured to detect, from a pixel value of a pixel of the input image data and pixel values of pixels in a first range with reference to that pixel, a change amount of a pixel value at that pixel, and to output change data including change amounts of pixel values at respective pixels; a decision unit configured to decide, for each pixel, a mixing ratio of that pixel using a value based on a sum of an error of the pixel detected by the error detector and a change amount of a pixel value at that pixel detected by the change detector; and a mixing unit configured to mix pixel values of the first image data and the second image data according to the mixing ratios to generate output image data. When the value based on the sum is increased, the mixing ratio of the second image data decided by the decision unit remains the same or is increased.

Further features of the present invention will become apparent from the following description of exemplary embodiments with reference to the attached drawings.

BRIEF DESCRIPTION OF THE DRAWINGS

FIGS. 7A to 7E show halftone tables according to one embodiment;

FIGS. 8A and 8B show filters according to one embodiment;

FIGS. 10A to 10D show image data and halftone image data according to one embodiment;

FIGS. 11A to 11D show image data obtained by applying filter processing to the image data shown in FIG. 10A and halftone error data;

FIGS. 12A to 12D show data generated by the tonality keeping processor according to one embodiment;

FIGS. 13A to 13D show data generated by the tonality keeping processor according to one embodiment;

FIGS. 14A to 14C are views for explaining processing in a tone change detector according to one embodiment;

FIGS. 18A to 18D show exemplary input data to the image processor and exemplary data generated by respective units of the image processor;

FIGS. 19A to 19D show exemplary data generated by respective units of the image processor;

FIGS. 20A and 20B show exemplary data generated by respective units of the image processor;

FIGS. 21A and 21B show exemplary data generated by respective units of the image processor;

FIGS. 22A to 22D show exemplary data generated by respective units of the image processor;

FIGS. 23A to 23D show exemplary data generated by respective units of the image processor;

DESCRIPTION OF THE EMBODIMENTS

Exemplary embodiments of the present invention will be described hereinafter with reference to the drawings. Note that the following embodiments are presented for the purpose of understanding of the present invention and are not intended to limit the present invention. Also, in the following drawings, components which are not required to describe embodiments are omitted from the drawings.

First Embodiment

Figure 2:
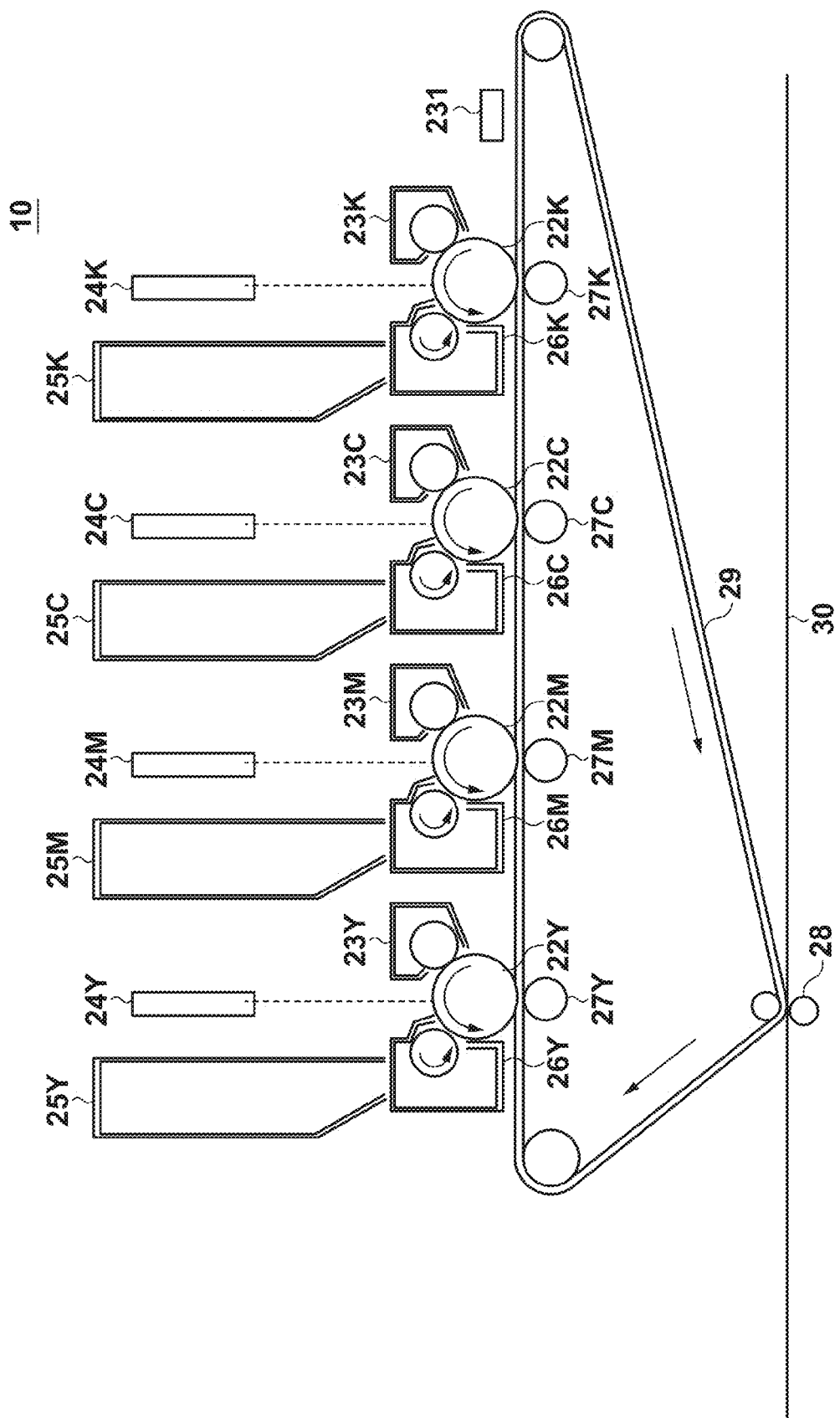
FIG. 2 is a view showing the arrangement of an image forming unit of an image forming apparatus according to one embodiment.

An image forming apparatus 10 according to this embodiment will be described first with reference to FIG. 2. The image forming apparatus 10 forms a color (multi-color) image on a printing material using developing agents (toners) of four colors, that is, yellow (Y), magenta (M), cyan (C), and black (K), so as to form an image on the printing material (printing medium). Note that suffixes Y, M, C, and K of reference numerals in FIG. 2 respectively indicate that corresponding components are used to form yellow, magenta, cyan, and black toner images on an intermediate transfer member 29 (intermediate transfer belt). Note that when colors need not be distinguished from each other, reference numerals without suffixes Y, M, C, and K are used.

A charging unit 23 charges a surface of a photosensitive member 22 which is rotated, and an exposure unit 24 forms an electrostatic latent image on the surface of the photosensitive member 22 by scanning and exposing the surface of the photosensitive member 22 with a laser beam. A developing unit 26 contains a toner of a corresponding color, and supplies the toner to the electrostatic latent image on the surface of the photosensitive member 22 as an image carrier, thus forming a toner image. Note that reference numeral 25 denotes a toner cartridge which supplies the toner to the developing unit 26.

A primary transfer unit 27 transfers the toner image formed on the corresponding photosensitive member 22 onto the intermediate transfer member 29 as an image carrier. The intermediate transfer member 29 is extended by a plurality of rollers, and is rotated in a direction of an arrow in FIG. 2 upon rotation of a driving roller of those rollers. The respective primary transfer units 27 transfer toner images formed on the photosensitive members 22 of the respective colors onto the intermediate transfer member 29 to overlap each other, thereby forming a color image on the intermediate transfer member 29.

A secondary transfer unit 28 transfers the toner image formed on the intermediate transfer member 29 onto a printing material conveyed along a conveyance path 30. The toner image transferred onto the printing material is then fixed by a fixing unit (not shown). A sensor 231 is arranged for the purpose of density control. The sensor 231 irradiates a test toner image formed on the intermediate transfer belt 29 with light, and receives the reflected light, thereby detecting the density of the test toner image. Note that the image forming apparatus 10 shown in FIG. 2 uses the intermediate transfer member 29, but toner images formed on the respective photosensitive members 22 may be directly transferred onto a printing material.

Processes to be executed in the image forming apparatus 10 and a host PC 210 which controls the image forming apparatus 10 to execute print processing will be described below with reference to FIG. 3.

An application 301 such as document creation software or graphics drawing software, which is running on the host PC 210, outputs print rendering data and control data to a PDL (Page Description Language) converter 302 which is implemented by a printer driver. The rendering data includes, for example, pixel values (to be also referred to as tone values) of an image to be printed and attribute information. The attribute information is required to identify, for example, an image type (text, graphics, or image). The control data includes, for example, a size of a printing material used in printing, the number of copies to be printed, and the like. The PDL converter 302 converts the rendering data into compressed data to generate PDL data including the converted data and control data, and transmits the PDL data to the image forming apparatus 10.

In a CPU 225 of the image forming apparatus 10, a renderer 303 and control information generator 304 are implemented by executing control programs. The renderer 303 expands the compressed data included in the PDL data received from the host PC 210 to the rendering data, and stores the rendering data in a RAM 222. In this embodiment, assume that the rendering data is RGB data expressed on an RGB color space. The rendering data stored in the RAM 222 is output to an ASIC (Application Specific Integrated Circuit). The control information generator 304 generates control information used in the ASIC from the control data included in the received PDL data, and outputs the control information to the ASIC. Furthermore, the control information generator 304 also outputs control information, which is saved in a ROM 221 and is required for processing in the ASIC, to the ASIC. Note that the control information saved in the ROM 221 includes, for example, a color conversion table, gamma correction table, halftone table, filter table, and the like.

Figure 3:
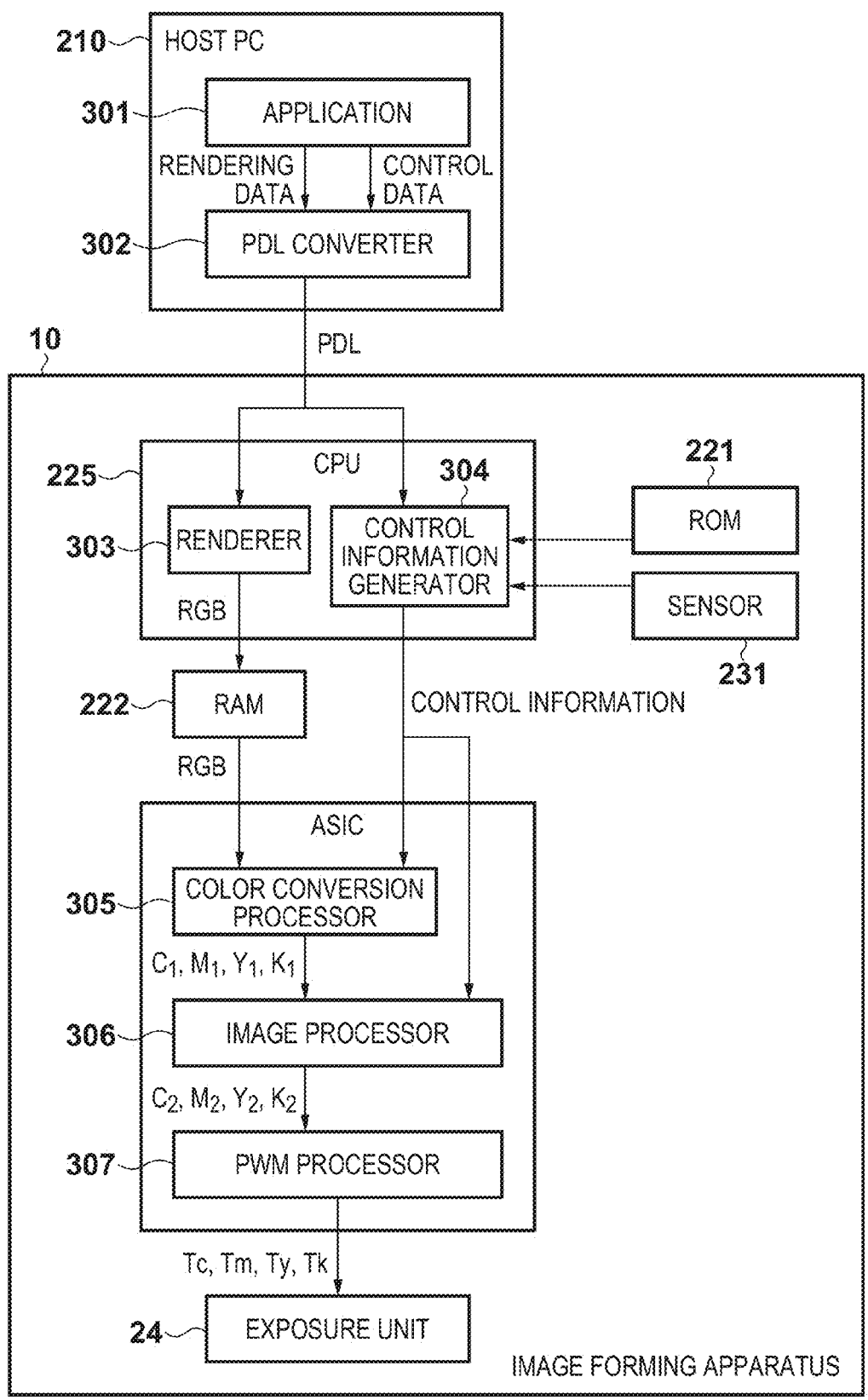
FIG. 3 is a block diagram showing the arrangement of a host PC and image forming apparatus according to one embodiment.

In the ASIC, a color conversion processor 305, image processor 306, and PWM processor 307 are implemented, as shown in FIG. 3. The color conversion processor 305 converts RGB data acquired from the RAM 222 into tone values $C_1$, $M_1$, $Y_1$, and $K_1$ expressed on a CMYK color space, and outputs these values to the image processor 306.

The image processor 306 corresponds to an image processing apparatus according to this embodiment, and executes tone conversion using a halftone table, filter table, and the like included in the control information. More specifically, the image processor 306 converts the tone values $C_1, M_1, Y_1$, and $K_1$ into tone values $C_2, M_2, Y_2$, and $K_2$ which can be expressed by the PWM processor 307, and outputs these tone values to the PWM processor 307.

The PWM processor 307 generates exposure control signals $T_c, T_m, T_y$, and $T_k$ required to control exposure operations by the exposure units 24 corresponding to the respective colors respectively from the input tone values $C_2, M_2, Y_2$, and $K_2$. Each exposure control signal indicates a laser emission width per dot, that is, per pixel, and the PWM processor 307 decides a laser emission width according to the input tone value. The PWM processor 307 outputs the exposure control signals to the exposure units 24 of the corresponding colors, and the exposure units 24 emit laser beams according to the input exposure control signals.

Note that the tone values on the RGB color space and CMYK color space can be expressed by the arbitrary number of bits, and the number of bits of each tone value can be increased/decreased so as to adjust, for example, a color reproduction range of the image forming apparatus 10. In this embodiment, assume that each tone value is expressed by 8 bits.

Figure 4:
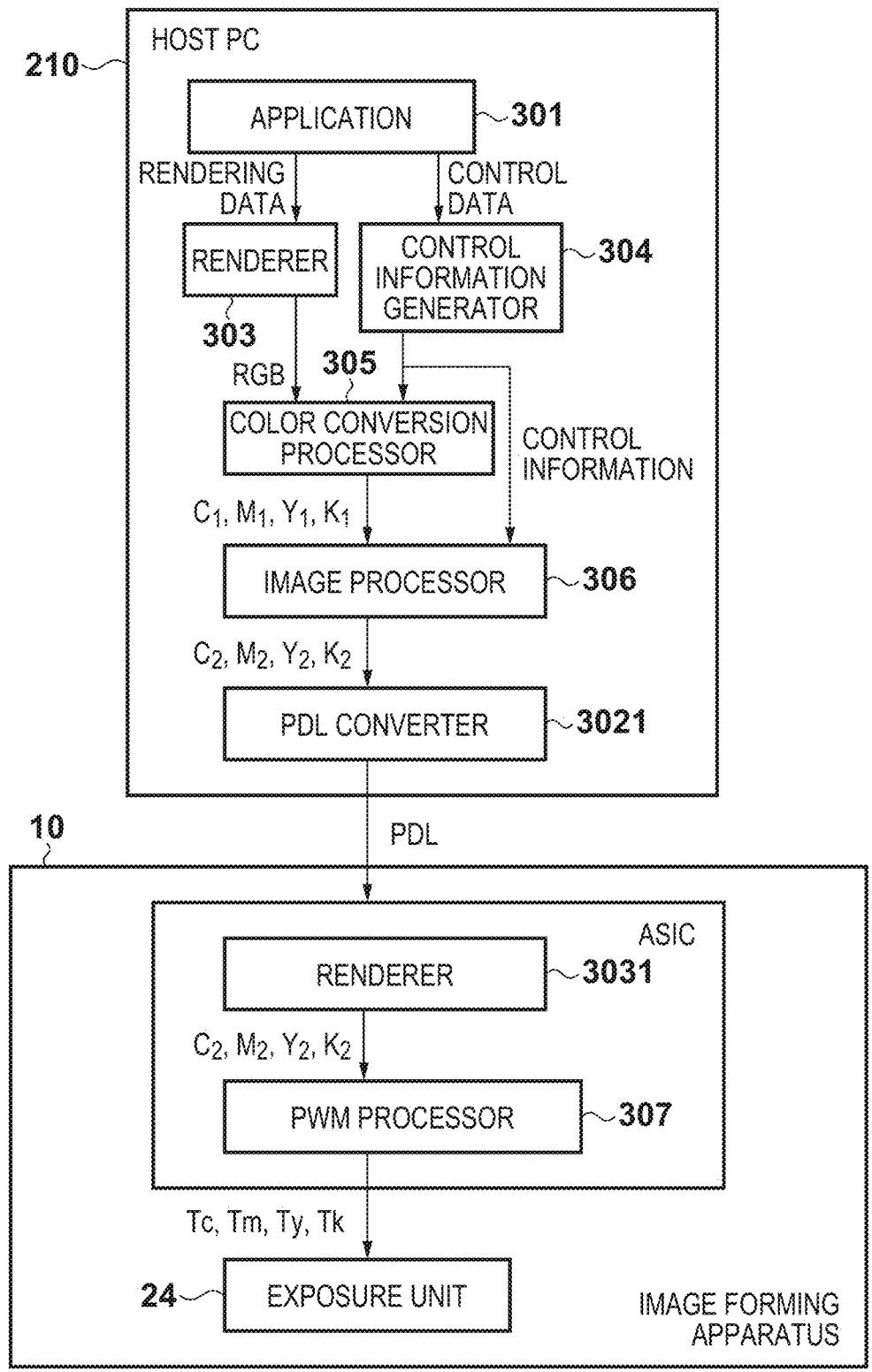
FIG. 4 is a block diagram showing the arrangement of the host PC and image forming apparatus according to one embodiment.

Note that the processes executed by the ASIC of the image forming apparatus 10 in this embodiment may be executed by the host PC 210, as shown in FIG. 4. A PDL converter 3021 in FIG. 4 converts CMYK signals output from the image processor 306 as rendering data into PDL data, and transmits the PDL data to the image forming apparatus 10. A renderer 3031 of the image forming apparatus 10 converts the PDL data received from the host PC 210 into the CMYK signals output from the image processor 306, and outputs the CMYK signals to the PWM processor 307. In this case, the image processing apparatus corresponding to the image processor 306 is implemented by, for example, programs in the host PC 210.

How to form toner images by the exposure control signals in the image forming apparatus 10 will be described below with reference to FIGS. 5A to 5D. Note that a case will be explained below wherein the exposure unit 24K forms a black toner image based on the exposure control signal $T_k$. Also, the same applies to other colors. Assume that in the description of FIGS. 5A to 5D, one pixel is divided into 15, and an exposure time is controlled to have, as a unit, a time of (1/15) of the exposure time corresponding to one pixel.

Figure 5A:
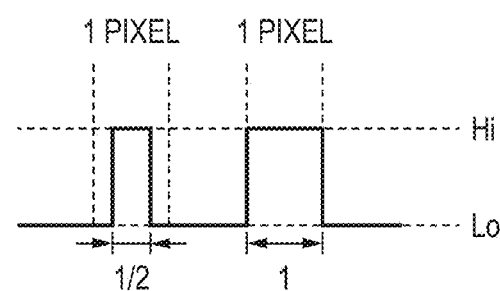
FIGS. 5A to 5D are explanatory views of a toner image formed on a surface of a photosensitive member.
Figure 5B:
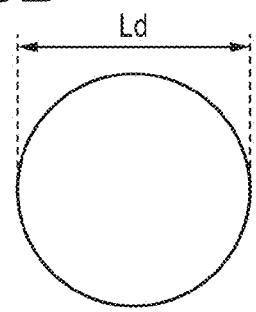

More specifically, as shown in FIG. 5A, the exposure control signal $T_k$ is expressed by a pulse signal whose level changes between high and low. Note that the high level corresponds to lighting-on (emission) of a laser beam, and the low level corresponds to lighting-off of the laser beam. In this embodiment, as described above, one pixel width is divided into 15, and the exposure time of each pixel is controlled by n times (n=0 to 15) of this divided width. Note that when an exposure width is less than one pixel, a central portion of one pixel is controlled to be exposed. A laser beam which scans the surface of the photosensitive member 22 has a nearly circular shape having a diameter Ld, as shown in FIG. 5B, and for example, the diameter Ld is √2 times of one pixel. That is, in a printer having a resolution of 600 dpi, the diameter Ld is about 60 μm. Also, assume that a laser beam amount is constant within its irradiation range.

Figure 5C:
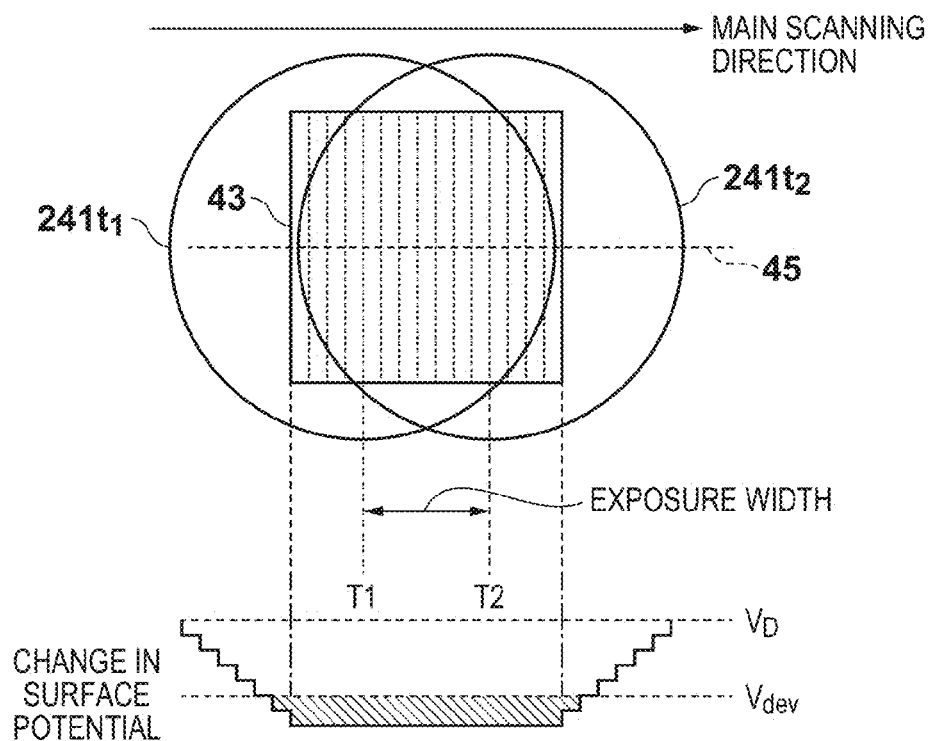

FIG. 5C shows a state in which a pixel 43 is exposed when an exposure time of the pixel 43 is 7/15 of one pixel. As shown in FIG. 5C, since the exposure width is less than one pixel, a central portion of one pixel is exposed. More specifically, when the center of a laser irradiation range reaches a position T1 in FIG. 5C (a state denoted by reference numeral $241t_1$), laser emission is started, and when the center of the laser irradiation range reaches a position T2 (a state denoted by reference numeral $241t_2$), laser emission is stopped.

A surface potential of a region irradiated with the laser beam of the surface of the photosensitive member 22K is decreased to be lower than a potential $V_D$ charged by the charging unit 23. A change amount of the surface potential by exposure depends on an exposure time by the exposure unit 24K. Hence, in an overlapping range of the irradiation ranges $241t_1$ and $241t_2$, a change in surface potential of the photosensitive member 22K is the maximum, and the change amount is decreased as a position is separated away from that range. FIG. 5C also shows a change in surface potential of the photosensitive member 22K along a line 45. On the line 45, an overlapping region between the irradiation ranges $241t_1$ and $241t_2$ is for about one pixel, and a change ratio of the potential is maximum in that range. Note that a change in potential of the region irradiated with the laser beam is expressed stepwise in FIG. 5C, but the potential is smoothly changed in practice.

As a result of exposure by the exposure unit 24K, when the absolute value of the surface potential of the photosensitive member 22K falls below a developing bias $V_{dev}$ of the developing unit 26K, a black toner from the developing unit 26K is attached. More specifically, in the region where the absolute value of the surface potential falls below the developing bias $V_{dev}$, an electrostatic latent image is developed with toner, thus forming a toner image. An amount of toner attached to the surface of the photosensitive member 22K becomes larger as a difference between the surface potential and developing bias $V_{dev}$ is larger.

Figure 5D:
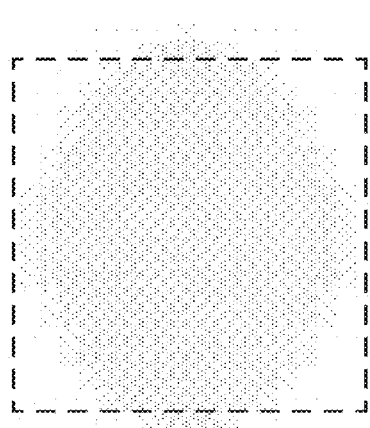

FIG. 5D shows an example of a toner image to be formed. As described above using FIG. 5C, in case of the exposure width less than one pixel, an irradiation range in a main scanning direction becomes shorter than that in a sub-scanning direction, and an elliptic dot elongated in the sub-scanning direction is formed, as shown in FIG. 5D.

Figure 6A:
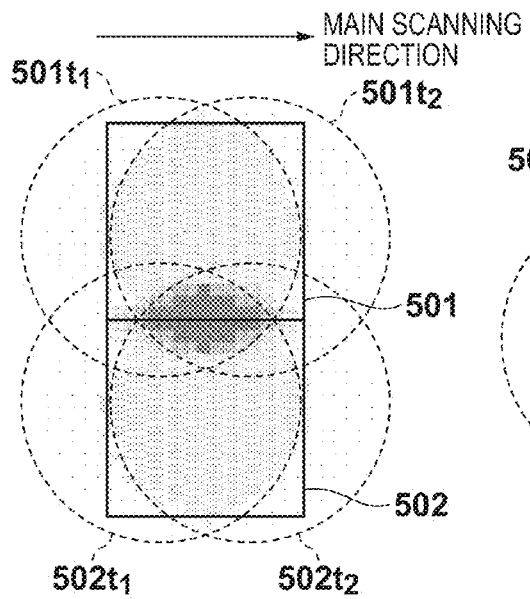
FIGS. 6A to 6C are explanatory views of the influence of neighboring pixels on formation of a toner image.
Figure 6B:
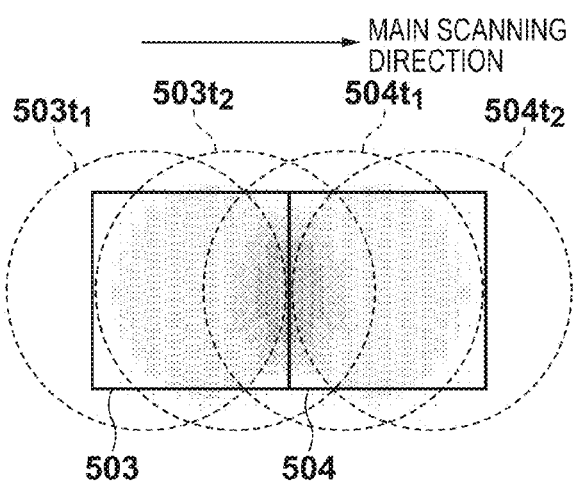
Figure 6C:
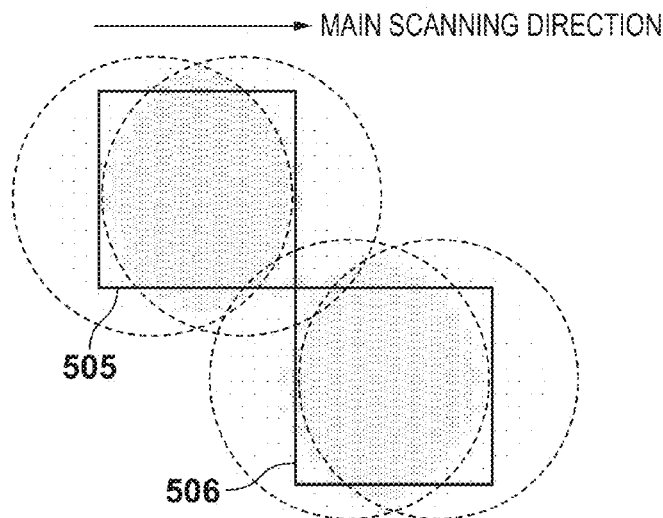

The influence of neighboring pixels upon formation of a toner image will be described below with reference to FIGS. 6A to 6C. FIG. 6A shows two pixels 501 and 502 juxtaposed in the sub-scanning direction, FIG. 6B shows two pixels 503 and 504 juxtaposed in the main scanning direction, and FIG. 6C shows two pixels 505 and 506 juxtaposed in an oblique direction. Note that an exposure width of each of the pixels 501 to 506 is 7/15. Also, FIGS. 6A to 6C express the magnitudes of a potential change of the photosensitive member surface as densities of a color. That is, as the color is darker, a potential change is larger.

For the pixel 501 in FIG. 6A, a laser beam is ON from an irradiation range $501t_1$ to an irradiation range $501t_2$. Hence, a potential change in a range including both the laser irradiation ranges $501t_1$ and $501t_2$ is largest. Furthermore, for the pixel 502 as a neighboring pixel, a laser light is ON from an irradiation range $502t_1$ to an irradiation range $502t_2$. As can be seen from FIG. 6A, the pixel 501 is influenced by exposure for the pixel 502. That is, a potential change of an overlapping region of all the irradiation ranges $501t_1, 501t_2, 502t_1$, and $502t_2$ is large.

For the pixel 503 in FIG. 6B, a laser beam is ON from an irradiation range $503t_1$ to an irradiation range $503t_2$. Also, for the pixel 504, a laser light is ON from an irradiation range $504t_1$ to an irradiation range $504t_2$. Therefore, a potential change of a region in the vicinity of a boundary between the pixels 503 and 504, which is exposed by both exposure for the pixel 503 and that for the pixel 504, is relatively large. However, a size of the region in the vicinity of the boundary depends on the exposure width of each pixel. That is, as the exposure width is smaller, a common portion to an irradiation range of a neighboring pixel is narrowed down, thus reducing the influence on the neighboring pixel. That is, in the main scanning direction, the influence is harder to be imposed on neighboring pixels than in the sub-scanning direction shown in FIG. 6A.

Furthermore, as shown in FIG. 6C, since a distance in the oblique direction is $\sqrt{2}$ times of those in the sub-scanning direction and main scanning direction, the influence on neighboring pixels is further reduced.

In this manner, since the irradiation range of the laser beam includes neighboring pixels in addition to a pixel of interest, it influences exposure characteristics of the neighboring pixels. Conversely, the pixel of interest is influenced by the neighboring pixels. This degree of influence is strongest in the sub-scanning direction, is next strongest in the main scanning direction, and is weakest in the oblique direction. Therefore, upon forming an image based on rendering data included in PDL data, the image forming apparatus 10 has to consider such exposure characteristics.

<Description of Image Processor 306>

Figure 1:
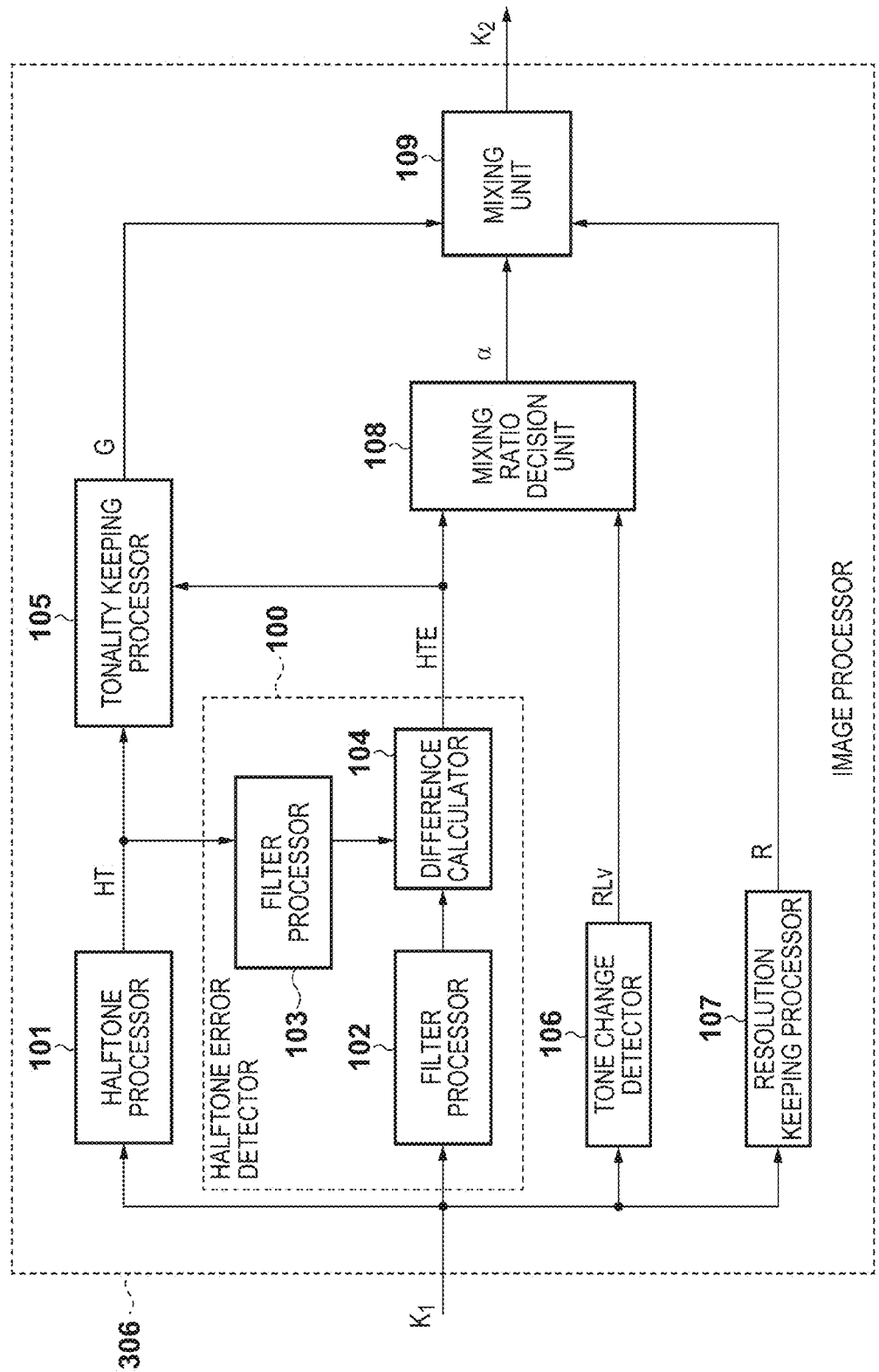
FIG. 1 is a block diagram showing the arrangement of an image processor according to one embodiment.

FIG. 1 is a block diagram showing the arrangement of the image processor 306 according to this embodiment. The image processor 306 applies gamma correction (not shown) to image data input from the color conversion processor 305 so as to fit tone characteristics of the image forming apparatus 10. After that, gamma-corrected image data $K_1$ is output to a halftone processor 101, halftone error detector 100, tone change detector 106, and resolution keeping processor 107 shown in FIG. 1. Note that processing for a black color will be described below, and the same applies to other colors. Assume that a pixel value of each pixel input to the image processor 306 is expressed by an integer ranging from 0 to 255. Also, assume that white is expressed by a pixel value=0, and black is expressed by a pixel value=255. Furthermore, assume that a pixel value of each pixel output from the image processor 306 is expressed by an integer ranging from 0 to 15. Moreover, assume that white is expressed by a pixel value=0, and black is expressed by a pixel value=15. In addition, in this embodiment, assume that the number of tones of each exposure control signal output from the PWM processor 307 is the same as that output from the image processor 306, that is, 16. More specifically, the PWM processor 307 generates an exposure control signal which sets an exposure width per dot of the exposure unit 24K to be D/15 in correspondence with a tone value D of any of values 0 to 15 in image data output from the image processor 306. Processes of respective units of the image processor 306 will be described below.

(Halftone Processor 101)

The halftone processor 101 converts image data $K_1$ of 256 tones into halftone image data HT (first image data) of 16 tones using a halftone table. The halftone table includes information required to convert each pixel value of the image data $K_1$ into that within a range from 0 to 15. In this embodiment, the halftone table used by the halftone processor 101 includes a threshold number table shown in FIG. 7A and a threshold table shown in FIG. 7B.

Respective columns of the threshold table shown in FIG. 7B correspond to threshold sets each including a plurality of thresholds, and a row number corresponds to a pixel value to be output. Note that threshold sets are specified by column numbers. For example, when a threshold set No. 0 is used, and when an input pixel value is 0 or 1, a pixel value=0 is output; when an input pixel value is 2, a pixel value=1 is output; and when an input pixel value is 3 or 4, a pixel value=2 is output. Furthermore, when an input pixel value is not less than 20, a pixel value 15 is output. Likewise, when a threshold set No. 1 is used, and when an input pixel value ranges from 0 to 20, a pixel value=0 is output; and when an input pixel value is not less than 40, a pixel value=15 is output. The threshold number table shown in FIG. 7A is used to specify a threshold set to be used, and is a table of 13 rows×13 columns in this embodiment. For example, the threshold number table shown in FIG. 7A indicates that a threshold set No. 3 is to be applied to a pixel having a row number=3 and column number=1, and also indicates that a threshold set No. 2 is applied to a pixel having a row number=3 and column number=2. For example, assume that a pixel value having a row number=3 and column number=2 is 42. At this time, the halftone processor 101 selects a threshold set No. 2 from the threshold number table shown in FIG. 7A. Therefore, the pixel value=42 is converted into a pixel value=2 from values of the second column of the threshold table shown in FIG. 7B.

As shown in FIG. 7A, the threshold number table has a format as a repetitive layout of a block 601 (a region bounded by a bold line) including 13 elements indicating threshold set Nos. 0 to 12 as a unit. In the block 601, a tone is changed element by element (pixel by pixel) to change an area ratio, thus allowing more tone expression in image data after halftone processing. In this embodiment, since the image forming apparatus 10 can express 16 tones per pixel, it can express 196 (=13×15+1) tones by the halftone processing using the threshold number table. That is, as the block 601 has a larger size, a quantization width (quantization step size) by the halftone processing is smaller, thus expressing a larger number of tones.

(Halftone Error Detector 100)

The halftone error detector 100 shown in FIG. 1 will be described below. Note that the halftone error detector 100 includes filter processors 102 and 103 and a difference calculator 104, as shown in FIG. 1, and generates halftone error data HTE from the image data $K_1$ and halftone image data HT.

(Filter Processor 102)

The filter processor 102 (first filter processor) selects each pixel included in the image data $K_1$ as a pixel of interest, and executes filter processing (more specifically, smoothing processing) of pixel values of pixels in a region 701 including the pixel of interest, as shown in FIG. 8A. More specifically, the filter processor 102 calculates an output value by dividing a sum total of pixel values of pixels in the region 701 including the pixel of interest by the number of pixels in the region 701. Note that depending on the position of the pixel of interest, some pixels in the region 701 fall outside the image data. In this embodiment, the calculation is made to have "0" as values of pixels falling outside the image of the region 701. Note that the same applies to other filter processes. However, the value of a pixel falling outside the image data of the region 701 is not limited to 0, and may be decided by other methods.

In this embodiment, the region 701 used in the filter processor 102 corresponds to the block 601 of the halftone table used in the halftone processor 101. More specifically, the size and shape of the block 601 used for respective pixels by the halftone processor 101 are set to be equal to those of the region 701 used by the filter processor 102. However, the shape of the region 701 is not limited to that which is the same as the shape of the block 601. For example, the region 701 may have a shape denoted by reference numeral 702 in FIG. 8B (a region bounded by a bold line). Also, the region 701 may have a shape by combining a plurality of blocks 601. That is, any other shapes are applicable as long as they have block sizes which are the same as or an integer multiple of a repetition period (that is, 13 in this example) of the threshold number table in the halftone table. Thus, filter orders of the filter processor 102 are set to be integer multiples of the repetition period of thresholds used in the halftone processing respectively in the row and column directions.

The filter processor 102 calculates values of all pixels in the image data $K_1$ by the aforementioned filter processing to select each pixel as a pixel of interest, and outputs smoothed data obtained by smoothing the image data $K_1$ to the difference calculator 104.

(Filter Processor 103)

The filter processor 103 (second filter processor) smoothes pixel values by the same filter as that used in the filter processor 102 to select each of all pixels in the halftone image data HT input from the halftone processor 101 as a pixel of interest. That is, the processing of the filter processor 103 is the same as that of the filter processor 102 except for image data to be processed. In this way, the halftone image data HT is smoothed.

(Difference Calculator 104)

The difference calculator 104 evaluates differences between the smoothed data respectively input from the filter processors 102 and 103, and outputs the evaluation result as halftone error data HTE to a tonality keeping processor 105 and mixing ratio decision unit 108. The halftone error data includes an error value indicating a halftone quantization error generated by the halftone processing by the halftone processor 101 for each pixel of the halftone image data HT. Note that in this embodiment, the halftone error data HTE is defined by (output data from the filter processor 102)–(output data from the filter processor 103). That is, when the halftone error data HTE is plus, it indicates that the density of an input image is decreased by the processing of the halftone processor 101; when it is minus, it indicates that the density of the input image is increased.

Note that the number of tones of the image data $K_1$ as a source of processing in the filter processor 102 is 256, and the number of tones of the halftone image data HT as a source of processing in the filter processor 103 is 16. Hence, the difference calculator 104 normalizes pixel values of pixels included in the respective image data to have the same maximum value per pixel in the first and second filter processing image data, and then calculates difference values. More specifically, the difference calculator 104 multiplies a value of each pixel output from the filter processor 103 by 17, and subtracts the product from the output data of the filter processor 102.

(Tonality Keeping Processor 105)

Figure 9A:
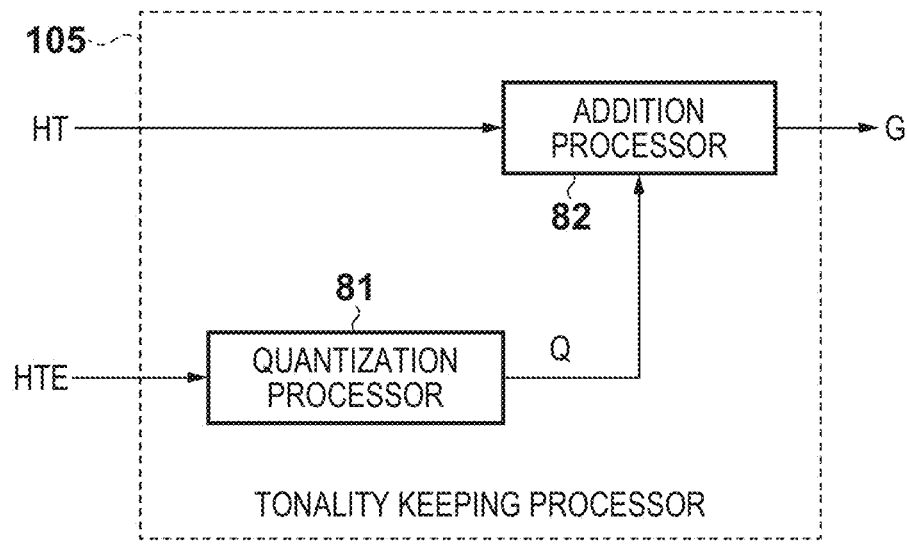
FIG. 9A is a block diagram showing the arrangement of a tonality keeping processor.

The tonality keeping processor 105 (first processor) includes a quantization processor 81 and addition processor 82, as shown in FIG. 9A. The tonality keeping processor 105 corrects deterioration of an image corresponding to the halftone image data HT output from the halftone processor 101. The processing of the tonality keeping processor 105 can correct interference fringes (moiré) between a periodic pattern included in the image data $K_1$ and the ordered dither method, thus maintaining the tonality of the image data $K_1$.

The halftone error data HTE indicates difference values between the image data $K_1$ and halftone image data HT by the halftone processor 101, as described above. By adding the halftone error data HTE to the halftone image data HT, the halftone image data HT can be corrected to maintain tonality faithful to the input image. However, by only simple addition processing of the halftone error data HTE to the halftone image data, laser irradiation amounts required to visualize a toner image cannot often be assured, and a print image cannot be sufficiently reproduced. Hence, in this embodiment, the halftone error data HTE is quantized to values which the print image can be reproduced, and is then added to the halftone image data HT. Thus, the printed image can be corrected to maintain tonality faithful to the input image. Also, in this embodiment, the quantization processor 81 uses the ordered dither method, as will be described later, but other processes may be used.

Figure 9B:
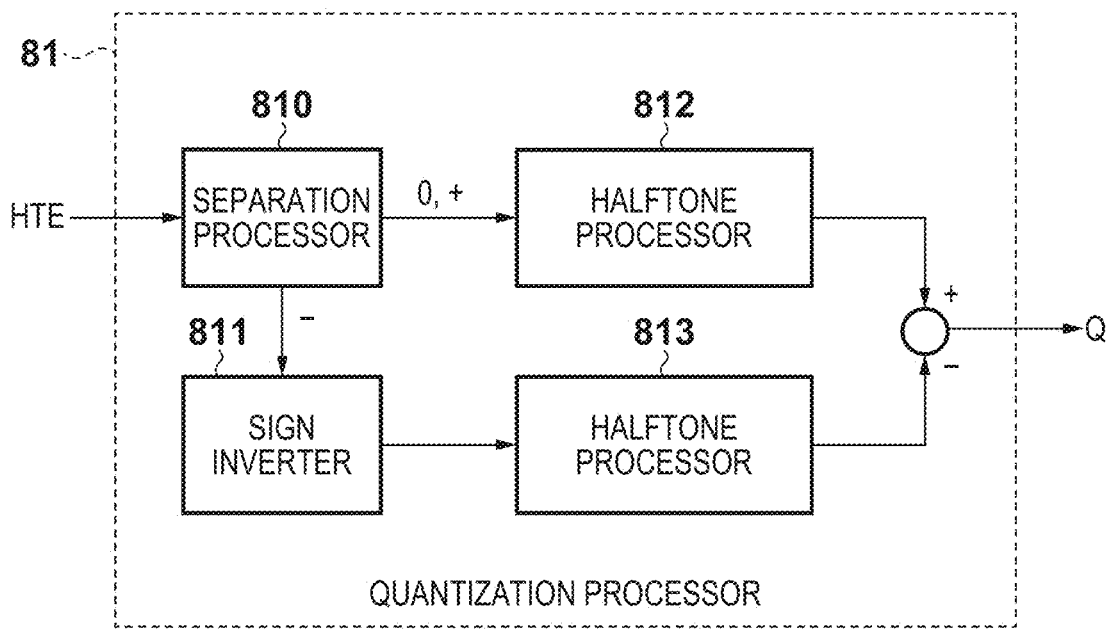
FIG. 9B is a block diagram showing the arrangement of a quantization processor according to one embodiment.

Processing of the quantization processor 81 will be described in detail below with reference to FIG. 9B. The quantization processor 81 includes a separation processor 810, sign inverter 811, and halftone processors 812 and 813. The separation processor 810 determines the sign of the input halftone error data HTE, and outputs first error data in which errors corresponding to negative values are converted to zero to the halftone processor 812 (first quantizer). On the other hand, the separation processor 810 converts errors of the halftone error data HTE, which correspond to positive values, into zero, and outputs the converted data to the sign inverter 811, which outputs second error data obtained by further inverting the signs of the input data to the halftone processor 813 (second quantizer). The halftone processor 812 quantizes the first error data by the ordered dither method, and outputs first quantized data. Likewise, the halftone processor 813 quantizes the second error data by the ordered dither method, and outputs second quantized data. For example, the halftone processors 812 and 813 can also decide output values from a threshold number table and threshold table in the same manner as the halftone processor 101. In this embodiment, the halftone processor 813 uses the threshold number table shown in FIG. 7A and the threshold table shown in FIG. 7B. By contrast, the halftone processor 812 uses a threshold number table shown in FIG. 7E obtained by shifting a phase of the table shown in FIG. 7A, and the threshold table shown in FIG. 7B.

The quantization processor 81 outputs data obtained by subtracting pixel values of respective pixels output from the halftone processor 813 from those of corresponding pixels output from the halftone processor 812 as quantized data Q. The addition processor 82 executes addition processing of pixel values of corresponding pixels of the halftone image data HT and quantized data Q, and outputs the added data as tonality keeping data G (=HT+Q).

Data of respective pixels, which are respectively output from the halftone processor 101, halftone error detector 100, and tonality keeping processor 105 will be described below with reference to FIGS. 10A to 13D.

Figure 10B:
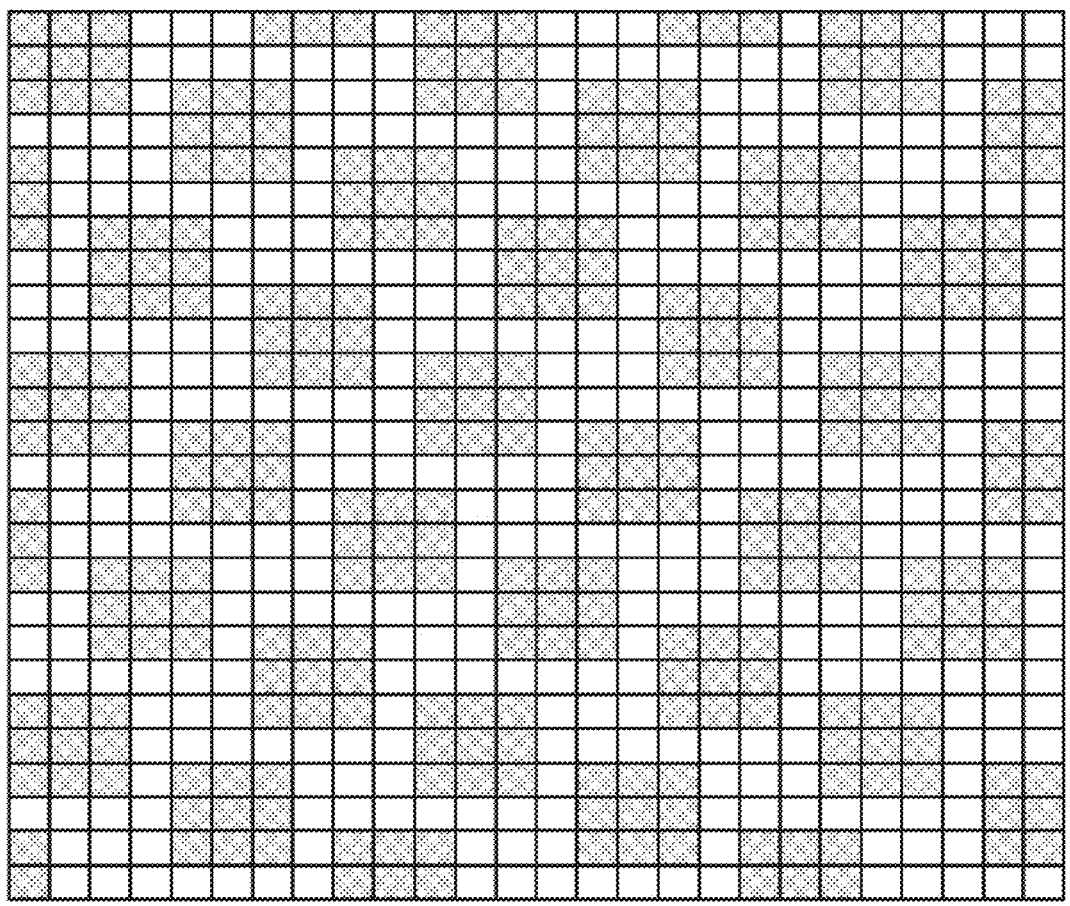
Figure 10C:
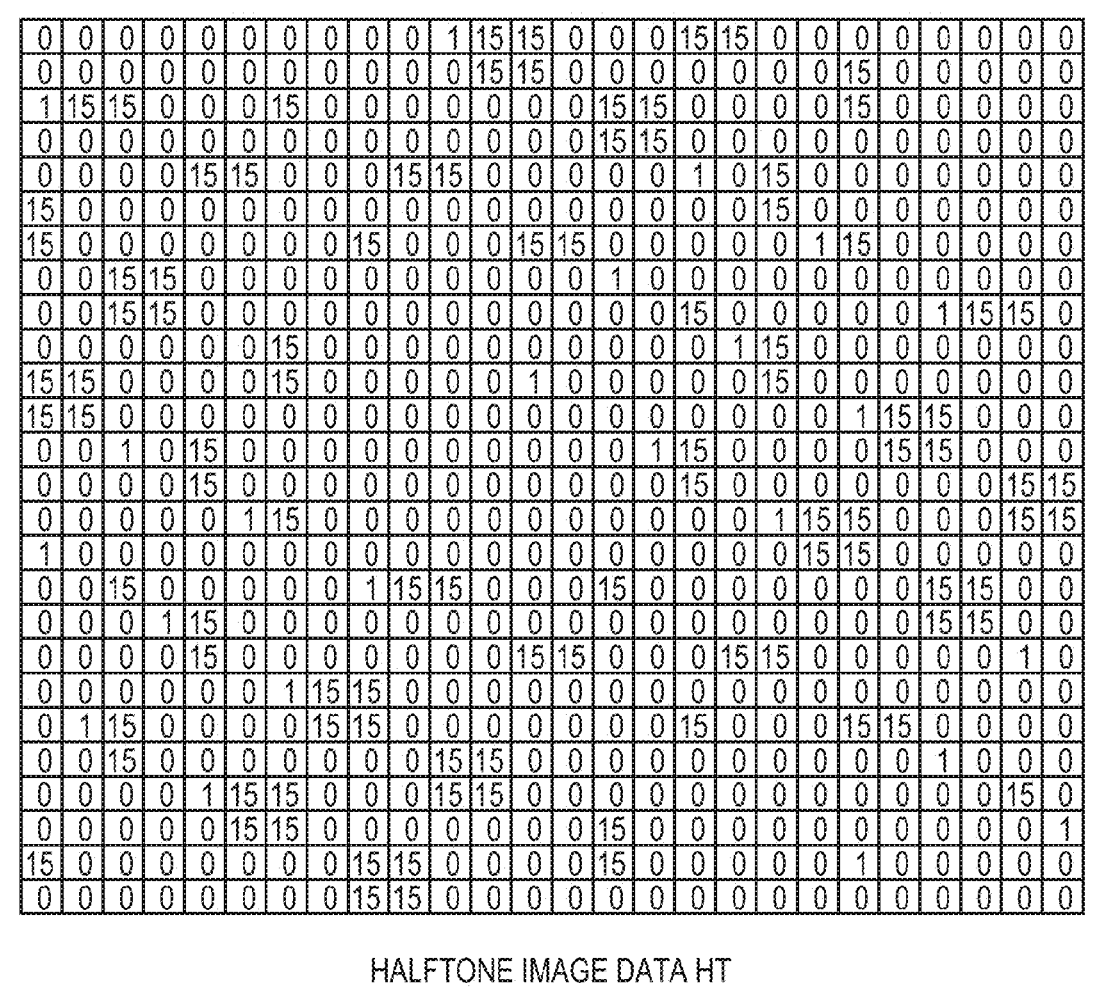
Figure 10D:
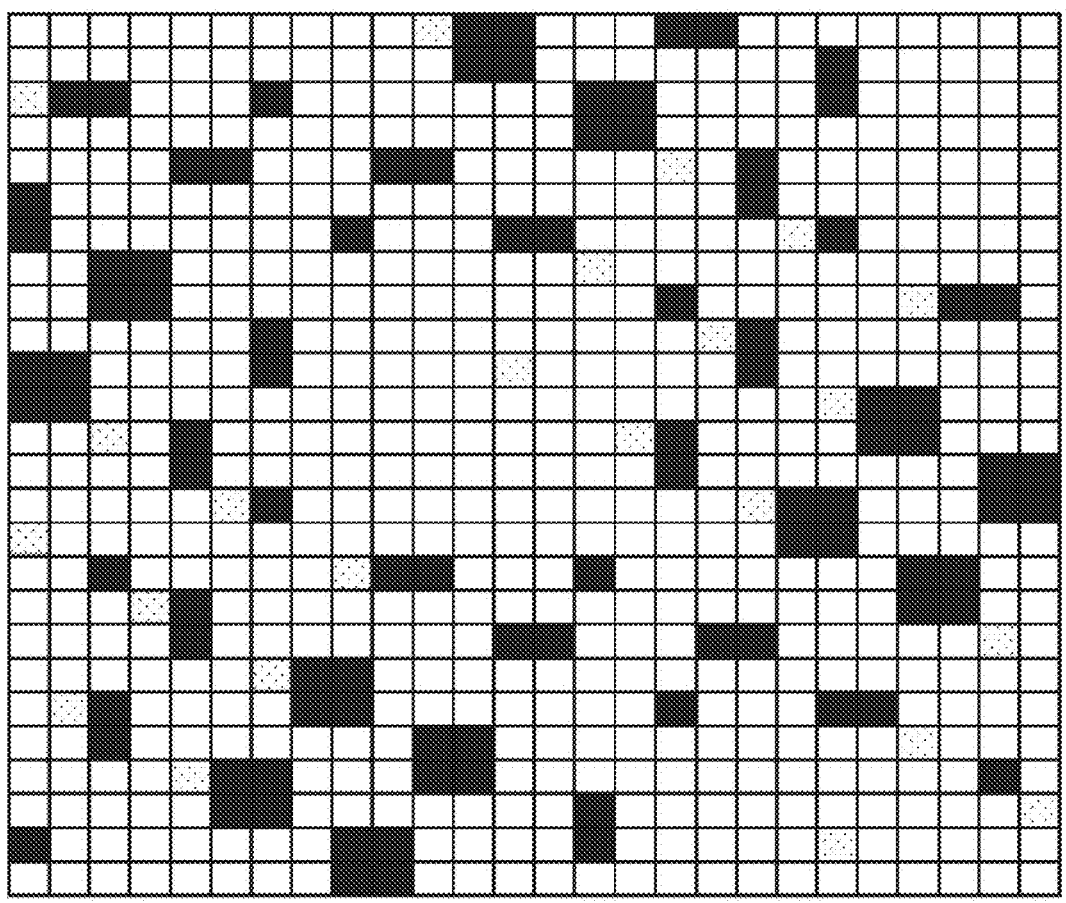

FIG. 10A shows an example of the image data $K_1$ input to the image processor 306, and FIG. 10B visually expresses the image data $K_1$ shown in FIG. 10A. Note that FIGS. 10A to 13D show data to be output from respective functional blocks when the image data $K_1$ shown in FIG. 10A is input. FIG. 10C shows the halftone image data HT output from the halftone processor 101. Assume that the halftone tables to be used are those shown in FIGS. 7A and 7B. FIG. 10D visually expresses the data shown in FIG. 10C. When dither processing is applied to an image including a periodic pattern like the image data $K_1$ shown in FIG. 10A, moiré is generated due to interferences between the period of the image data $K_1$ and that of the dither processing, as shown in FIG. 10C. Thus, the halftone error detector 100 detects an image portion deteriorated by the halftone processor 101.

FIG. 11A shows data output from the filter processor 102, and FIG. 11B shows data output from the filter processor 103. Also, FIG. 11C shows the halftone error data HTE output from the difference calculator 104. Note that in order to adjust the maximum value, the difference calculator 104 multiplies data output from the filter processor 103 by 17, and then subtracts the product from the data output from the filter processor 102. Note that FIG. 11D visually expresses the halftone error data HTE shown in FIG. 11C. As can be seen from FIG. 11C, the halftone error data HTE assumes a positive value at a pixel whose density is lower than the image data $K_1$, and a negative value at a pixel whose density is higher than the image data $K_1$. In this manner, the halftone error detector 100 detects and outputs quantitative values of errors generated by the halftone processing in the halftone processor 101.

Figure 12C:
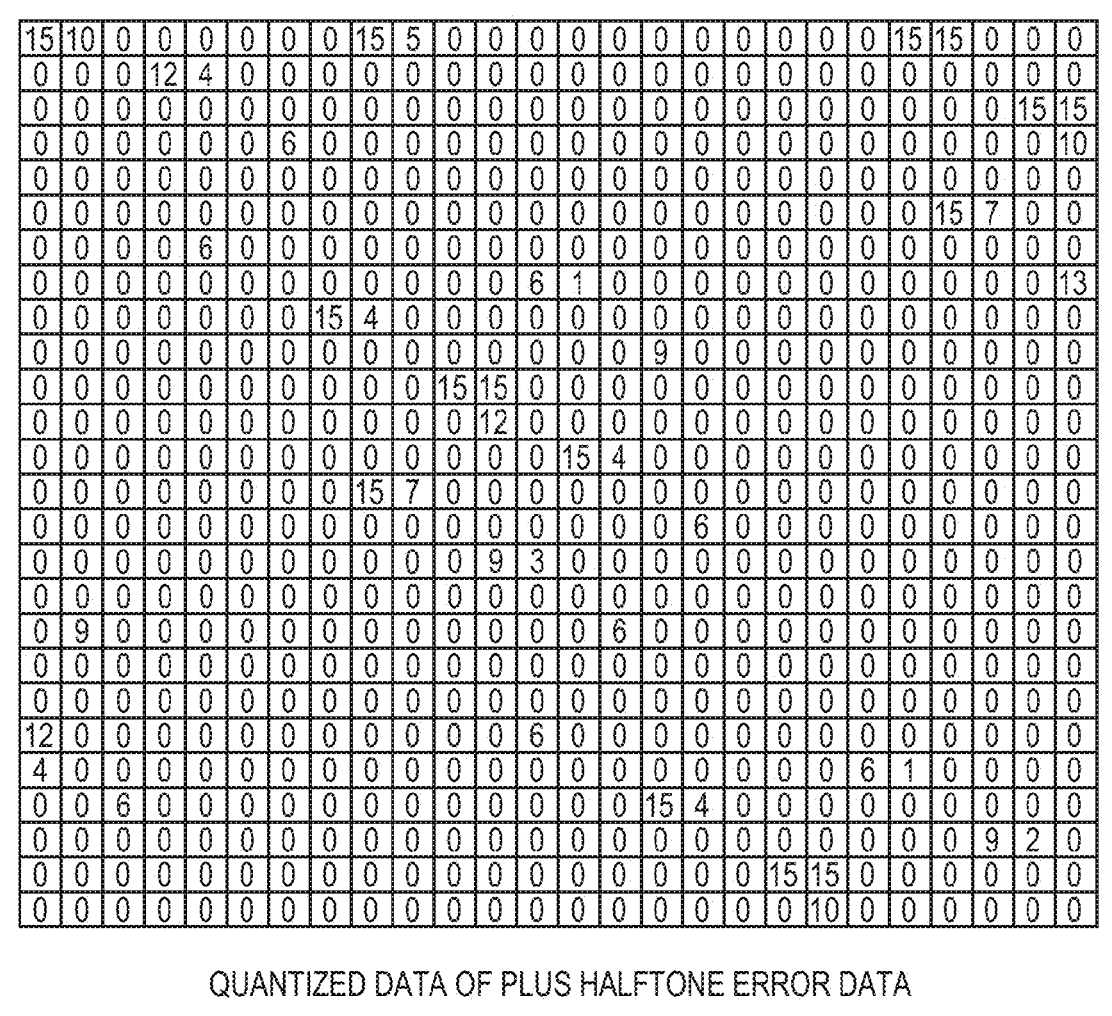
Figure 12D:
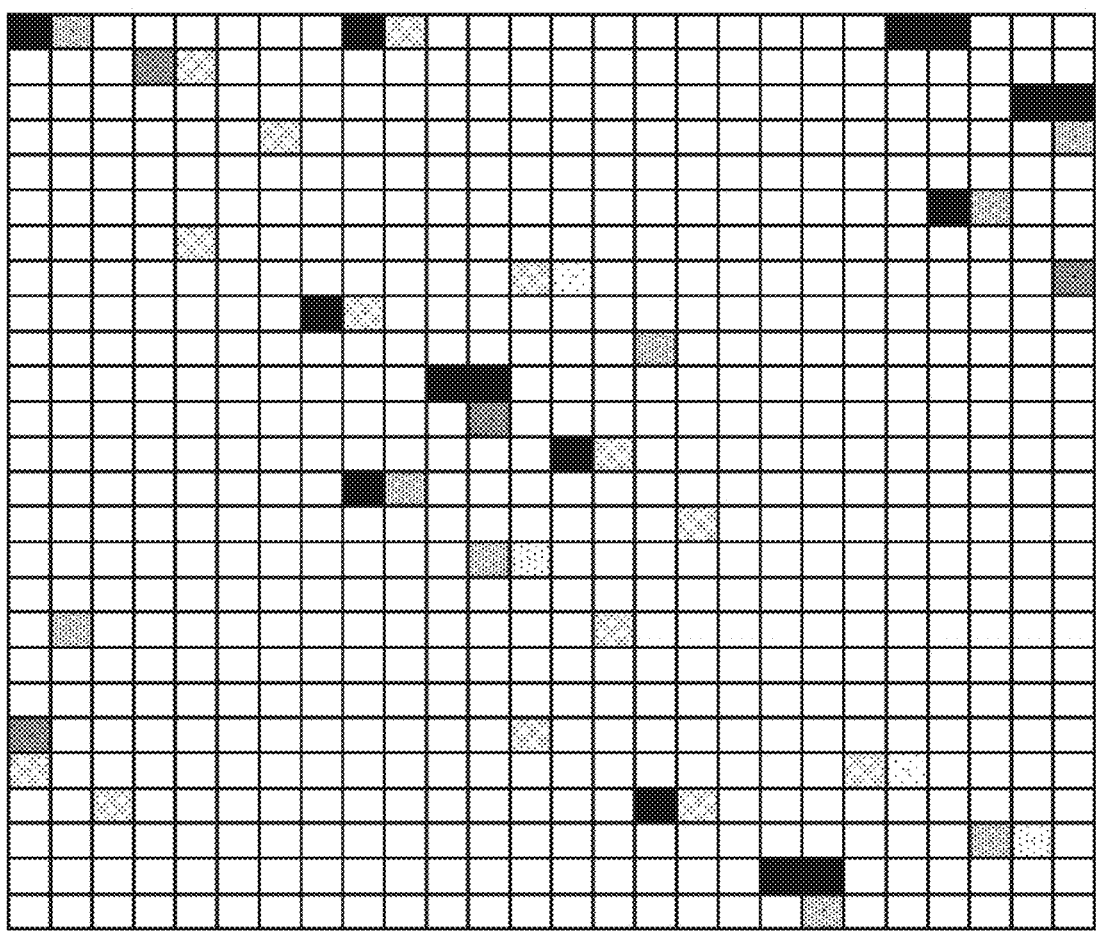
Figure 13A:
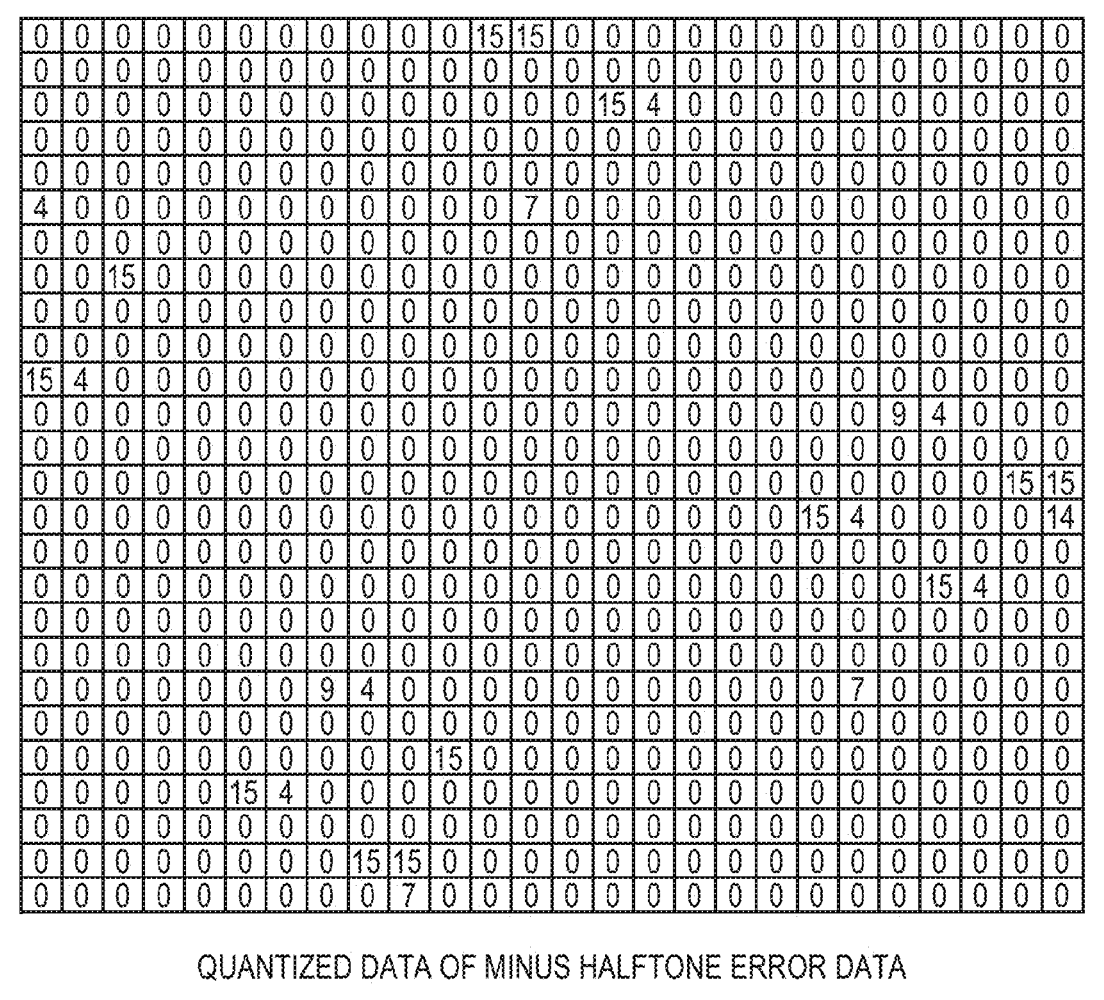

FIG. 12A shows image data output from the separation processor 810 to the halftone processor 812, and FIG. 12B shows image data output from the sign inverter 811 to the halftone processor 813. The halftone processor 812 quantizes the image data shown in FIG. 12A using the halftone tables shown in FIGS. 7B and 7E. FIG. 12C shows image data output from the halftone processor 812, and FIG. 12D visually expresses the image data shown in FIG. 12C. Likewise, the halftone processor 813 quantizes the image data shown in FIG. 12B using the halftone tables shown in FIGS. 7A and 7B. FIG. 13A shows image data output from the halftone processor 813, and FIG. 13B visually expresses the image data shown in FIG. 13A. The quantized data Q is obtained by subtracting the image data shown in FIG. 13A from the image data shown in FIG. 12C.

Figure 13D:
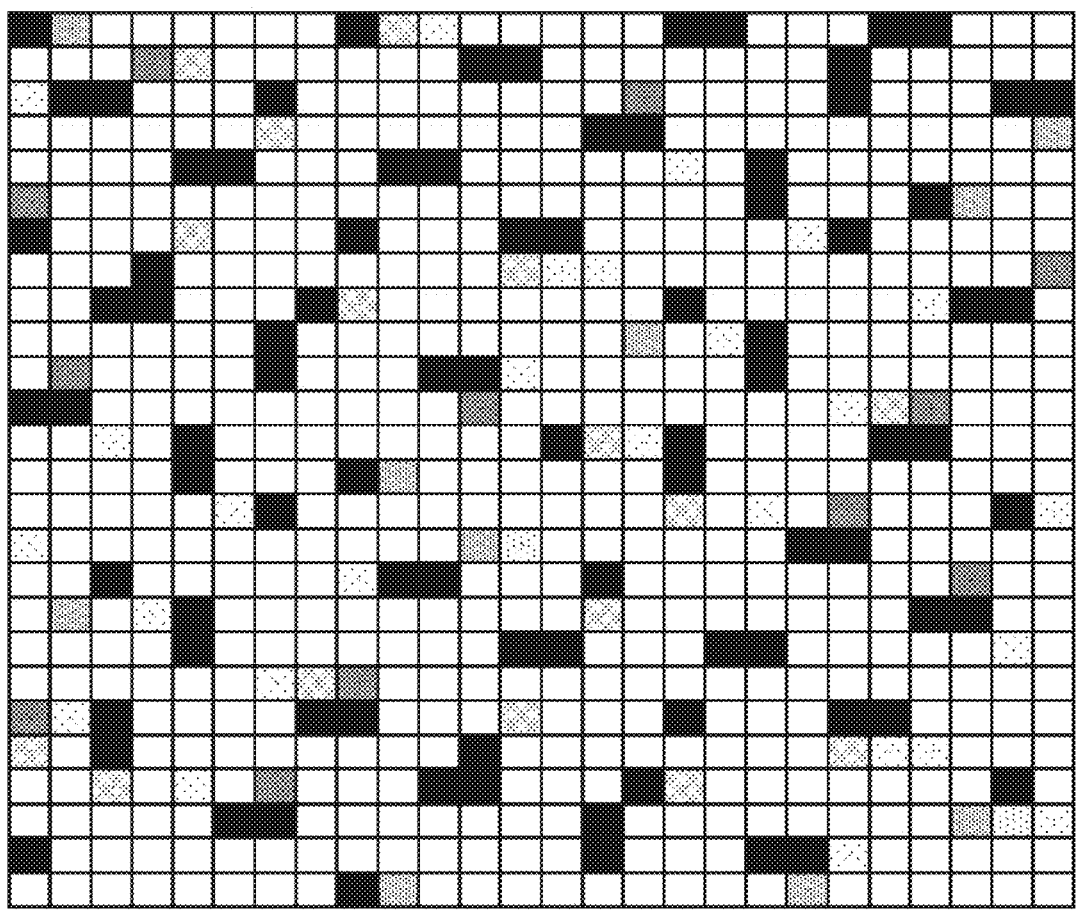

FIG. 13C shows the tonality keeping data G, which is obtained by adding the image data shown in FIG. 12C to the halftone image data HT shown in FIG. 10C, and subtracting the image data shown in FIG. 13A from the sum data. Note that in this embodiment, as for a pixel which assumes a negative value as a result of subtraction of the image data shown in FIG. 13A, its pixel value is set to be zero. Note that in FIG. 13C, such pixels remain assuming negative values so as to present calculation results. FIG. 13D visually expresses the image data shown in FIG. 13C. As shown in FIG. 13C, in the tonality keeping data G, a periodic pattern generated by the processing of the halftone processor 101 can be reduced, thus suppressing moiré. Note that in this embodiment, when a value of a pixel of the tonality keeping data G becomes negative, that pixel value is merely set to be zero. However, when a given pixel assumes a negative value, that value is distributed to neighboring pixels and is subtracted from the neighboring pixels, that is, that value is dispersed to the neighboring pixels, thus removing moiré with higher precision.

(Tone Change Detector 106)

Processing in the tone change detector 106 shown in FIG. 1 will be described below with reference to FIGS. 14A to 14C. The tone change detector 106 detects a tone change degree RLv in a first range with reference to a pixel of interest of the image data $K_1$, and outputs that value to the mixing ratio decision unit 108. More specifically, by defining the center of the 3×3 pixel matrix shown in FIG. 14A as a pixel of interest, the tone change detector 106 calculates difference values Sub(n) between the pixel of interest and neighboring eight pixels as the first range using:

$$\mathrm{Sub}(n) = p5 - p(n) (1 \le n \le 9)$$

Furthermore, the tone change detector 106 outputs a maximum value of the calculated nine difference values as tone change data RLv for the pixel of interest. The tone change data RLv indicates a change degree of a pixel value of the pixel of interest from neighboring pixels. Note that an output value of a Laplacian filter shown in FIG. 14B may be used in place of the aforementioned method. Alternatively, another edge detection filter may be used.

(Resolution Keeping Processor 107)

Figure 15A:
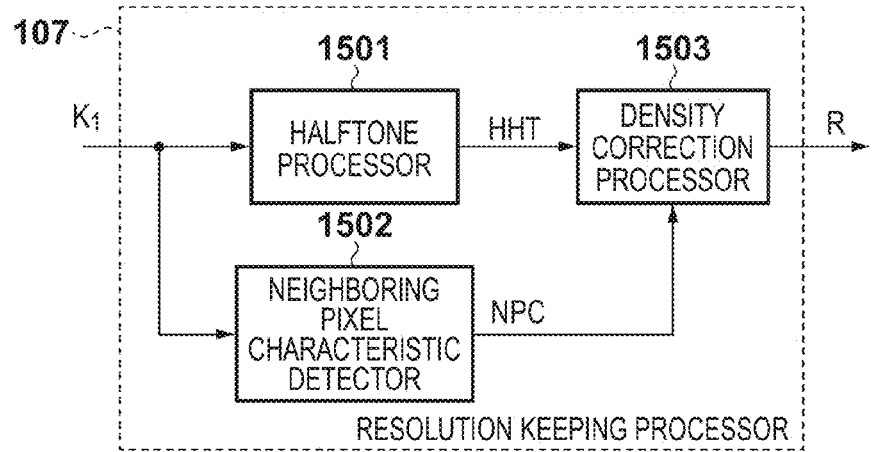
FIGS. 15A to 15C are explanatory views showing the arrangement of a resolution keeping processor according to one embodiment and processing of a density correction processor.

Processing of the resolution keeping processor 107 (second processor) shown in FIG. 1 will be described below. As shown in FIG. 15A, the resolution keeping processor 107 includes a halftone processor 1501, neighboring pixel characteristic detector 1502, and density correction processor 1503. The halftone processor 1501 applies halftone processing of a higher resolution than the halftone processor 101 to the input image data $K_1$, and outputs halftone image data HHT to the density correction processor 1503. The neighboring pixel characteristic detector 1502 detects neighboring pixel characteristic information NPC from a density state of pixels around a pixel of interest of the image data $K_1$, and outputs the detected information to the density correction processor 1503. The density correction processor 1503 decides a density correction value ($\gamma$) according to the neighboring pixel characteristic information NPC, and executes density correction processing of the halftone image data HHT. As will be described later, the density correction value is decided in consideration of electrophotography characteristics, and the density correction processing is executed so as to appropriately reproduce the halftone image data HHT on a print image. The density correction processor 1503 outputs data after the density correction processing to the mixing unit 109 as resolution keeping data R (second image data). Note that the resolution keeping data R is applied to a portion where a resolution is to be preferentially maintained in an image by processing of the mixing unit 109 to be described later.

Details of the processing of the resolution keeping processor 107 will be described below. The halftone processor 1501 executes processing for outputting halftone image data of a higher resolution than the halftone processor 101. In this embodiment, halftone tables including a threshold number table shown in FIG. 7C and a threshold table shown in FIG. 7D are used. However, halftone tables to be used are not limited to these tables as long as they have a shorter repetition period than those used by the halftone processor 101, and for example, an error diffusion method and the like may be used.

The neighboring pixel characteristic detector 1502 (third filter unit) decides the neighboring pixel characteristic information NPC as a weighted average from pixel densities of 3×3 pixels around a pixel of interest in the image data $K_1$. More specifically, the neighboring pixel characteristic detector 1502 makes filter calculations using pixel values in a second range of 3×3 pixels having a center p5 as a pixel of interest, as shown in FIG. 14A, and a filter which is weighted, as shown in FIG. 14C. FIG. 14C shows an example of the filter used by the neighboring pixel characteristic detector 1502, and weighting coefficients may be either those stored in the ROM 221 or those which are dynamically generated based on densities detected by the sensor 231. In the filter shown in FIG. 14C, the magnitudes of weighting coefficients are changed in an order of a vertical direction (sub-scanning direction)>a horizontal direction (main scanning direction)>an oblique direction. Since reproducibilities of toners in the vertical, horizontal, and oblique directions are different in terms of the electrophotography characteristics, as described using FIGS. 5A to 5D, density correction values are changed according to the reproducibilities.

Figure 15B:
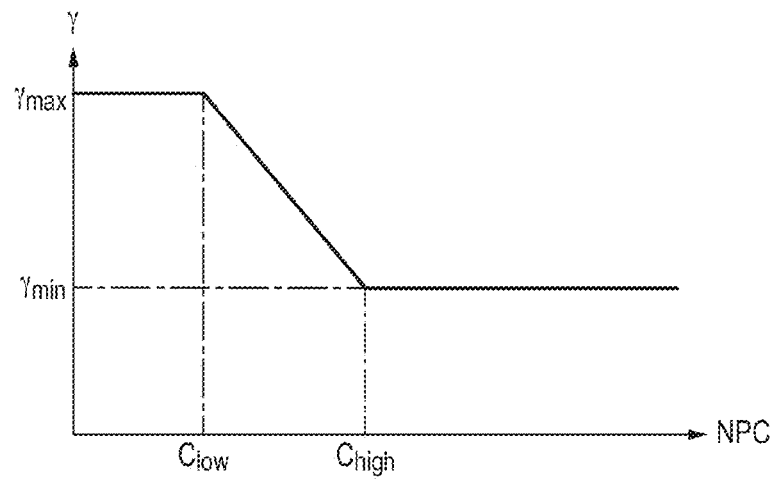

The density correction processor 1503 decides density correction values $\gamma$ required to apply density correction to the input halftone image data HHT in accordance with the neighboring pixel characteristic information NPC. FIG. 15B shows the relationship between the density correction values $\gamma$ and the neighboring pixel characteristic information NPC. Values $\gamma_{max}, \gamma_{min}, C_{low},$ and $C_{high}$ shown in FIG. 15B are those saved in advance in the ROM 221. For example, $\gamma_{max}=2.0$, $\gamma_{min}=1.0$, $C_{low}=0$, and $C_{high}=4$. As shown in FIG. 15B, the density correction value γ is decided according the neighboring pixel characteristic information NPC using:

$$\gamma = \gamma_{max} \quad (NPC < C_{low})$$

$$\gamma = \gamma_{min} \quad (C_{high} < NPC)$$

$$\gamma = \left(\frac{\gamma_{min} - \gamma_{max}}{C_{high} - C_{low}}\right) NPC + \frac{C_{high}\gamma_{max} - C_{low}\gamma_{min}}{C_{high} - C_{low}} \quad (C_{low} \leq NPC \leq C_{high})$$

The density correction processor 1503 executes density correction processing by the following calculation based on the density correction value γ of a corresponding pixel for each pixel value of the input halftone image data HHT, and outputs the data after the processing as the resolution keeping data R. That calculation is described by:

$$R = Q_{max}\left(\frac{HHT}{Q_{max}}\right)^{1/\gamma}$$

where $Q_{max}$ is a maximum quantized value of one pixel which can be reproduced by PWM, and $Q_{max}=15$ in this embodiment.

As described above, the arrangement for deciding the density correction value γ according to the neighboring pixel characteristic information NPC of the pixel of interest to apply density correction is adopted. With this arrangement, density correction in consideration of the influence of neighboring pixels is executed, and a toner image can be stably formed even for pixels which neighbor in an unstable direction to be hardly reproduced in the electrophotography process.

(Mixing Ratio Decision Unit 108)

The mixing ratio decision unit 108 shown in FIG. 1 will be described below. The mixing ratio decision unit 108 decides a mixing ratio α from the halftone error data HTE from the difference calculator 104, and the tone change data RLv from the tone change detector 106. Note that the mixing ratio α indicates a ratio of the resolution keeping data R upon mixing the tonality keeping data G and resolution keeping data R, and assumes a value not less than 0 and not more than 1 in this embodiment. Therefore, when α=0, a weight of the resolution keeping data R is minimum, and when α=1, that of the resolution keeping data R is maximum. When a value of the halftone error data HTE is positive (HTE>0), the mixing ratio decision unit 108 executes addition processing of the tone change data RLv and halftone error data HTE to calculate an edge correction index E. After that, the mixing ratio decision unit 108 decides the mixing ratio α based on the calculated edge correction index value E.

Figure 16A:
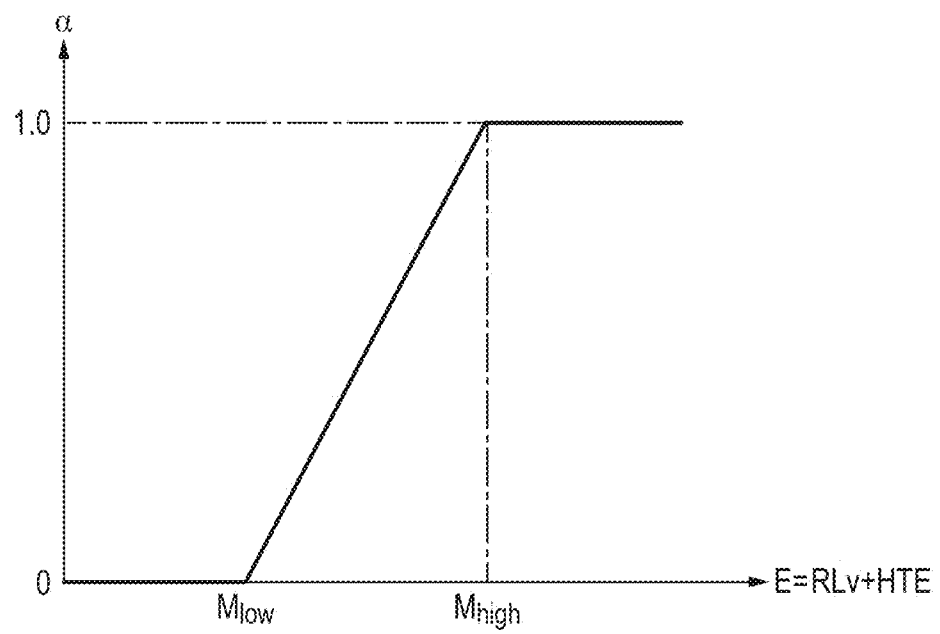
FIGS. 16A and 16B are graphs used to decide a mixing ratio α according to one embodiment.

Decision of the mixing ratio α will be described below with reference to FIGS. 16A and 16B and FIG. 17. FIG. 17 is a flowchart of the mixing ratio α decision processing executed by the mixing ratio decision unit 108. The mixing ratio decision unit 108 determines in step S11 whether or not the halftone error data HTE of each pixel assumes a positive value. If the data does not assume a positive value, the mixing ratio decision unit 108 sets the value of the halftone error data HTE of that pixel to be zero in step S12. That is, when the halftone error data indicates that the density is increased by the processing of the halftone processor 101, the mixing ratio decision unit 108 sets the error to be zero as a predetermined value. Subsequently, the mixing ratio decision unit 108 calculates a value obtained by adding the tone change data RLv and halftone error data HTE of the corresponding pixel as an edge correction index E in step S13. The mixing ratio decision unit 108 determines in step S14 whether or not the edge correction index E of each pixel is smaller than a first threshold $M_{low}$. The mixing ratio decision unit 108 decides a mixing ratio α of the pixel whose edge correction index E is smaller than the first threshold $M_{low}$ to be zero (first value) in step S16. On the other hand, if the edge correction index E is not less than the first threshold, that is, E≥$M_{low}$, the mixing ratio decision unit 108 determines in step S15 whether or not the edge correction index E is larger than a second threshold $M_{high}$. The mixing ratio decision unit 108 decides a mixing ratio α of the pixel whose edge correction index E is larger than the second threshold to be 1 (second value) in step S17. Also, the mixing ratio decision unit 108 decides a mixing ratio α whose edge correction index value E is not less than the first threshold and not more than the second threshold to be $(E-M_{low})/(M_{high}-M_{low})$ in step S18. That is, when the edge correction index value E is not less than $M_{low}$ and not more than $M_{high}$, the mixing ratio α is proportional to the edge correction index value E. FIG. 16A shows the relationship between the edge correction index values E and mixing ratios α.

As can be seen from FIG. 16A, when the halftone error data HTE is increased or the tone change data RLv is increased, the mixing ratio α remains the same or is increased. Note that the following example will be explained to have the first threshold $M_{low}=64$ and the second threshold $M_{high}=140$.

(Mixing Unit 109)

The mixing unit 109 executes mixing processing of the tonality keeping data G and resolution keeping data R in accordance with the mixing ratios α input from the mixing ratio decision unit 108, thus generating output image data $K_2$. More specifically, each pixel of the output image data $K_2$ is calculated from the tonality keeping data G, resolution keeping data R, and mixing ratio α of the corresponding pixel using:

$$K_2 = \alpha \times R + (1-\alpha) \times G$$

In this way, since the mixing ratio α is switched for each pixel, the tonality keeping data G and resolution keeping data R can be switched without any mismatch.

<Effectiveness of this Embodiment>

Figure 18A:
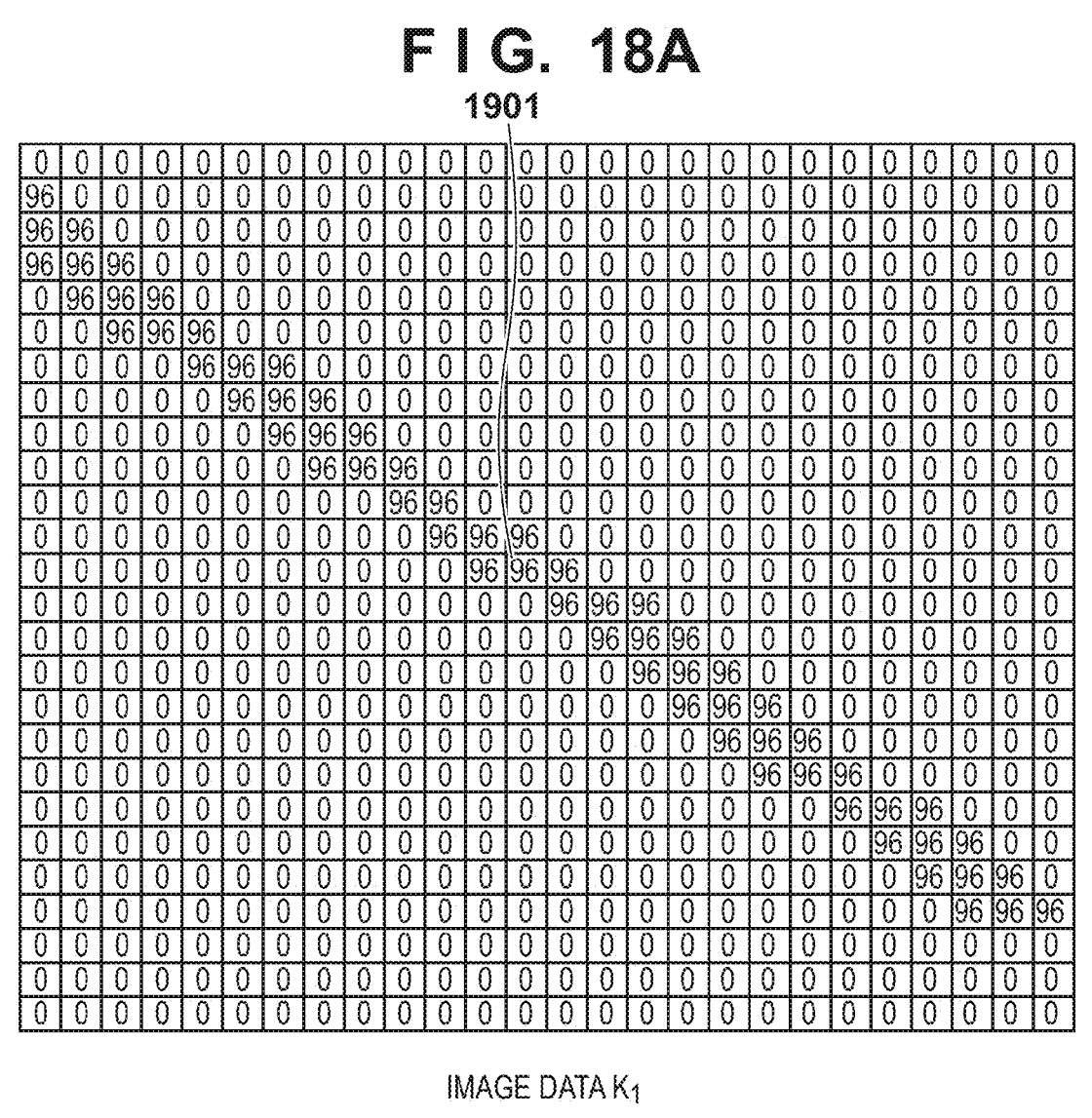
Figure 18B:
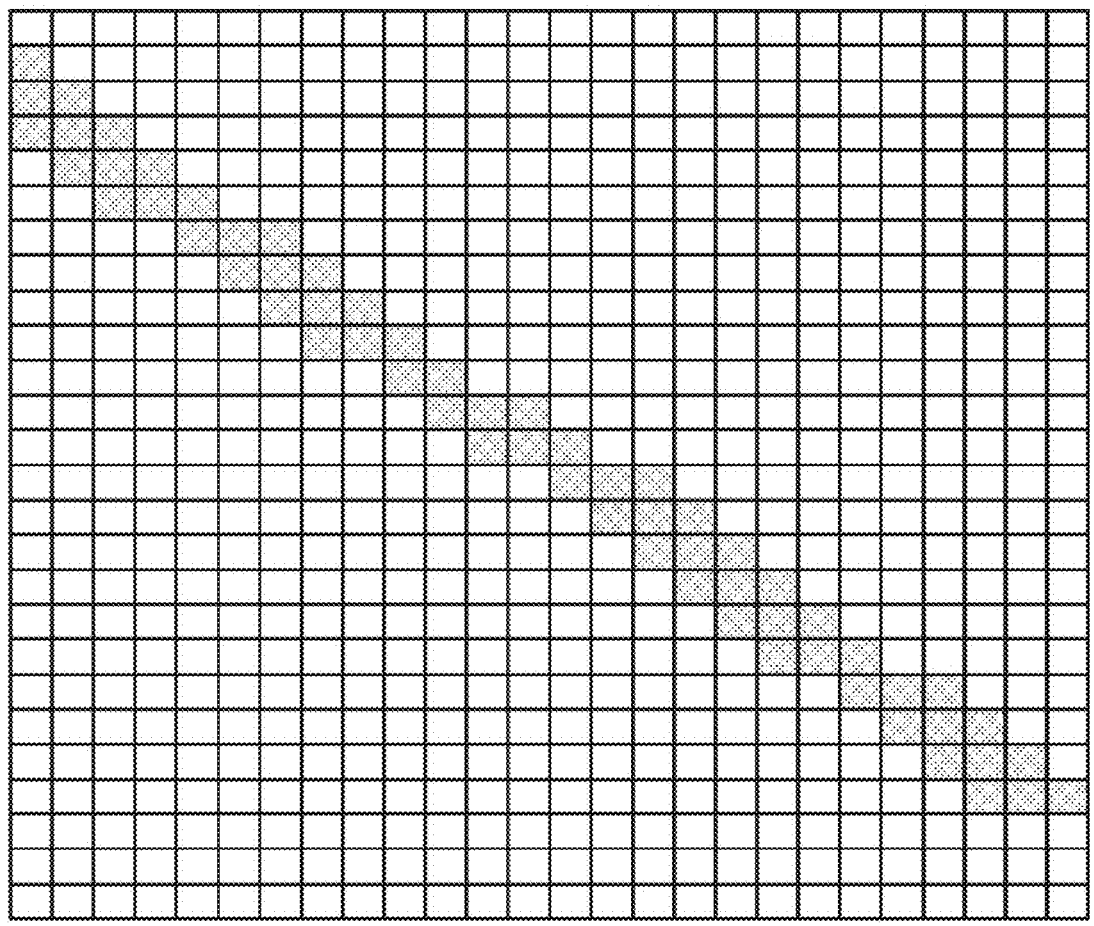
Figure 18C:
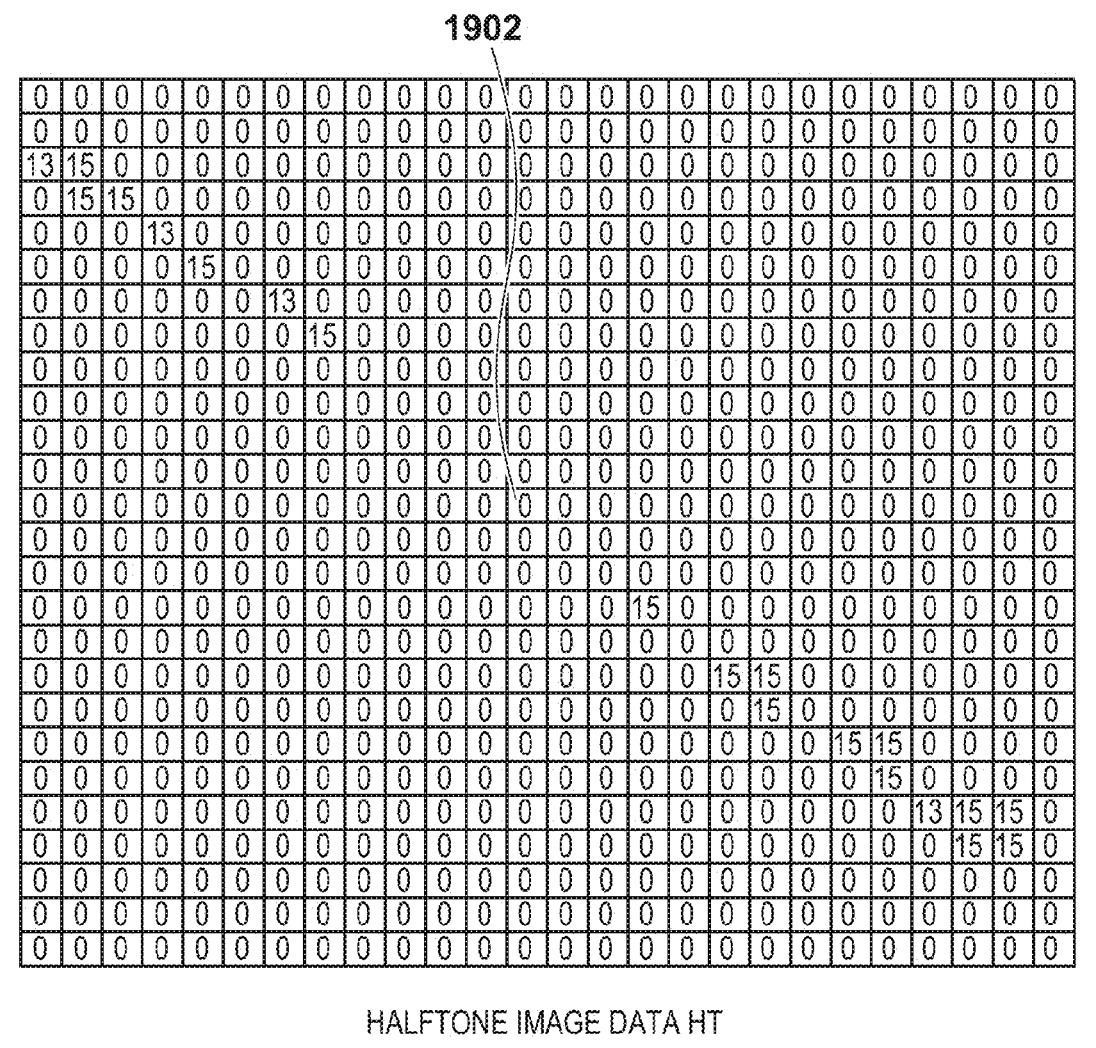
Figure 18D:
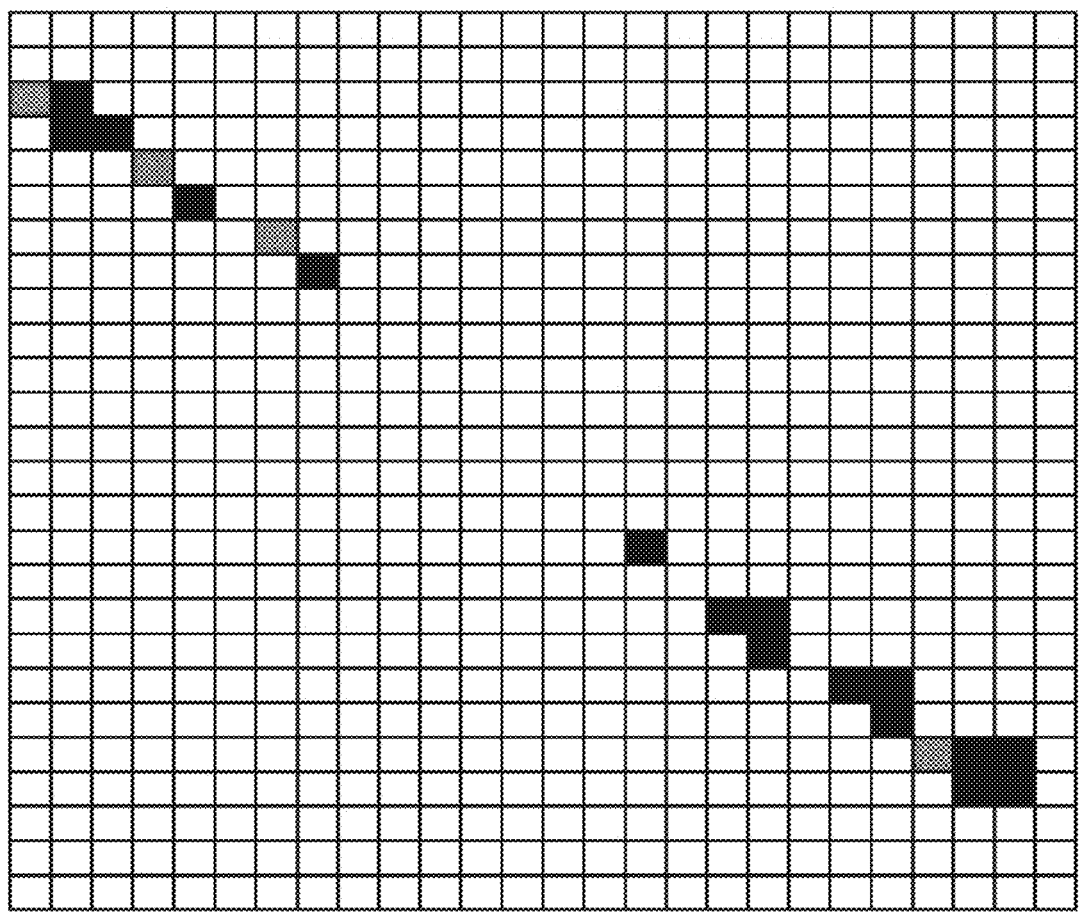
Figure 19C:
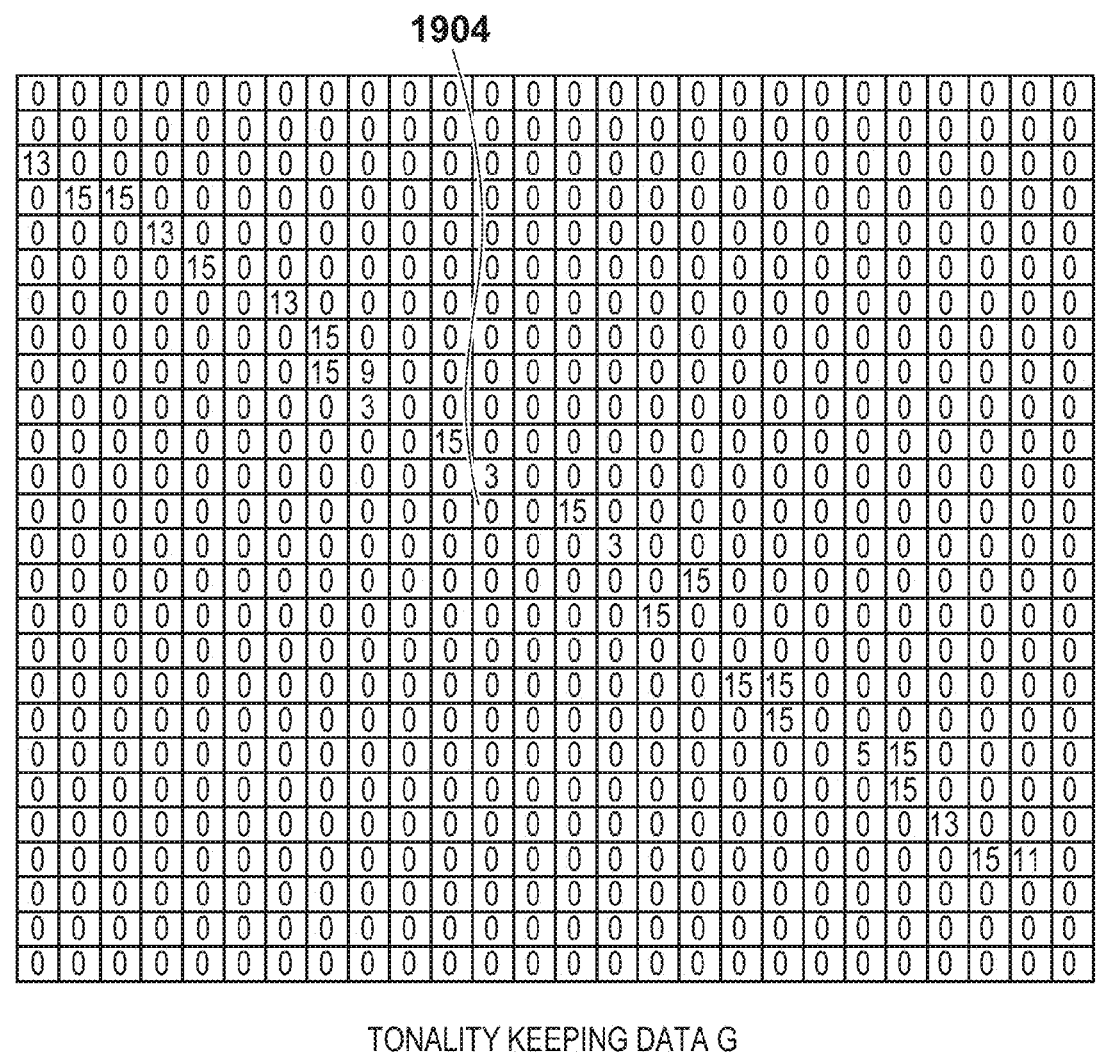
Figure 19D:
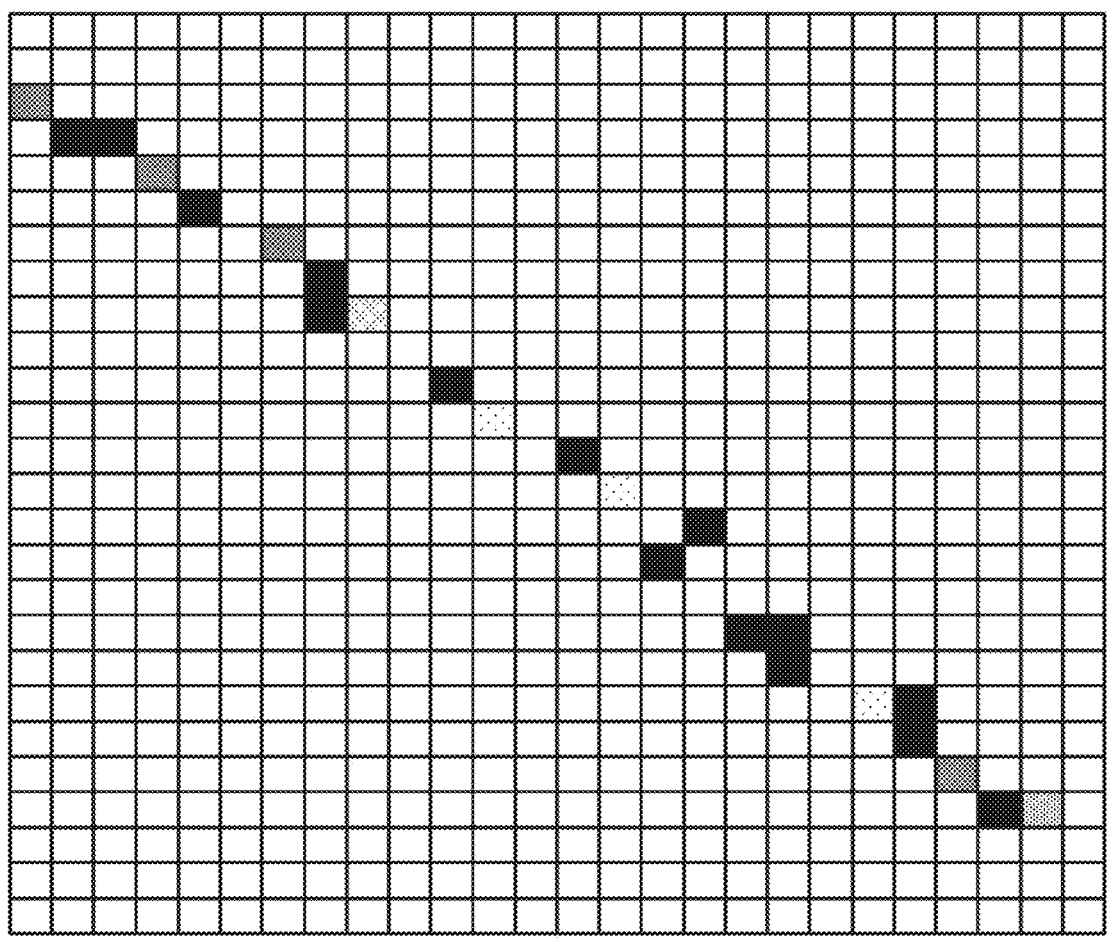

The effectiveness of this embodiment will be described below with reference to FIGS. 18A to 23D. FIG. 18A shows input image data $K_1$ after tone correction to the image processor 306, which data includes an oblique thin line. Note that FIG. 18B visually expresses the image data shown in FIG. 18A. The following figures show outputs of the respective units in the image processor 306 with respect to this image data $K_1$. Note that the halftone tables used by the respective units are as shown in FIGS. 7A to 7E. The halftone processor 101 outputs halftone image data HT shown in FIG. 18C. FIG. 18D visually expresses the image data shown in FIG. 18C. As shown in FIG. 18C, it is confirmed that data are omitted due to errors caused by the halftone processing, and the thin line is disconnected at a position 1902 and the like. The halftone error detector 100 outputs halftone error data HTE shown in FIG. 19A. Note that FIG. 19B visually expresses the image data shown in FIG. 19A. FIG. 19C shows tonality keeping data G output from the tonality keeping processor 105, and FIG. 19D visually expresses the image data shown in FIG. 19C. As described above, the resolution corrected by the processing of the tonality keeping processor 105 depends on, for example, the resolution of the filter shown in FIG. 7A used by the filter processors 102 and 103. For this reason, an image corresponding to the image data $K_1$, which has a high resolution as shown in FIG. 18A, that is, which includes abrupt spatial changes of pixel values at positions of the thin line, cannot be reproduced.

Hence, in this embodiment, the resolution of the image data $K_1$ is maintained by increasing the weight of the resolution keeping data R output from the resolution keeping processor 107 with respect to pixel data corresponding to a large spatial tone change detected by the tone change detector 106.

Figure 20B:
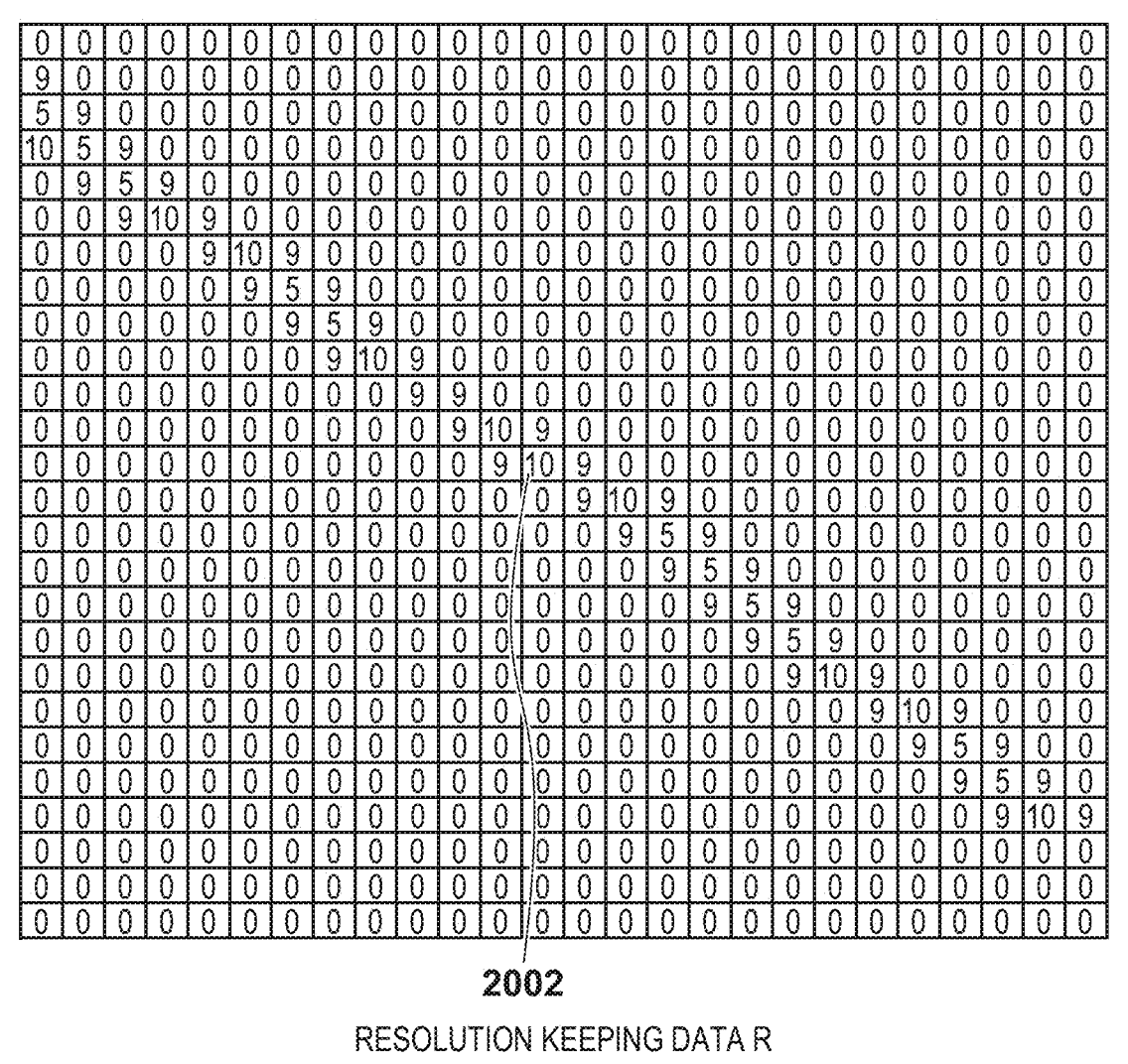

FIG. 20A shows tone change data RLv output from the tone change detector 106. The tone change detector 106 outputs a maximum value of difference values between a pixel of interest and neighboring pixels in the image data $K_1$ as tone change data RLv. Therefore, the tone change data RLv with respect to the image data $K_1$ shown in FIG. 18A is increased at an edge portion where tones in the image data $K_1$ change, and its value is RLv=96. FIG. 20B shows resolution keeping data R output from the resolution keeping processor 107.

As described above, in this embodiment, not only the tone change data RLv but also the halftone error data HTE are considered upon decision of the mixing ratio α. The reason for this will be described below. A case without considering any halftone error data HTE will be explained first. Note that the following figures also show outputs for the image data $K_1$ shown in FIG. 18A.

Figure 16B:
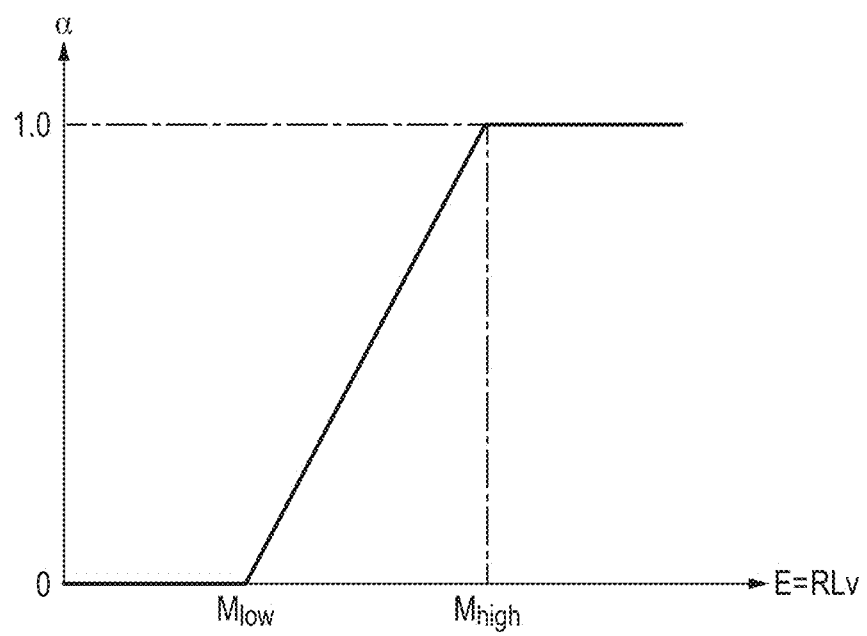
Figure 17:
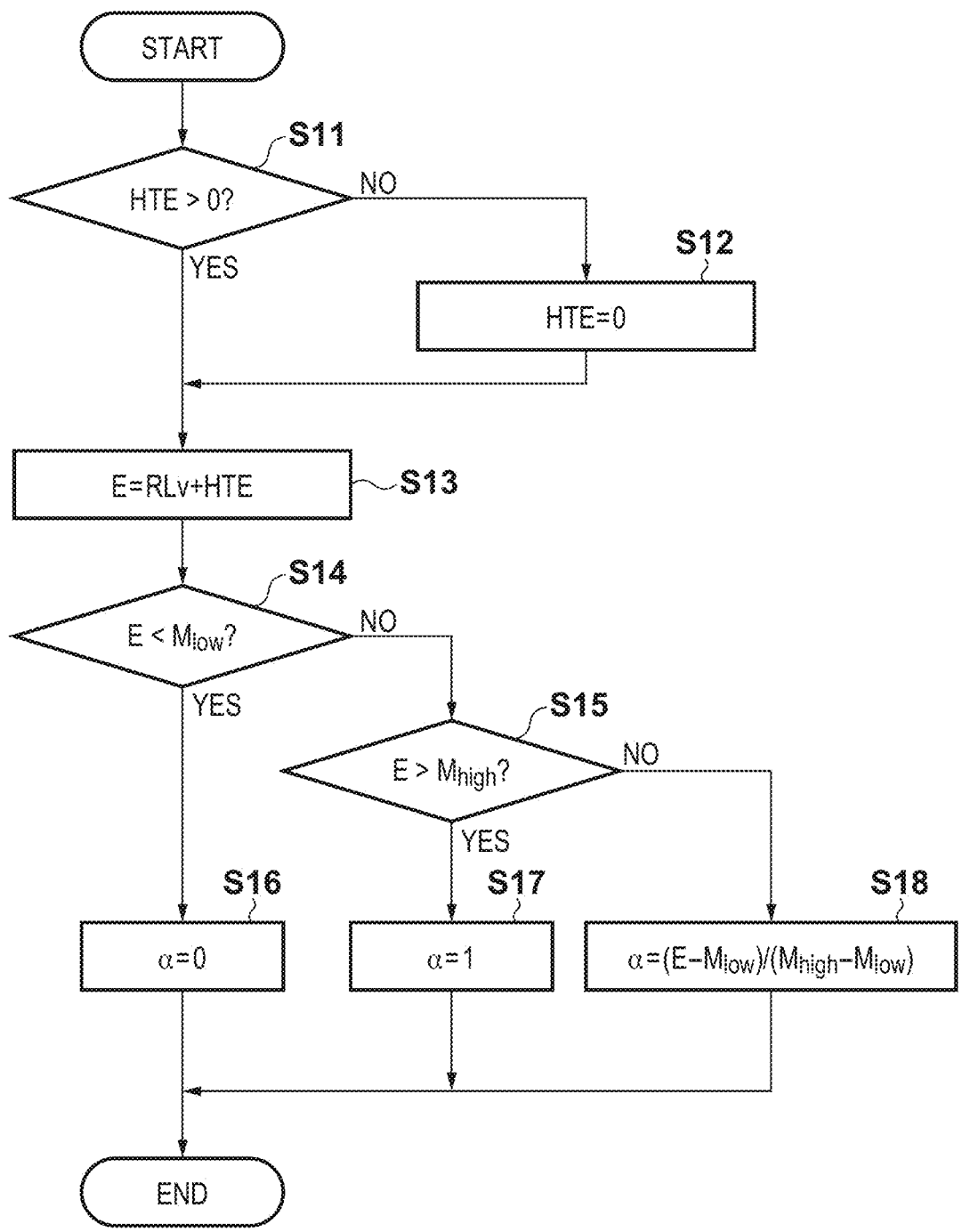
FIG. 17 is a flowchart for deciding the mixing ratio α according to one embodiment.
Figure 21A:
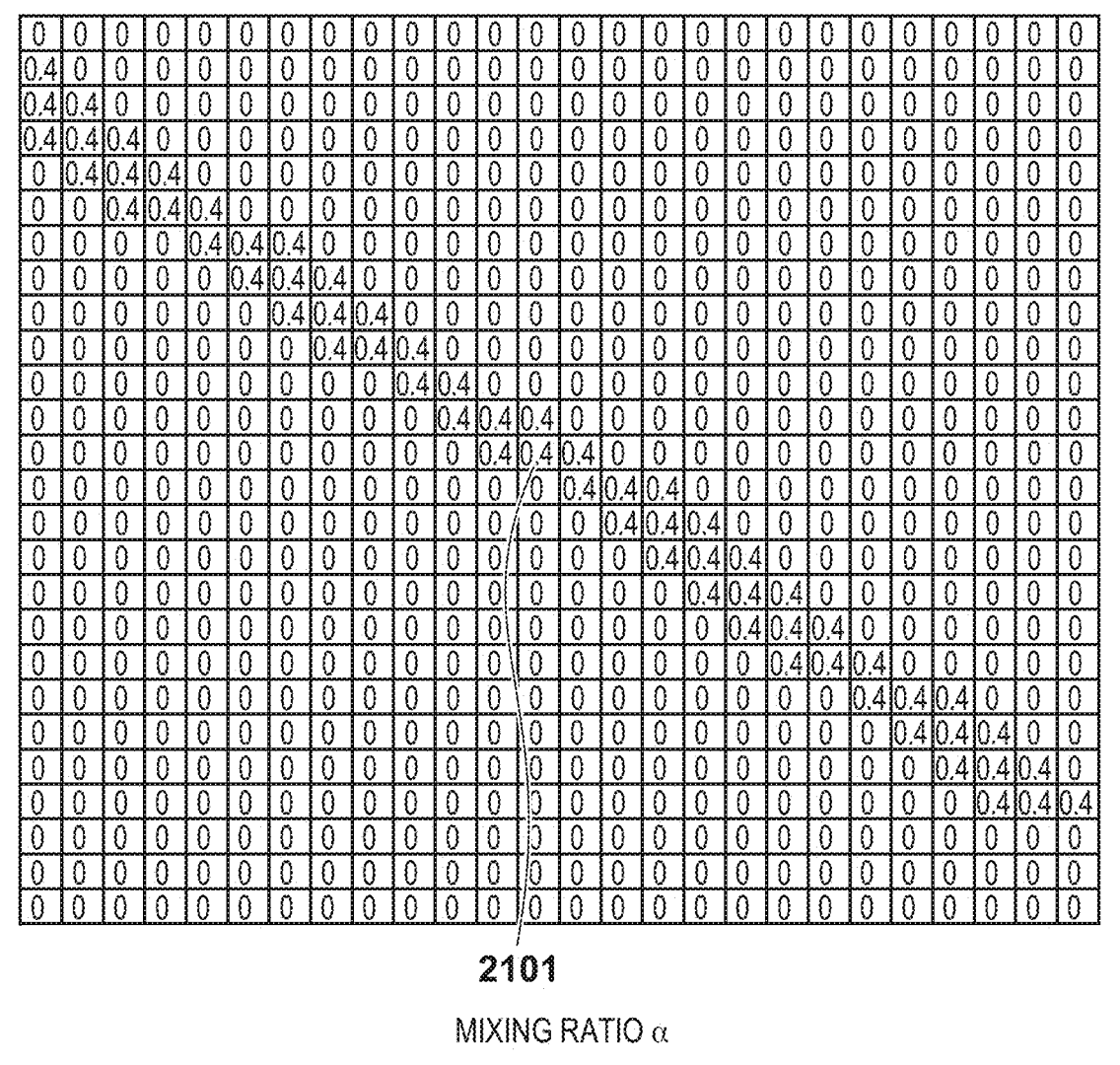

FIG. 21A shows the mixing ratios α calculated from the tone change data RLv according to the graph shown in FIG. 16B. In this case, since $M_{low}$=64 and $M_{high}$=140, when RLv=96, α=(96−64)/(140−64)=0.4 from FIG. 16B.

FIG. 22A shows the processing result of the mixing unit 109 based on the mixing ratios α shown in FIG. 21A. Also, FIG. 22B visually expresses the data shown in FIG. 22A.

As described above using FIGS. 5A to 5D, reproducibility of toner changes due to the influence of neighboring pixels in term of characteristics of an electrophotography printer. In this embodiment, by making filter calculations using the filter shown in FIG. 14C as a simple model of the influence of neighboring pixels, the degree of influence of neighboring pixels is quantified. More specifically, the filter calculation result of a pixel group P of 3×3 pixels including the pixel p5 of interest shown in FIG. 14A and the filter shown in FIG. 14C is defined as a neighboring pixel influence degree I (I=P×F). Also, a value obtained by adding the pixel p5 of interest and neighboring pixel influence degree I is defined as a pixel reproducibility RAP (RAP=p5+I). Assume that when the pixel reproducibility RAP exceeds a toner reproduction threshold $Th_{dev}$, the absolute value of the surface potential falls below the developing bias $V_{dev}$, and a toner image is formed and visualized, as described above using FIGS. 5A to 5D. In the following description, $Th_{dev}$=8.0.

Figure 22D:
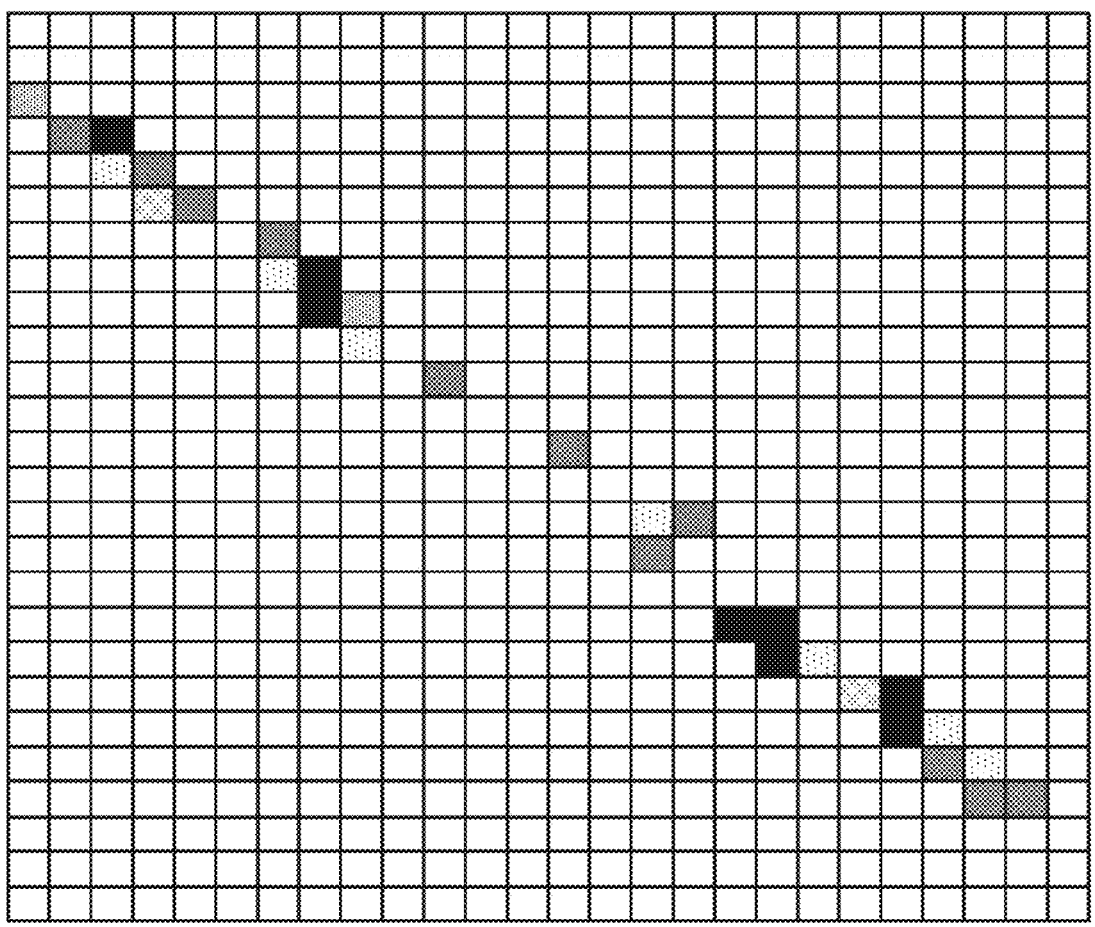

FIG. 22C shows calculated quantitative values of toner formation based on the data shown in FIG. 22A using the aforementioned simple toner formation model. FIG. 22D visually expresses data shown in FIG. 22C. As shown in FIG. 22D, when the pixel reproducibility RAP is not less than $Th_{dev}$=8.0 under the influence of neighboring pixels, only pixels in FIG. 22C are visualized as a toner image on a print image.

As can be confirmed from FIGS. 22C and 22D, toner formation of the edge portion of the thin line corrected by the resolution keeping data R is not made. This is because a toner image is hardly formed due to the smaller influence from neighboring pixels on the pixel of interest, and pixel values are less than the threshold $Th_{dev}$ required for toner formation due to the values of the mixing ratios α. As shown in FIG. 22D, since data at the edge portion cannot be reproduced on a print image based on the mixing ratios α calculated from the tone change data RLv, the thin line cannot be appropriately corrected.

Hence, in this embodiment, in order to consider the influence of neighboring pixels after the mixing processing, the mixing ratios are controlled by referring to the halftone error data HTE. The halftone error data HTE is obtained by executing difference processing of data as a result of the smoothing processing of the image data $K_1$ and halftone image data HT using the filter shown in FIGS. 8A and 8B, as described above. A pixel corresponding to positive halftone error data HTE is a portion where a data value is smaller than the image data $K_1$ due to the halftone processing, and indicates that a sum total of the pixel of interest and its neighboring pixels in the halftone image data HT is small. A pixel corresponding to the small sum total of the pixel of interest and its neighboring pixels of the halftone image data HT is a pixel which is insusceptible to neighboring pixels, and for which a toner image is hardly formed.

Hence, in this embodiment, by deciding the mixing ratios α in consideration of the halftone error data HTE, the mixing ratios of pixels for which a toner image is hardly formed are changed by comparing with those obtained when only the tone change data RLv are taken into consideration. As described above, the halftone error data HTE indicates an error of a sum total of neighboring pixel densities of each pixel of the halftone image data HT upon comparison with the image data $K_1$. By adding this error to the tone change data RLv, the error of the sum total of the neighboring pixel densities of the halftone image data HT is taken into consideration, and the mixing ratio α can be decided so as to prevent a density from being decreased by the mixing processing.

FIG. 21B shows mixing ratios α decided in consideration of the halftone error data HTE in addition to the tone change data RLv in accordance with the graph shown in FIG. 16A. For example, tone change data RLv of a pixel 1901 in FIG. 18A is 96 from a pixel 2001 in FIG. 20A, and halftone error data is 44 from a pixel 1903 in FIG. 19A. $M_{low}$ is 64, and $M_{high}$ is 140. Hence, upon executing the calculation according to the flowchart shown in FIG. 17, an edge correction index E=96+44=140, and a mixing ratio α of a pixel 2201 in FIG. 21B is 1.0, which is higher than 0.4 as a mixing ratio α of a pixel 2101 in FIG. 21A.

Figure 23B:
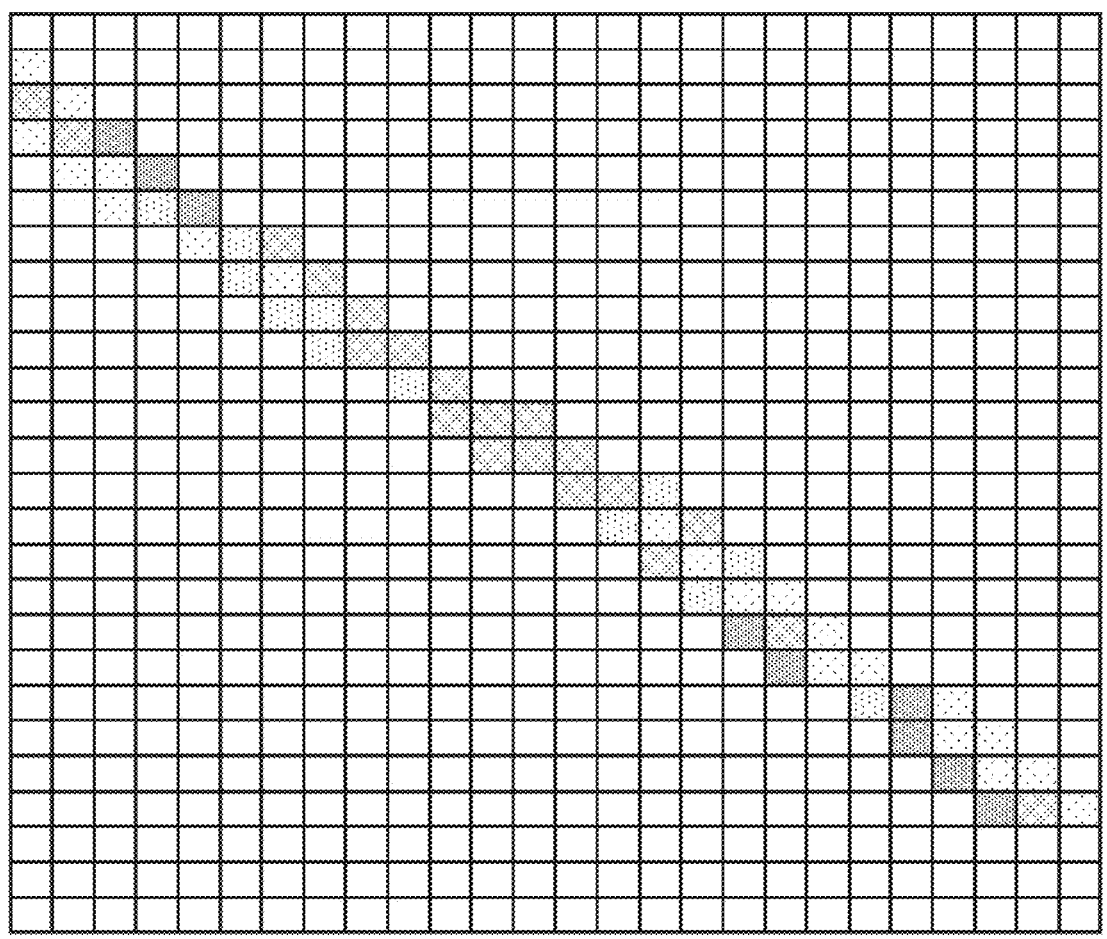

FIG. 23A shows image data $K_2$ output from the mixing unit 109 when the mixing ratios α shown in FIG. 21B are used. FIG. 23B visually expresses the data shown in FIG. 23A. FIG. 23C shows calculated quantitative values of toner formation of FIG. 23A using the aforementioned simple toner formation model. FIG. 23D visually expresses the data shown in FIG. 23C. As shown in FIG. 23D, pixels in FIG. 23C, which are not less than $Th_{dev}$=8.0 under the influence of neighboring pixels, are visualized as a toner image. As can be seen from FIG. 23D, in consideration of the halftone error data HTE, toner formation is made even at a thin line disconnected portion in FIG. 22D, thus outputting a print image which maintains the resolution of the input image.

As described above, according to this embodiment, the mixing ratio α of the tonality keeping data G and resolution keeping data R is decided from the halftone error data HTE and tone change data RLv. Since pixel data with large halftone error data is a pixel corresponding to low pixel densities of neighboring pixels, it is not influenced by exposure control of the neighboring pixels, and toner formation becomes unstable. For this reason, for the pixel with the large halftone error data HTE, the mixing ratio α is decided to increase a weight on the resolution keeping data R, thus enhancing toner formation stability. As a result of stable toner formation, high-resolution correction is allowed even in an electrophotographic image forming apparatus. In this embodiment, the mixing ratio α is decided by adding the halftone error data HTE and tone change data RLv. However, other decision methods may be used. For example, a method of deciding a mixing ratio α by adding halftone error data HTE to a mixing start point $M_{low}$ and mixing end point $M_{high}$ may be used.

Second Embodiment

The first embodiment has explained the arrangement for deciding the mixing ratio α using the halftone error data HTE. The second embodiment will explain an arrangement for enhancing toner stability by referring to halftone error data HTE after mixing processing of resolution keeping data R and tonality keeping data G. Note that differences from the first embodiment will be mainly described below, and a description of the same components as in the first embodiment will not be repeated for the sake of simplicity.

Figure 24:
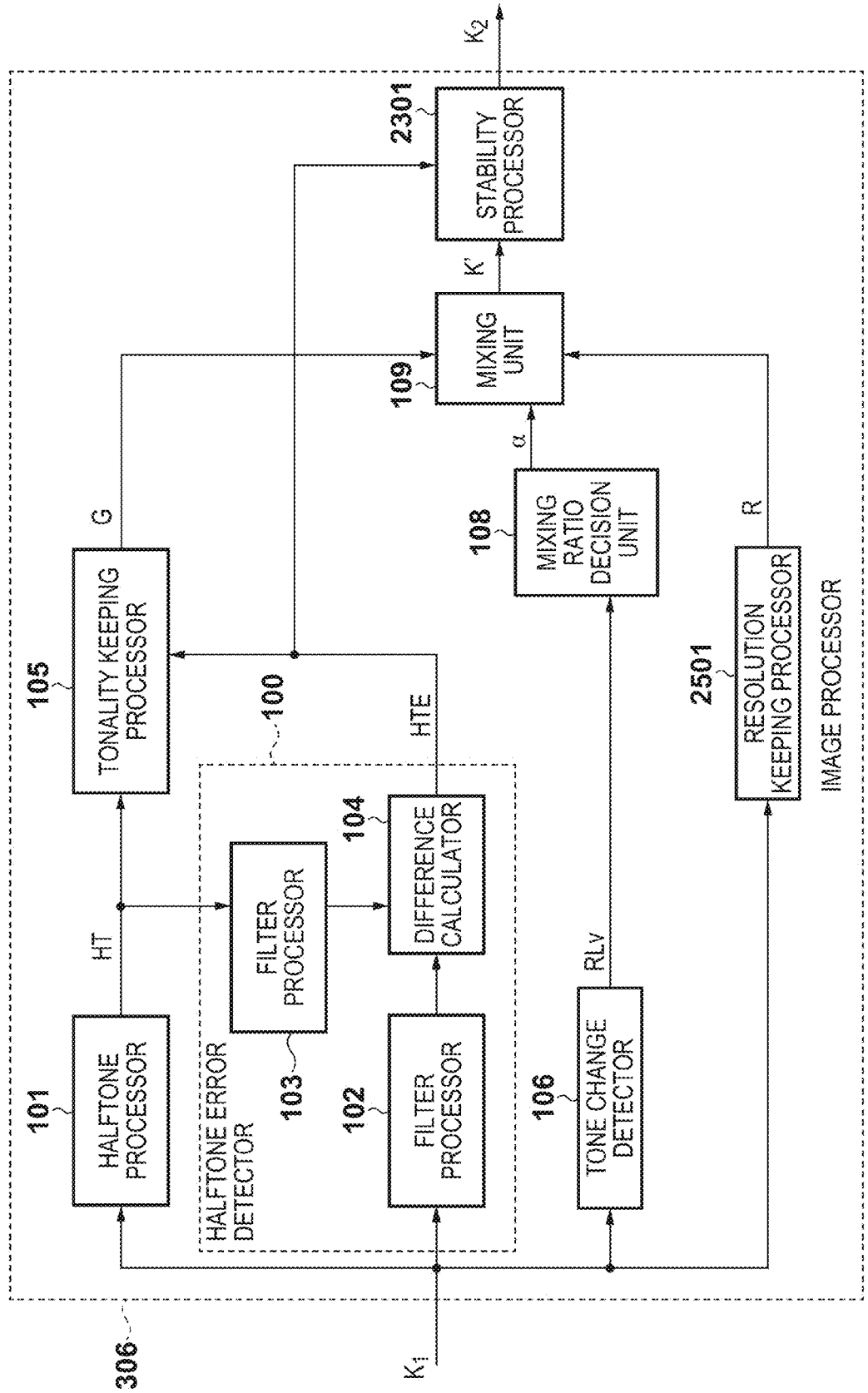
FIG. 24 is a block diagram showing the arrangement of an image processor according to one embodiment.

FIG. 24 shows the arrangement of an image processor 306 according to this embodiment. A mixing ratio decision unit 108 decides a mixing ratio α from tone change data RLv according to, for example, a graph shown in FIG. 16B. In this embodiment, a stability processor 2301 (third processor), which outputs image data $K_2$ from mixed data K' output from a mixing unit 109 and halftone error data HTE is arranged.

Figure 25:
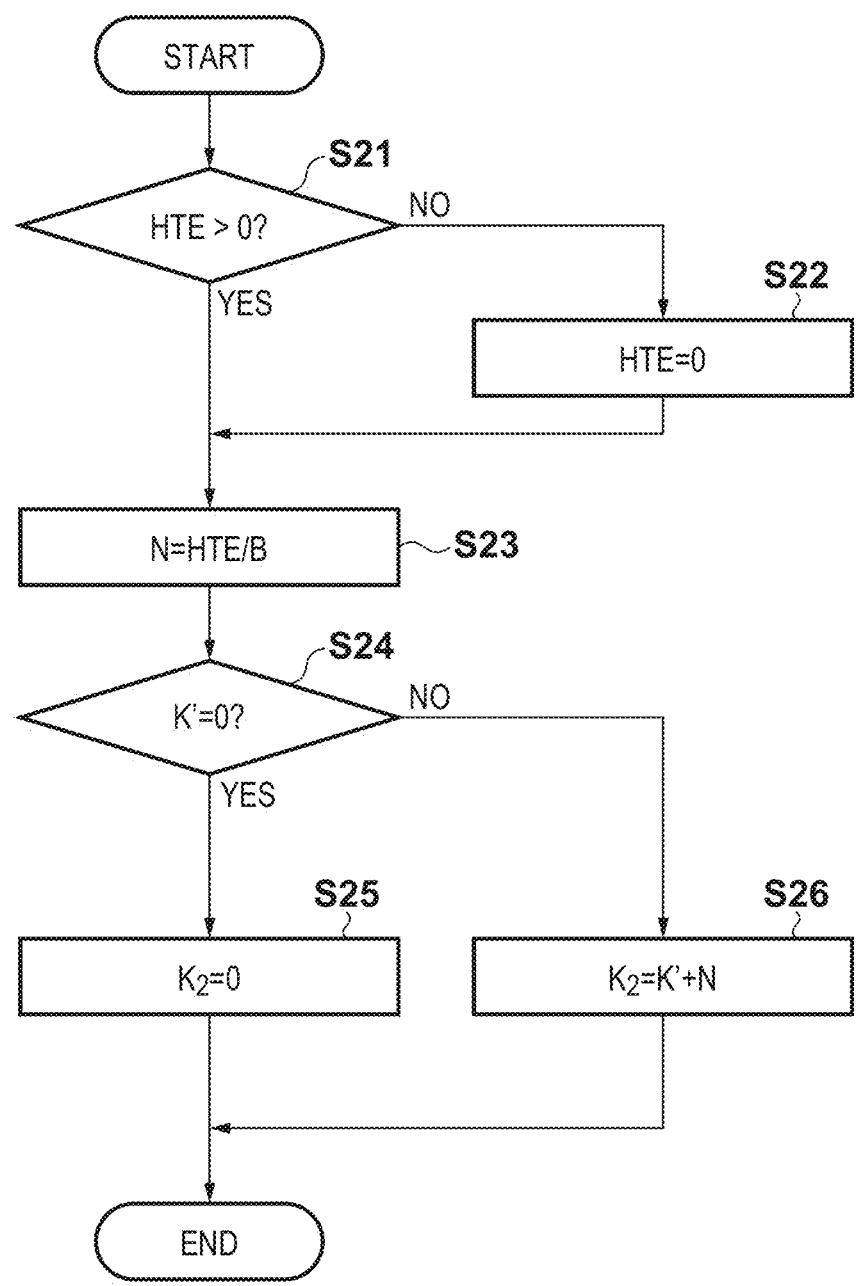
FIG. 25 is a flowchart of output image data decision processing of the image processor according to one embodiment.

FIG. 25 is a flowchart of generation processing of the image data $K_2$ executed by the stability processor 2301. The stability processor 2301 determines in step S21 whether or not each pixel of halftone error data HTE assumes a positive value. The stability processor 2301 sets halftone error data HTE of the pixel which does not assume a positive value to be zero in step S22. Next, the stability processor 2301 divides a pixel value by a base value B to output normalized data N in step S23, so as to match the number of tones of the halftone error data HTE with the number of tones of a PWM processor 307. In this example, since a maximum value of the halftone error data HTE is 255 and that of the PWM processor 307 is 15, a pixel value is divided by 17. The stability processor 2301 determines in step S24 whether or not a pixel value of mixed data K' is zero. If K'=0, the stability processor 2301 sets a pixel value of that pixel in the image data $K_2$ to be output to be zero in step S25. On the other hand, if the pixel value of the mixed data K' is not zero, the stability processor 2301 sets a pixel value of that pixel in the image data $K_2$ to be output to be a value as a sum of the pixel value of the mixed data K' and the value of the normalized data N of the corresponding pixel in step S26.

As described above, an exposure control time is prolonged by a time according to an error of a sum total of neighboring pixel densities by executing addition processing of the halftone error data HTE and mixed data K' after the mixing processing, thus attaining stable toner formation. As a result, high-resolution correction is allowed even in an electrophotographic printer.

Third Embodiment

In this embodiment, resolution keeping data R is generated in consideration of halftone error data HTE. With this arrangement, toner stability of an image based on image data output from a mixing unit 109 can be enhanced.

Figure 26:
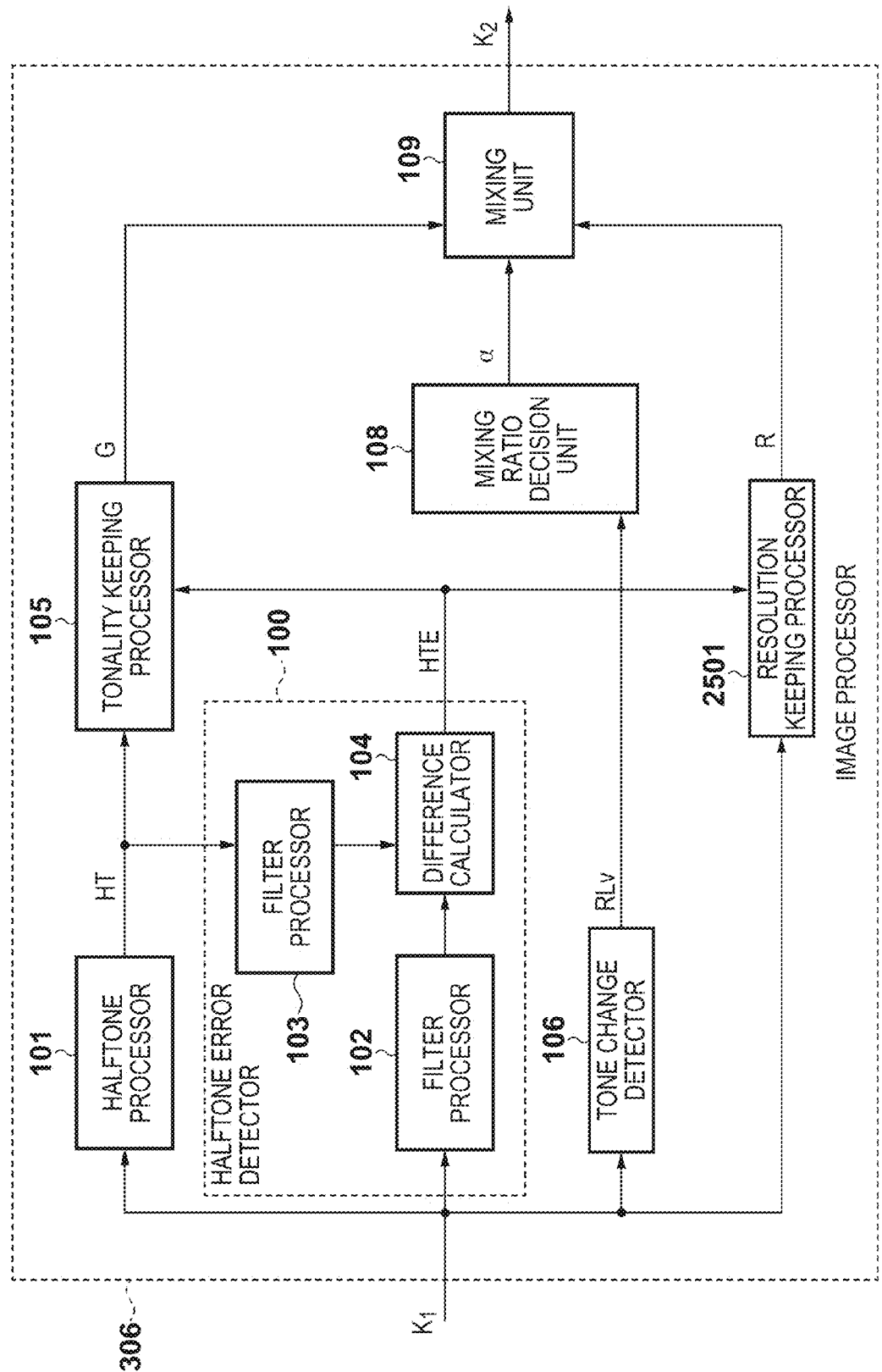
FIG. 26 is a block diagram showing the arrangement of an image processor according to one embodiment.

FIG. 26 shows the arrangement of an image processor 306 according to this embodiment. A mixing ratio decision unit 108 decides a mixing ratio α based on tone change data RLv as in the second embodiment.

Figure 15C:
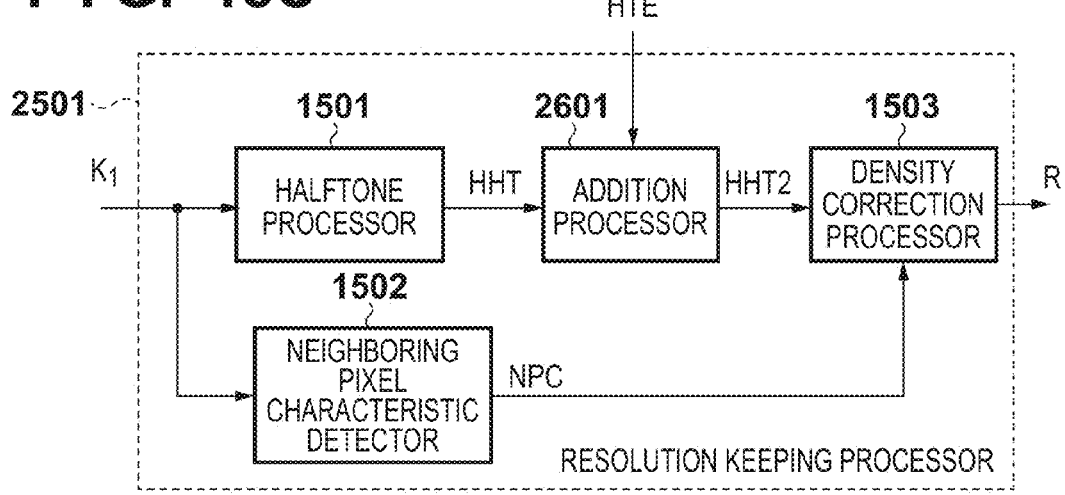

FIG. 15C shows the arrangement of a resolution keeping processor 2501 according to this embodiment. Compared to the resolution keeping processor 107 of the first embodiment, in the resolution keeping processor 2501, an addition processor 2601 is added between a halftone processor 1501 and density correction processor 1503.

The addition processor 2601 generates halftone image data HHT2 (HHT2=HHT+HTE) by adding halftone image data HHT output from the halftone processor 1501 and halftone error data HTE. The density correction processor 1503 outputs data obtained by applying density correction to the halftone image data HHT2 based on information NPC as resolution keeping data R. With this arrangement, when halftone error data HTE assumes a positive value (in a pixel which has the small influence of neighboring pixels and for which toner formation is hardly made), tone data of the halftone image data HHT is increased, thus attaining stable toner formation. In addition, when halftone error data HTE assumes a negative value (in a pixel for which toner formation is readily made under the influence of neighboring pixels), tone data of halftone image data HHT is decreased, thus suppressing an excessive toner formation phenomenon.

As described above, by varying the resolution keeping data R according to the halftone error data HTE, stable toner formation can be attained, and high-resolution correction is allowed even in an electrophotographic printer.

Other Embodiments

An image processing apparatus corresponding to the image processor 306 described in the aforementioned embodiments is executed not only in the image forming apparatus 10 which receives rendering data from the host PC 210 but also in, for example, a copying machine including an image reading device. In this case, rendering data required for image formation can be acquired by reading from an original by the image reading device. Table data such as a color conversion table, gamma correction table, halftone table, filter table, and address conversion table need not always be stored in the ROM 221 in advance. For example, these table data may be provided from the host PC 210 to the image forming apparatus 10. Even in such case, the image forming apparatus 10 can implement the functions of the aforementioned embodiments using the table data received from the host PC 210, thus obtaining the effects of the aforementioned embodiments. Also, the image processing apparatus may be configured as an image processing system including a plurality of apparatuses. Furthermore, each embodiment can be implemented as an image processing method.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-125147, filed on May 31, 2012, which is hereby incorporated by reference herein in its entirety.

What is claimed is:

1. An image processing apparatus comprising:
a halftone processor configured to apply halftone processing to input image data, and to output halftone image data;
an error detector configured to detect errors of respective pixels generated by the halftone processing of said halftone processor by evaluating differences between the input image data and the halftone image data, and to output the errors as error data;
a first processor configured to apply correction processing to the halftone image data using the error data, and to output first image data;
a second processor configured to apply halftone processing of a higher resolution than the halftone processing of said halftone processor to the input image data, and to output second image data;
a change detector configured to detect, from a pixel value of a pixel of the input image data and pixel values of pixels in a first range with reference to that pixel, a change amount of a pixel value at that pixel, and to output change data including change amounts of pixel values at respective pixels;
a decision unit configured to decide, for each pixel, a mixing ratio of that pixel using a value based on a sum of an error of the pixel detected by said error detector and a change amount of a pixel value at that pixel detected by said change detector; and
a mixing unit configured to mix pixel values of the first image data and the second image data according to the mixing ratios to generate output image data,
wherein when the value based on the sum is increased, the mixing ratio of the second image data decided by said decision unit remains the same or is increased.

2. The apparatus according to claim 1, wherein when the value based on the sum is smaller than a first threshold, the mixing ratio of the second image data decided by said decision unit is a first value,
when the value based on the sum is larger than a second threshold, the mixing ratio of the second image data decided by said decision unit is a second value,
the second threshold is larger than the first threshold, and
when the value based on the sum is not less than the first threshold and not more than the second threshold, the mixing ratio of the second image data decided by said decision unit is increased in proportion to the value based on the sum.

3. The apparatus according to claim 1, wherein said decision unit is further configured to decide, when an error of a pixel detected by said error detector indicates that a density is increased by the halftone processing of said halftone processor, the mixing ratio of that pixel by converting the error of the pixel into a predetermined value.

4. The apparatus according to claim 3, wherein the predetermined value is a value indicating no error.

5. The apparatus according to claim 1, wherein said error detector comprises:
a first filter processor configured to execute filter processing for smoothing the input image data;
a second filter processor configured to execute the filter processing for the halftone image data; and
a calculator configured to calculate differences between output data of said first filter processor and output data of said second filter processing after the numbers of tones are matched, and to output the differences as the error data.

6. The apparatus according to claim 1, wherein said first processor comprises:
a quantizer configured to quantize the error data and to output quantized data; and
an addition processor configured to add the halftone image data and the quantized data.

7. The apparatus according to claim 6, wherein said quantizer comprises:
a conversion output unit configured to output first error data by converting negative error values of the error data into zero, and second error data by converting positive error values of the error data into zero;
a first quantizer configured to apply halftone processing to the first error data and to output first quantized data having the same number of tones as said halftone processor;
a second quantizer configured to apply halftone processing to the second error data and to output second quantized data having the same number of tones as said halftone processor; and
a subtractor configured to output differences between the first quantized data and the second quantized data as the quantized data.

8. The apparatus according to claim 1, wherein said change detector sets a maximum value of differences between a pixel value of a pixel of the input image data and pixel values of pixels in the first range with reference to the pixel as a change amount of the pixel value at that pixel.

9. The apparatus according to claim 1, wherein said second processor comprises:
a third filter unit configured to apply, to each pixel of the input image data, filter processing for calculating an weighted average of pixel values of pixels in a second range with reference to a pixel; and
a correction processor configured to correct data, which are obtained by applying halftone processing of a higher resolution than the halftone processing of said halftone unit to the input image data, based on output data of said third filter unit, and to output the corrected data as the second image data,
weights for the pixels in the second range are set so that a weight for a pixel which is located in a sub-scanning direction with respect to a given pixel is larger than a weight for a pixel which is located in a main scanning direction with respect to the given pixel, and a weight for a pixel which is located in the main scanning direction with respect to a given pixel is larger than a weight for a pixel which is located neither in the main scanning direction nor the sub-scanning direction with respect to the given pixel, and
said correction processor is further configured to correct, when the weighted average is increased, the data so that a density of a pixel remains the same or is increased.

10. An image processing apparatus comprising:
a halftone processor configured to apply halftone processing to input image data, and to output halftone image data;
an error detector configured to detect errors of respective pixels generated by the halftone processing of said halftone processor by evaluating differences between the input image data and the halftone image data, and to output the errors as error data;

a first processor configured to apply correction processing to the halftone image data using the error data, and to output first image data;

a second processor configured to apply halftone processing of a higher resolution than the halftone processing of said halftone processor to the input image data, and to output second image data;

a change detector configured to detect, from a pixel value of a pixel of the input image data and pixel values of pixels in a first range with reference to that pixel, a change amount of a pixel value at that pixel, and to output change data including change amounts of pixel values at respective pixels;

a decision unit configured to decide, based on a change amount of a pixel value of a pixel detected by said change detector, a mixing ratio of that pixel;

a mixing unit configured to mix pixel values of the first image data and the second image data according to the mixing ratios to generate mixed data; and a third processor configured to generate output image data by correcting the mixed data based on the error data, wherein when a change amount of a pixel value detected by said change detector is increased, a mixing ratio of the second image data decided by said decision unit remains the same or is increased.

11. The apparatus according to claim 10, wherein said third processor is further configured to correct a pixel, which corresponds to the error data indicating that a density is decreased by the halftone processing of said halftone processor, of pixels of the mixed data.

12. An image processing apparatus comprising:

a halftone processor configured to apply halftone processing to input image data, and to output halftone image data;

an error detector configured to detect errors of respective pixels generated by the halftone processing of said halftone processor by evaluating differences between the input image data and the halftone image data, and to output the errors as error data;

a first processor configured to apply correction processing to the halftone image data using the error data, and to output first image data;

a second processor configured to apply halftone processing of a higher resolution than the halftone processing of said halftone processor to the input image data, and to correct the processed image data by the error data so as to output second image data;

a change detector configured to detect, from a pixel value of a pixel of the input image data and pixel values of pixels in a first range with reference to that pixel, a change amount of a pixel value at that pixel, and to output change data including change amounts of pixel values at respective pixels;

a decision unit configured to decide, based on a change amount of a pixel value of a pixel detected by said change detector, a mixing ratio of that pixel; and a mixing unit configured to mix pixel values of the first image data and the second image data according to the mixing ratios to generate output image data, wherein when a change amount of a pixel value detected by said change detector is increased, a mixing ratio of the second image data decided by said decision unit remains the same or is increased.

13. The apparatus according to claim 12, wherein said second processor comprises:

a third filter unit configured to apply, to each pixel of the input image data, filter processing for calculating an weighted average of pixel values of pixels in a second range with reference to a pixel;

an adder configured to add the error data to data obtained by applying halftone processing of a higher resolution than the halftone processing of said halftone processor to the input image data; and a correction processor configured to correct output data of said adder based on output data from said third filter unit and to output the corrected data as the second image data, weights for the pixels in the second range are set so that a weight for a pixel which is located in a sub-scanning direction with respect to a given pixel is larger than a weight for a pixel which is located in a main scanning direction with respect to the given pixel, and a weight for a pixel which is located in the main scanning direction with respect to a given pixel is larger than a weight for a pixel which is located neither in the main scanning direction nor the sub-scanning direction with respect to the given pixel, and said correction processor is further configured to correct, when the weighted average is increased, the data so that a density of a pixel remains the same or is increased.

14. A program product having program stored in a non-transitory computer-readable storage media, the program for controlling a computer to function as an image processing apparatus of claim 1.

15. A non-transitory computer-readable storage media including program for controlling a computer to function as an image processing apparatus of claim 1.

16. An image processing system comprising:

a halftone processor configured to apply halftone processing to input image data, and to output halftone image data;

an error detector configured to detect errors of respective pixels generated by the halftone processing of said halftone processor by evaluating differences between the input image data and the halftone image data, and to output the errors as error data;

a first processor configured to apply correction processing to the halftone image data using the error data, and to output first image data;

a second processor configured to apply halftone processing of a higher resolution than the halftone processing of said halftone processor to the input image data, and to output second image data;

a change detector configured to detect, from a pixel value of a pixel of the input image data and pixel values of pixels in a first range with reference to that pixel, a change amount of a pixel value at that pixel, and to output change data including change amounts of pixel values at respective pixels;

a decision unit configured to decide, for each pixel, a mixing ratio of that pixel using a value based on a sum of an error of the pixel detected by said error detector and a change amount of a pixel value at that pixel detected by said change detector; and a mixing unit configured to mix pixel values of the first image data and the second image data according to the mixing ratios to generate output image data, wherein when the value based on the sum is increased, the mixing ratio of the second image data decided by said decision unit remains the same or is increased.

17. An image processing system comprising:

a halftone processor configured to apply halftone processing to input image data, and to output halftone image data;

an error detector configured to detect errors of respective pixels generated by the halftone processing of said halftone processor by evaluating differences between the input image data and the halftone image data, and to output the errors as error data;

a first processor configured to apply correction processing to the halftone image data using the error data, and to output first image data;

a second processor configured to apply halftone processing of a higher resolution than the halftone processing of said halftone processor to the input image data, and to output second image data;

a change detector configured to detect, from a pixel value of a pixel of the input image data and pixel values of pixels in a first range with reference to that pixel, a change amount of a pixel value at that pixel, and to output change data including change amounts of pixel values at respective pixels;

a decision unit configured to decide, based on a change amount of a pixel value of a pixel detected by said change detector, a mixing ratio of that pixel;

a mixing unit configured to mix pixel values of the first image data and the second image data according to the mixing ratios to generate mixed data; and a third processor configured to generate output image data by correcting the mixed data based on the error data, wherein when a change amount of a pixel value detected by said change detector is increased, a mixing ratio of the second image data decided by said decision unit remains the same or is increased.

18. An image processing system comprising:

a halftone processor configured to apply halftone processing to input image data, and to output halftone image data;

an error detector configured to detect errors of respective pixels generated by the halftone processing of said halftone processor by evaluating differences between the input image data and the halftone image data, and to output the errors as error data;

a first processor configured to apply correction processing to the halftone image data using the error data, and to output first image data;

a second processor configured to apply halftone processing of a higher resolution than the halftone processing of said halftone processor to the input image data, and to correct the processed image data by the error data so as to output second image data;

a change detector configured to detect, from a pixel value of a pixel of the input image data and pixel values of pixels in a first range with reference to that pixel, a change amount of a pixel value at that pixel, and to output change data including change amounts of pixel values at respective pixels;

a decision unit configured to decide, based on a change amount of a pixel value of a pixel detected by said change detector, a mixing ratio of that pixel; and a mixing unit configured to mix pixel values of the first image data and the second image data according to the mixing ratios to generate output image data, wherein when a change amount of a pixel value detected by said change detector is increased, a mixing ratio of the second image data decided by said decision unit remains the same or is increased.

19. An image processing method comprising:

a halftone processing step of applying halftone processing to input image data, and outputting halftone image data;

an error detection step of detecting errors of respective pixels generated by the halftone processing in the halftone processing step by evaluating differences between the input image data and the halftone image data, and outputting the errors as error data;

a first processing step of applying correction processing to the halftone image data using the error data, and outputting first image data;

a second processing step of applying halftone processing of a higher resolution than the halftone processing in the halftone processing step to the input image data, and outputting second image data;

a change detection step of detecting, from a pixel value of a pixel of the input image data and pixel values of pixels in a first range with reference to that pixel, a change amount of a pixel value at that pixel, and outputting change data including change amounts of pixel values at respective pixels;

a decision step of deciding, for each pixel, a mixing ratio of that pixel using a value based on a sum of an error of the pixel detected by the error detection step and a change amount of a pixel value at that pixel detected in the change detection step; and a mixing step of mixing pixel values of the first image data and the second image data according to the mixing ratios to generate output image data, wherein when the value based on the sum is increased, the mixing ratio of the second image data decided in the decision step remains the same or is increased.

20. An image processing method comprising:

a halftone processing step of applying halftone processing to input image data, and outputting halftone image data;

an error detection step of detecting errors of respective pixels generated by the halftone processing in the halftone processing step by evaluating differences between the input image data and the halftone image data, and outputting the errors as error data;

a first processing step of applying correction processing to the halftone image data using the error data, and outputting first image data;

a second processing step of applying halftone processing of a higher resolution than the halftone processing in the halftone processing step to the input image data, and outputting second image data;

a change detection step of detecting, from a pixel value of a pixel of the input image data and pixel values of pixels in a first range with reference to that pixel, a change amount of a pixel value at that pixel, and outputting change data including change amounts of pixel values at respective pixels;

a decision step of deciding, based on a change amount of a pixel value of a pixel detected in the change detection step, a mixing ratio of that pixel;

a mixing step of mixing pixel values of the first image data and the second image data according to the mixing ratios to generate output image data; and a third processing step of generating output image data by correcting the mixed data based on the error data, wherein when a change amount of a pixel value detected in the change detection step is increased, a mixing ratio of the second image data decided in the decision step remains the same or is increased.

21. An image processing method comprising:

a halftone processing step of applying halftone processing to input image data, and outputting halftone image data;

an error detection step of detecting errors of respective pixels generated by the halftone processing in the halftone processing step by evaluating differences between the input image data and the halftone image data, and outputting the errors as error data;

a first processing step of applying correction processing to the halftone image data using the error data, and outputting first image data;

a second processing step of applying halftone processing of a higher resolution than the halftone processing in the halftone processing step to the input image data, and correcting the processed image data by the error data so as to output second image data;

a change detection step of detecting, from a pixel value of a pixel of the input image data and pixel values of pixels in a first range with reference to that pixel, a change amount of a pixel value at that pixel, and outputting change data including change amounts of pixel values at respective pixels;

a decision step of deciding, based on a change amount of a pixel value of a pixel detected in the change detection step, a mixing ratio of that pixel; and a mixing step of mixing pixel values of the first image data and the second image data according to the mixing ratios to generate output image data, wherein when a change amount of a pixel value detected in the change detection step is increased, a mixing ratio of the second image data decided in the decision step remains the same or is increased.

* * * * *